United States Patent
Araki et al.

(10) Patent No.: US 7,231,642 B2
(45) Date of Patent: Jun. 12, 2007

(54) VEHICLE-MOUNTED MULTIMEDIA DEVICE

(75) Inventors: Shinichiro Araki, Tokyo (JP); Minoru Yoshida, Tokyo (JP); Akio Uekawa, Tokyo (JP); Yosuke Asai, Tokyo (JP); Mitsuo Shimotani, Tokyo (JP); Fumitaka Sato, Tokyo (JP)

(73) Assignee: Mitsubishi Denki Kasbushiki Kaisha, Tokyo (JP)

(*) Notice: Subject to any disclaimer, the term of this patent is extended or adjusted under 35 U.S.C. 154(b) by 546 days.

(21) Appl. No.: 10/275,622

(22) PCT Filed: Mar. 19, 2001

(86) PCT No.: PCT/JP01/02177

§ 371 (c)(1),
(2), (4) Date: Nov. 7, 2002

(87) PCT Pub. No.: WO02/075538

PCT Pub. Date: Sep. 26, 2002

(65) Prior Publication Data

US 2003/0154319 A1    Aug. 14, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/331; 701/200
(58) Field of Classification Search .................. 726/23; 719/310–332; 701/1, 2, 23–28, 200–216
See application file for complete search history.

(56) References Cited

U.S. PATENT DOCUMENTS

| | | | |
|---|---|---|---|
| 6,256,578 B1 * | 7/2001 | Ito | 701/200 |
| 6,285,924 B1 * | 9/2001 | Okamoto et al. | 701/1 |
| 6,349,408 B1 | 2/2002 | Smith | |
| 6,512,968 B1 * | 1/2003 | de Bellefeuille et al. | 701/33 |
| 6,587,759 B2 * | 7/2003 | Obradovich et al. | 701/1 |
| 6,587,786 B1 * | 7/2003 | La Rue | 701/211 |
| 2005/0085955 A1 * | 4/2005 | Beckert et al. | 701/1 |

FOREIGN PATENT DOCUMENTS

| | | |
|---|---|---|
| EP | 0 932 132 A2 | 7/1999 |
| EP | 0 973 011 A2 | 1/2000 |
| EP | 1 024 347 A1 | 8/2000 |

(Continued)

OTHER PUBLICATIONS

Arnold et al, The Java Programming Language—2nd Edition, Mar. 1998, pp. 179-180.*

(Continued)

*Primary Examiner*—William Thomson
*Assistant Examiner*—Diem Ky Cao
(74) *Attorney, Agent, or Firm*—Birch, Stewart, Kolasch & Birch, LLP

(57) ABSTRACT

An on-vehicle multimedia device to be operated by software 16 including an application module group 18 having a plurality of application modules 19 that realizes their respective different functions and an application control module 17 for controlling each of the application modules 19, characterized by the device comprising external hardware which inputs and outputs data to be processed by the software.

24 Claims, 40 Drawing Sheets

FOREIGN PATENT DOCUMENTS

| | | |
|---|---|---|
| JP | 05-061662 | 3/1993 |
| JP | 05-204854 | 8/1993 |
| JP | 6-4313 A | 1/1994 |
| JP | 6-309183 A | 11/1994 |
| JP | 7-244627 A | 9/1995 |
| JP | 8-328877 A | 12/1996 |
| JP | 9-119846 A | 5/1997 |
| JP | 9-244977 A | 9/1997 |
| JP | 10-334033 | 12/1998 |
| JP | 11-500084 | 1/1999 |
| JP | 11-282694 A | 10/1999 |
| JP | 11-312089 A | 11/1999 |
| JP | 2000-10471 A | 1/2000 |
| JP | 2000-29713 A | 2/2000 |
| JP | 2000-181727 A | 6/2000 |
| JP | 2000-339182 A | 12/2000 |
| JP | 2001-56694 A | 2/2001 |
| JP | 2001-56766 A | 2/2001 |
| JP | 2002-517916 A | 6/2002 |
| WO | WO-98/09213 | 3/1998 |
| WO | WO 99/49394 | 9/1999 |
| WO | WO 99/64940 | 12/1999 |
| WO | WO 00/13085 | 3/2000 |

OTHER PUBLICATIONS

IBM, General Programming Concepts: Writing and Debugging Programs, pp. 1.-3.*

Cox et al., 1998, "Scanning the Technology: On the Application of Multimedia Processing to Communications" *Proceedings of the IEEE* 86:5: 755-824.

Lind et al., 1999 "The Newtwork Vehicle - A Glimpse into the Future of Mobile Multi-Media", *IEEE AES Systems Magazine* Sep. vol.: 27-32.

* cited by examiner

VEHICLE-MOUNTED MULTIMEDIA DEVICE

This application is the national phase under 35 U.S.C. § 371 of PCT International Application No. PCT/JP01/02177 which has an International filing date of Mar. 19, 2001, which designated the United States of America.

TECHNICAL FIELD

The present invention relates to an on-vehicle multimedia device that executes navigation service, hypertext browsing, digital audio playback and so on, and that displays a screen for them.

BACK GROUND ART

FIG. 1 is a block diagram to illustrate a software configuration of a conventional on-vehicle multimedia device.

In FIG. 1, reference numeral 110 denotes an application program layer comprising the following: an application program group 111; a user interface 112 that receives an operation from the user, and issues a command for changing a screen and a command for operating an application; a DB dependent portion 113 for accommodating a difference in platform data format and a difference in map disk data format; and an event queue 114 which is provided in order not to unexpectedly leave an event from an external device unprocessed. Reference numeral 120 denotes a library layer that includes a platform dependent portion 121 for accommodating a difference in hardware; reference numeral 130 denotes an OS kernel layer for scheduling a process and a device; reference numeral 140 denotes a device driver layer for operating hardware and peripheral equipment; and reference numeral 150 denotes hardware and peripheral equipment.

In the next place, the operation will be described.

An operation event such as remote control input from the outside is accepted by the device driver layer 140, and is then passed through the OS kernel layer 130. After that, the operation event is saved in the event queue 114. The operation event saved in the event queue 114 is converted into an operation command inside the user interface 112, and is then executed by the application program group 111. In this case, if the execution is accompanied by a change on a screen, the application program group 111 issues a drawing command to the user interface 112, and thereby drawings and an update of the screen are performed.

Subsequently, a process configuration will be described.

The conventional on-vehicle multimedia device operates by means of one process multithreading. A module requiring parallel operation operates by another thread that is different from a main thread including the user interface.

As described above, the conventional on-vehicle multimedia device operates by a single process. Therefore, there are the following problems: if a new function is added to the on-vehicle multimedia device, the whole of which has become large, it is necessary to modify and recompile the whole, resulting in difficulty in adding a new function, which leads to lower working efficiency of compilation and debugging.

In addition, in order to solve the problems, if multiprocessing is merely used and a shell which controls only starting and ending of each process is adopted, only focus change of each application screen can be controlled. Therefore, an operation command is passed to only a focused application, with the result that the operation command is not passed to other applications, thereby it produces a malfunction.

The present invention has been made in order to solve the above described problems, and an object of this invention is to improve working efficiency of compilation and debugging by dividing each application function into separate processes to make it possible to add a new function easily even if the whole on-vehicle multimedia device becomes large.

Another object of this invention is to allow an application control module to manage input and output so as to add easily an application module on a function basis without performing a special event processing for each application module, thereby improving efficiency of development of the on-vehicle multimedia device.

Moreover, other object of this invention is to gather functions common to all applications into a common library, and use this, thereby decreasing the size of each module, and improving working efficiency when developing and debugging a common function.

Still further, other object of the present invention is to make it possible to add and replace a module freely if the module is an application control module having a common communication interface, or if the module is an application module having a common communication interface.

DISCLOSURE OF INVENTION

An on-vehicle multimedia device according to the present invention is configured to be operated by software including an application module group having a plurality of application modules that realizes their respective different functions, and an application control module for controlling each of the application modules, wherein said device comprising external hardware which inputs and outputs data to be processed by the software.

With this configuration, the application control module and the application modules can be developed and tested independently, which produces the following effects: working efficiency of compilation and debugging can be improved; and a new function of the on-vehicle multimedia device can be added easily.

The on-vehicle multimedia device according to the present invention is characterized in that each of the application control module and the application module operate in a protected separate process space.

This produces the following effects: data are not destroyed by other modules during operation; names of variables, functions and so on in source codes can be overlapped with those used in other modules; each module can be developed and tested easily; and a new function of the on-vehicle multimedia device can be added easily.

The on-vehicle multimedia device according to the present invention is characterized in that the application module group includes, as one of the application modules, an external input/output control module for inputting data from and outputting data to the external hardware.

With this configuration, it is possible to cope with a change in specifications of the external hardware by changing only the external input/output control module and it produces the effects that allows the on-vehicle multimedia device to be developed more efficiently.

The on-vehicle multimedia device according to the present invention is characterized by that the application control module analyzes data from the external hardware, and then delivers the data to an application module or an application control module corresponding to the result of the analysis.

This produces the following effects: even if a change of the external hardware is happened, it is possible to cope with the change by changing only the application control module; the application module can be developed without being conscious of specifications of the external hardware; and efficiency of compilation and debugging can be improved.

The on-vehicle multimedia device according to the present invention is characterized by that the application control module controls starting and ending of each application module.

This produces the following effects: the application module is not executed unnecessarily, which avoids wasteful utilization of resources during operation of the on-vehicle multimedia device.

The on-vehicle multimedia device according to the present invention is configured to include a voice recognition portion for analyzing audio data input into the external hardware.

As a result, it produces an effect that audio data can be exchanged between the on-vehicle multimedia device and a user.

The on-vehicle multimedia device according to the present invention is configured to include a text speaking portion which analyzes text data from the application module to read the analyzed text data aloud by the external hardware.

As a result, it produces an effect that audio data can be exchanged between the on-vehicle multimedia device and a user.

In the on-vehicle multimedia device according to the present invention, the application control module is configured to include a state transition detecting portion for detecting state transition of the application module, and when receiving data used for the application module, the application control module detects a command acceptable state of the application module using the state transition detecting portion and then delivers the data.

This produces the following effects: it is possible to develop the application module with a smaller amount of labor, which enables improvement in efficiency of compilation and debugging.

In the on-vehicle multimedia device according to the present invention, the application control module is configured to include a state transition detecting portion for detecting state transition of the application module; a command interpreting portion for interpreting input data; and a command converting portion that converts the data which has been interpreted by the command interpreting portion into data used for the corresponding application module before transmitting the converted data.

With this configuration, the following effects are produced: the application module can be developed without being conscious of correspondence of input data with operation of the application module, which enables to compile and debug the application module more efficiently; and even if specifications of the external hardware have been changed, it is possible to cope with the change by changing only the application control module.

The on-vehicle multimedia device according to the present invention is characterized by that the application control module judges whether or not the application module is started, and starts the application module before delivering data.

As a result, the following effects are produced: the application module can be developed without being conscious of whether or not data are required; and because existence of the application module is judged before data are transmitted, unnecessary command data are not transmitted during operation of the on-vehicle multimedia device.

In the on-vehicle multimedia device according to the present invention, the application control module is configured to include a communication interface portion for communicating with each application module; and an application control module application portion in which a function of the application control module is realized.

Accordingly, if a function of the application control module is changed, it is possible to cope with the change by changing only the application control module application portion, enabling to develop the on-vehicle multimedia device more efficiently, which are produced effects of the present invention.

In the on-vehicle multimedia device according to the present invention, the application module is configured to include a communication interface portion for communicating with the application control module or each of the other application modules; and an application module application portion that makes the application modules execute respective individual functions.

Accordingly, even if new function is added to the application module, it is possible to cope with the addition by changing only the application module application portion, enabling to develop the on-vehicle multimedia device more efficiently, which are produced effects.

The on-vehicle multimedia device according to the present invention is characterized by that the application control module and the application module include, in common, a common communication interface portion for mutual communication.

This enables to add a new application module to the on-vehicle multimedia device easily, which is a produced effect.

The on-vehicle multimedia device according to the present invention is characterized by that the application control module reads an application module, which is a target of read command data, into a main memory.

As a result, new function of the on-vehicle multimedia device can be added easily, which is a produced effect.

The on-vehicle multimedia device according to the present invention is characterized by that the application control module deletes the application module, which is a target of delete command data, from the main memory.

As a result, a function of the on-vehicle multimedia device can be deleted easily, which is a produced effect.

The on-vehicle multimedia device according to the present invention is characterized by that the application module saves an internal state and data of the application module before they are deleted by the application control module.

This produces the following effects: the application module can be initialized earlier at the time of the next starting; and the application module can be started from the last ending state.

The on-vehicle multimedia device according to the present invention is configured to include an application replacing portion for reading an application module as a target of read command data into the main memory, or for deleting an application module as a target of delete command data from the main memory.

Accordingly, the following effects are produced: a function of the on-vehicle multimedia device can be added or deleted easily; a load of the application control module can be reduced; and a memory resource and an I/O resource can be saved.

The on-vehicle multimedia device according to the present invention is characterized by that the application control module and the application module operate in parallel.

Accordingly, each module can be independently developed easily, enabling improvement in efficiency of development of the on-vehicle multimedia device, which are produced effects.

The on-vehicle multimedia device according to the present invention is configured to include a library group constituted of a plurality of libraries, each of which realizes a plurality of functions common to the application control module and all of the application modules; and wherein the application control module and each of the application modules read library from the library group.

Accordingly, the following effects are produced: the quantity of developed codes of the application module can be reduced, which enables to develop the on-vehicle multimedia device more efficiently; and working efficiency of development and debugging of the common functions can be improved.

The on-vehicle multimedia device according to the present invention is characterized by that the library group has an interface which is common to all libraries.

Accordingly, the application control module and each application module can read a library using the same steps, which is a produced effect.

The on-vehicle multimedia device according to the present invention is characterized by that the external input/output control module includes an external input/output library for controlling data input from and output to the external hardware.

Accordingly, a load of the application control module can be reduced, which is a produced effect.

The on-vehicle multimedia device according to the present invention is characterized by that each of the application modules includes: a drawing library for performing drawing on the external hardware; and an external input/output library for controlling data input from and output to the external hardware.

Accordingly, a load of the application control module can be reduced, which is a produced effect.

The on-vehicle multimedia device according to the present invention is characterized by that the application module group includes, as one of the application modules, a library group constituted of a plurality of libraries, each of which realizes a plurality of functions common to the application control module and all of the application modules.

Accordingly, the following effects are produced: sizes of the application control module and the application module at the time of execution can be reduced; and working efficiency of development and debugging of the common functions can be improved.

The on-vehicle multimedia device according to the present invention is characterized by that in the library group, the same library is simultaneously accessed by a plurality of application modules using the same steps.

This enables a decrease in memory size and link time, which is a produced effect.

The on-vehicle multimedia device according to the present invention is characterized by that the application control module includes a drawing right control portion having functions of, when receiving drawing command data from the application control module or the application module, judging whether or not drawing is possible, and if it is judged that drawing is possible, then performing the drawing on the external hardware.

Accordingly, as produced effects, development of the application module becomes possible without being conscious of whether or not drawing is possible, which enables to develop the on-vehicle multimedia device more efficiently.

The on-vehicle multimedia device according to the present invention is characterized by that the application control module includes an audio output right control portion having functions of, when receiving audio output command data from the application control module or the application module, judging whether or not audio output is possible, and if it is judged that audio output is possible, then outputting audio from the external hardware.

Accordingly, as produced effects, development of the application module becomes possible without being conscious of whether or not audio output is possible, which enables to develop the on-vehicle multimedia device more efficiently.

The on-vehicle multimedia device according to the present invention is characterized by that the application control module includes: a state transition detecting portion having functions of, when receiving drawing right request data from the application control module or the application module, judging whether or not the application control module or the application module can perform drawing, and if it is judged that drawing is possible, issuing drawing possible notification data to the application control module or the application module; and a drawing library for performing drawing on the external hardware according to the drawing command data from the application control module or the application module which has received the drawing possible notification data.

Accordingly, as produced effects, development of the application module becomes possible without being conscious of whether or not drawing is possible, which enables to develop the on-vehicle multimedia device more efficiently.

The on-vehicle multimedia device according to the present invention is characterized by that the application control module includes: a state transition detecting portion having functions of, when receiving audio output right request data from the application control module or the application module, judging whether or not the application control module or the application module can output audio, and if it is judged that audio output is possible, issuing audio output possible notification data to the application control module or the application module; and an audio output library for outputting audio from the external hardware according to audio output command data from the application control module or the application module which has received the audio output possible notification data.

Accordingly, as produced effects, development of the application module becomes possible without being conscious of whether or not audio output is possible, which enables to develop the on-vehicle multimedia device more efficiently.

The on-vehicle multimedia device according to the present invention is characterized by further comprising a drawing library having functions of, when receiving drawing command data from the application control module or the application module, judging whether or not drawing is possible, and if it is judged that drawing is possible, performing drawing on the external hardware.

Accordingly, as produced effects, development of each module becomes possible without being conscious of whether or not drawing is possible, which enables to develop the on-vehicle multimedia device more efficiently.

The on-vehicle multimedia device according to the present invention is configured to include an audio output library having functions of, when receiving audio output command data from the application control module or the application module, judging whether or not audio output is possible, and if it is judged that audio output is possible, outputting audio from the external hardware.

Accordingly, as produced effects, development of each module becomes possible without being conscious of whether or not audio output is possible, which enables to develop the on-vehicle multimedia device more efficiently.

The on-vehicle multimedia device according to the present invention is characterized by that the application control module includes: a drawing control portion for performing drawing on the external hardware; and a screen data portion for storing screen data required for the drawing.

Accordingly, the following effects are produced: a graphic user interface of the application control module can be created independently from other functions in the application control module, which enables to develop the on-vehicle multimedia device more efficiently.

The on-vehicle multimedia device according to the present invention is characterized by that the application module includes: a drawing control portion for performing drawing on the external hardware; and a screen data portion for storing screen data required for the drawing.

Accordingly, the following effects are produced: a graphic user interface of the application module can be created independently from other functions in the application module, which enables to develop the on-vehicle multimedia device more efficiently.

BEST MODE FOR CARRYING OUT THE INVENTION

For the purpose of describing the present invention in more detail, best modes for carrying out the invention will be described below with reference to the accompanying drawings.

First Embodiment

Figure 1:
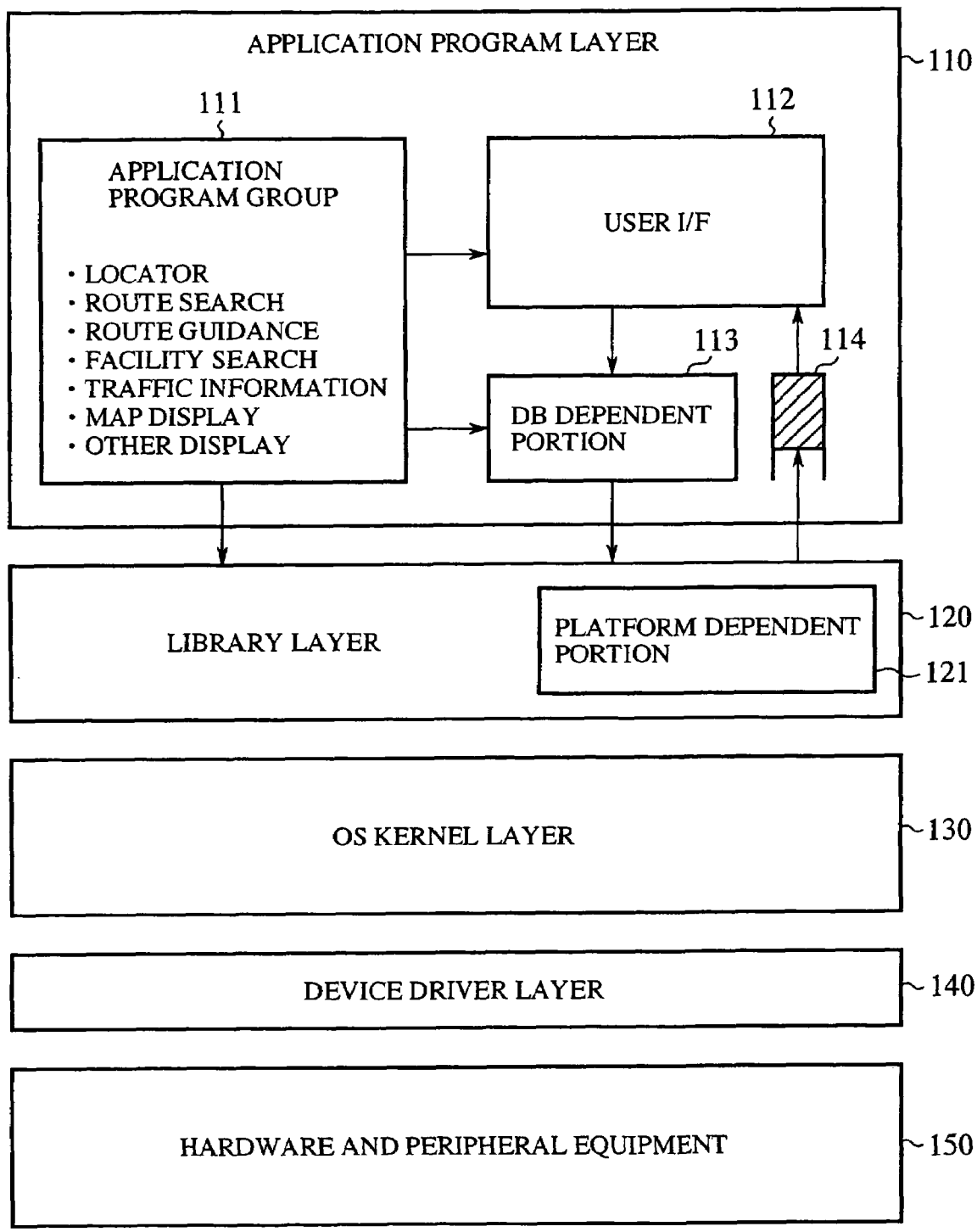
FIG. 1 is a block diagram to illustrate a software configuration of a conventional on-vehicle multimedia device.
Figure 2:
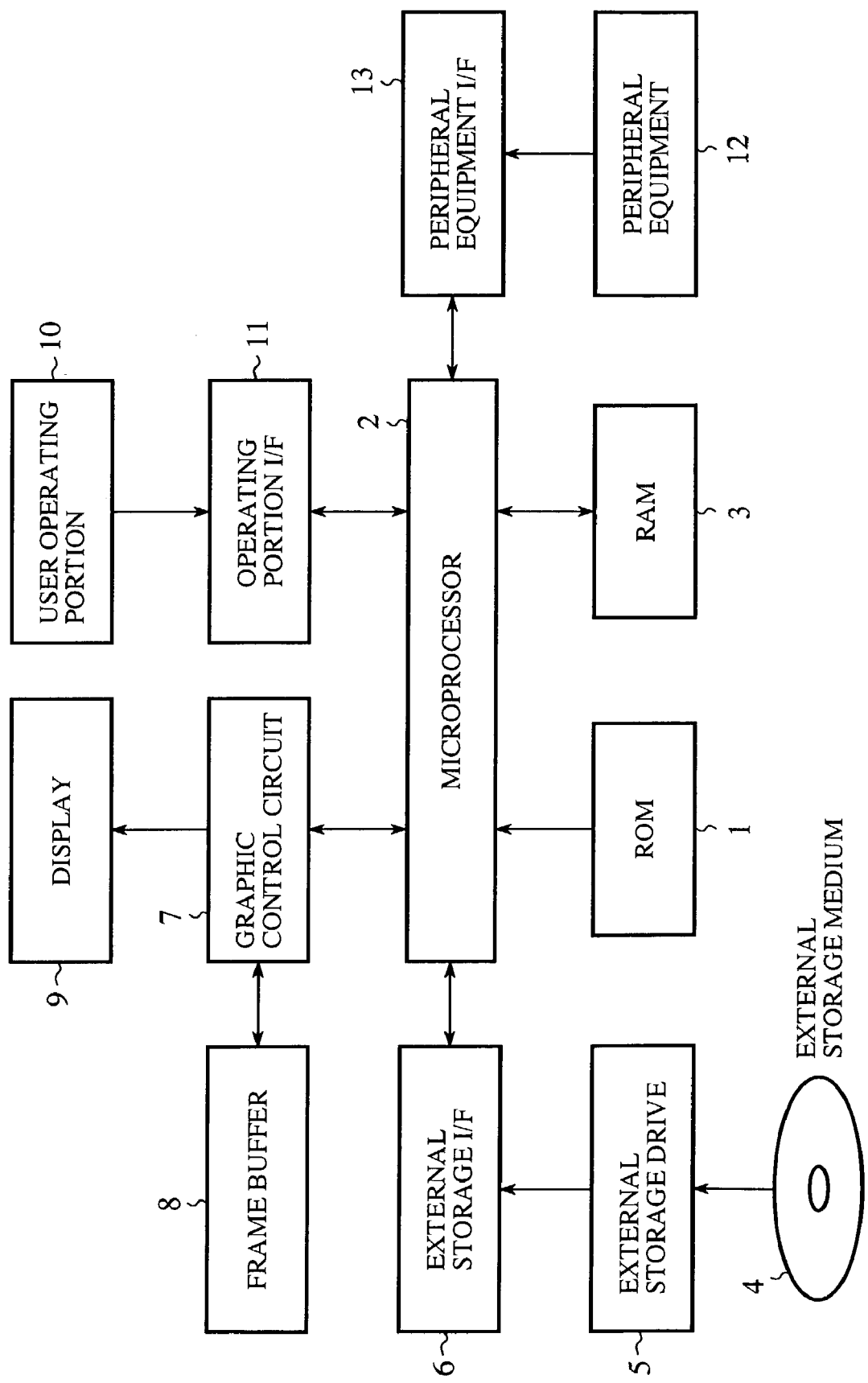
FIG. 2 is a block diagram to illustrate a hardware configuration of an on-vehicle multimedia device according to a first embodiment of the present invention.

FIG. 2 is a block diagram to illustrate a hardware configuration of an on-vehicle multimedia device according to a first embodiment of the present invention.

In FIG. 2, reference numeral 1 denotes a ROM in which programs including an application controlling module, and an application module group described below is written beforehand; 2 denotes a microprocessor for executing the programs including the application control module and the application module group; and 3 denotes a RAM in which data and the programs including the application control module, and the application module group are temporarily stored at the time of executing the programs.

In addition, in FIG. 2, reference numeral 4 denotes an external storage medium in which a geographical database, and the like, are stored beforehand; 5 denotes an external storage drive that starts the external storage medium 4 and reads data; and 6 denotes an external storage interface (external storage I/F) that sends and receives data between the external storage drive 5 and the microprocessor 2. The external storage medium 4 includes a DVD-ROM, a CD-ROM, a memory card, a MD (minidisk) and the like. Besides, a hard disk and the like are provided.

Incidentally, the programs including the application control module and the application module group may also be stored beforehand not in the ROM 1 but in the external storage medium 4 in order to read these programs from the external storage medium 4 for use.

In addition, only an external input/output control module and a library described later and the application control module may be stored in the ROM 1, while other application modules are stored in the external storage medium 4, before these are read for use.

Moreover, in FIG. 2, reference numeral 7 denotes a graphic control circuit where in response to image data and drawing command data from the microprocessor 2, the image data are stored in a frame buffer 8 to draw the image data in a display 9 such as a liquid crystal display. Reference numeral 10 denotes a user operating portion such as a remote controller and various switches; and 11 denotes an operating portion interface (operating portion I/F) for sending and receiving data between the user operating portion 10 and the microprocessor 2.

Further, in FIG. 2, reference numeral 12 denotes peripheral equipment that includes a device used for car navigation such as a GPS receiver, a vehicle speed pulse sensor and a gyrocompass. As the peripheral equipment, the following are provided: the GPS receiver for obtaining position data of an own car; the vehicle speed pulse sensor for obtaining speed data of an own car; a gyrocompass for obtaining a direction of an own car; a speaker for outputting voice guidance and its drive circuit; and an FM multiplex broadcasting receiver, radio beacon/light beacon receivers, a cellular phone, and the like, which communicate with an outside infrastructure. Reference numeral 13 denotes a peripheral equipment interface (peripheral equipment I/F) for sending and receiving data between the peripheral equipment 12 and the microprocessor 2.

Figure 3:
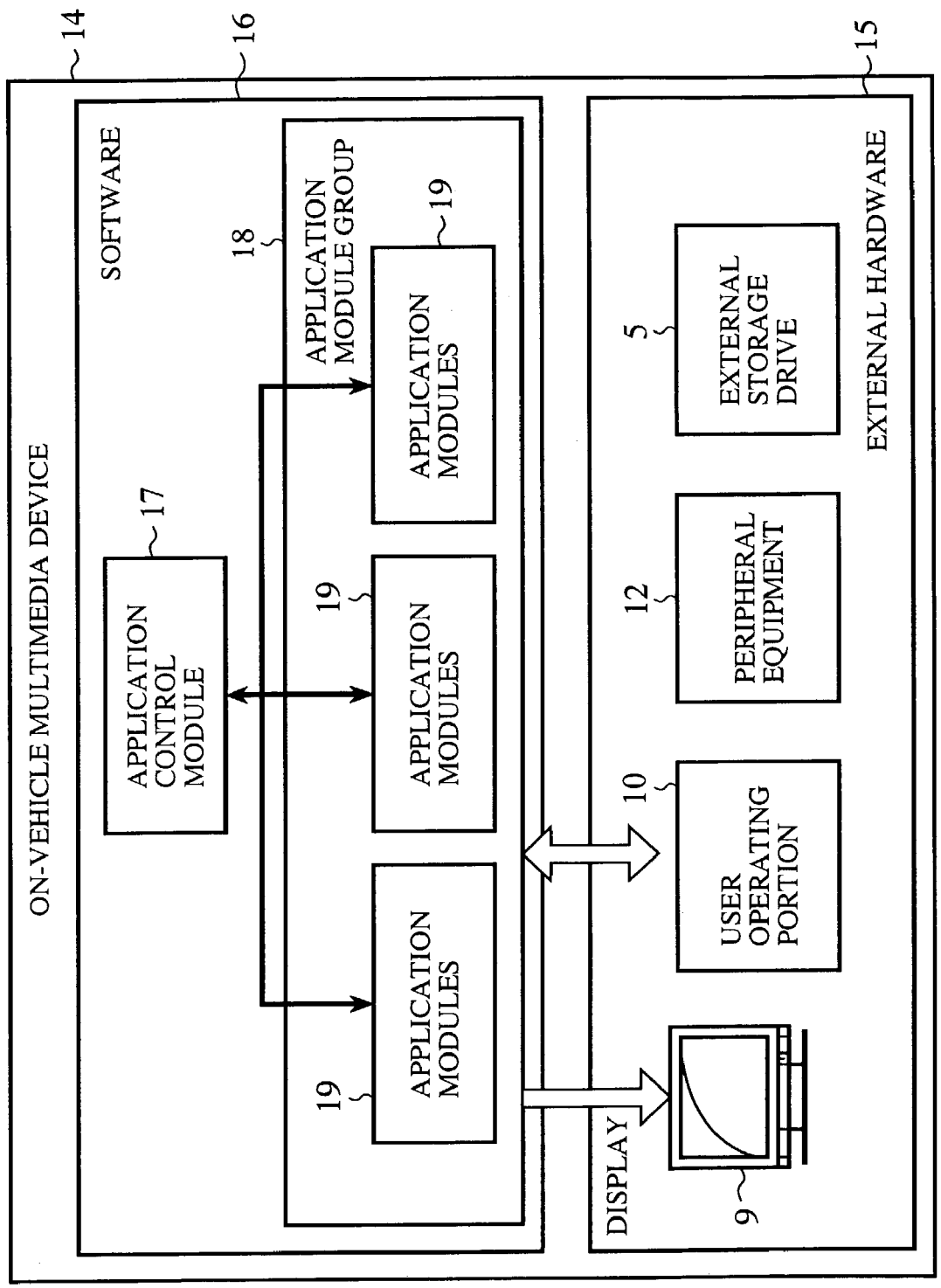
FIG. 3 is a diagram to hierarchically illustrate a configuration of the on-vehicle multimedia device according the first embodiment of the present invention.

FIG. 3 is a diagram hierarchically to illustrate a configuration of the on-vehicle multimedia device according the first embodiment of the present invention. Configurations that are like or equivalent to those shown in FIG. 2 are designated by the same reference numerals.

In FIG. 3, reference numeral 14 denotes the on-vehicle multimedia device; 15 denotes external hardware of the on-vehicle multimedia device 14; and 16 denotes the whole software of the on-vehicle multimedia device 14.

The external hardware 15 is connected to the on-vehicle multimedia device 14. A user gives digital data and command data to the software 16 using the external hardware 15. Data from the software 16 is output from the external hardware 15 to the user. The external storage drive 5, a display screen 8, the user operating portion 10, the peripheral equipment 12 are equivalent to the external hardware 15.

In addition, the software 16 includes an application control module 17, and an application module group 18 comprising a plurality of application modules 19 other than the application control module 17. Each of the application modules 19 realizes a peculiar function by an individual process. The application modules 19 are controlled by the application control module 17, a process of which is different from the application modules 19.

Figure 4:
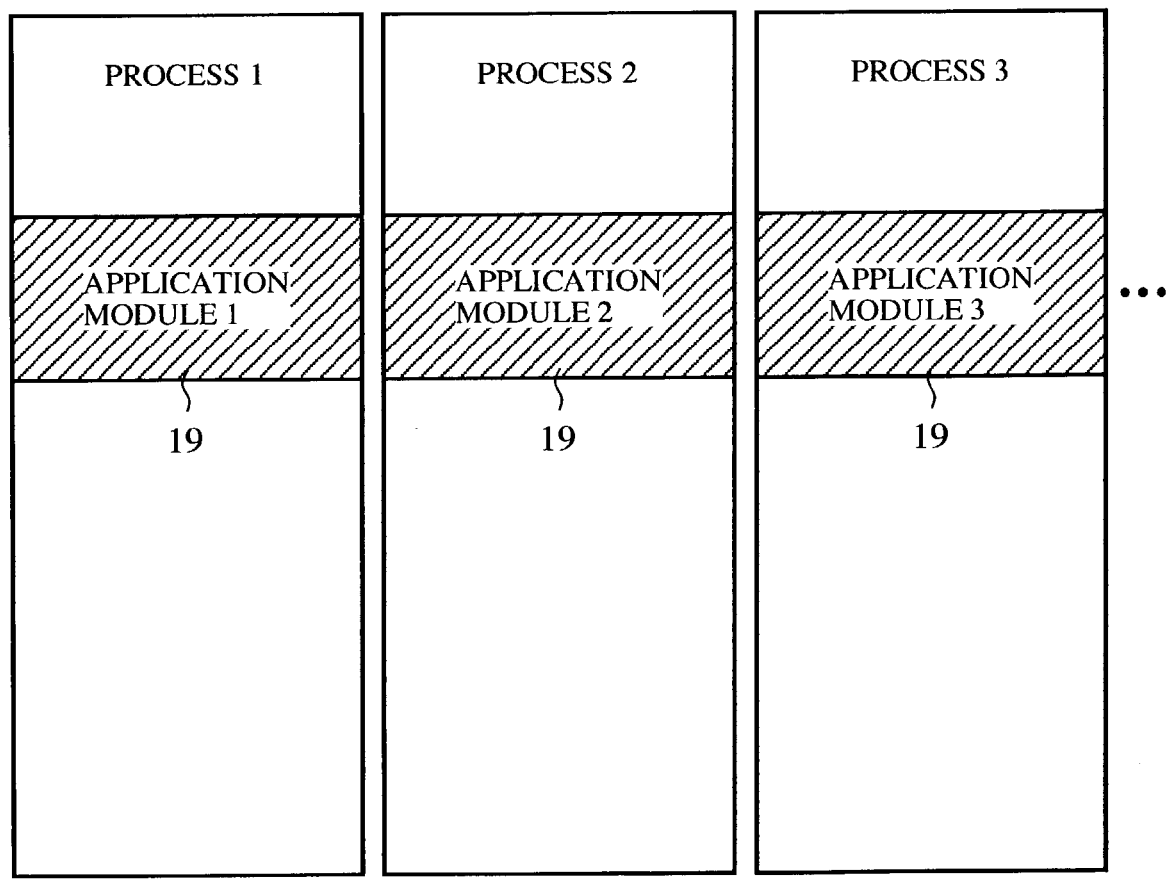
FIG. 4 is a diagram to illustrate an operating state of the on-vehicle multimedia device according to the first embodiment of the present invention.

FIG. 4 is a diagram to illustrate an operating state of the on-vehicle multimedia device according to the first embodiment of the present invention.

Application modules 1, 2, and 3 that are designated by reference numeral 19 operate as processes 1, 2, and 3, respectively. In this case, the process means both a program and its running state. The running state includes values of all variables, a hardware state and an address space. The process cannot refer to address spaces of other processes directly. Assignment of a name when compiling a program is performed for each process.

Figure 5:
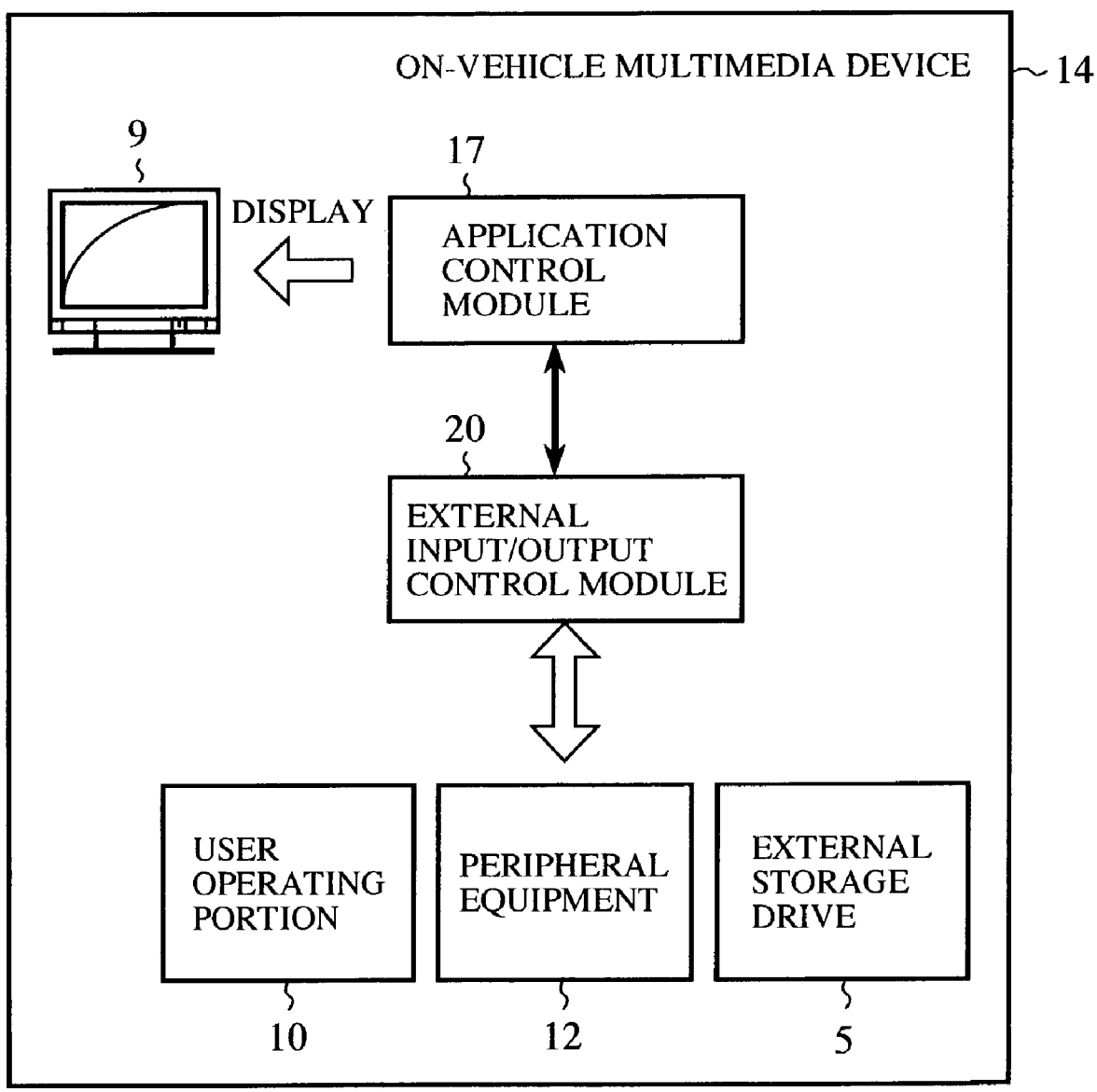
FIG. 5 is a diagram to illustrate a minimum configuration of the on-vehicle multimedia device according to the first embodiment of the present invention.

FIG. 5 is a diagram to illustrate a minimum configuration of the on-vehicle multimedia device according to the first embodiment of the present invention. Only the application control module 17 and the external input/output control module 20 constitute the minimum configuration of the on-vehicle multimedia device. The external input/output control module 20 is one of the application modules 19 shown in FIG. 3. The external input/output control module 20 receives input data from a user by the peripheral equipment 12 of the external hardware 15, and then performs required processing. After that, the external input/output control module 20 transmits drawing command data to the application control module 17, for example. The application control module 17 performs a screen display on the display 9.

Figure 6:
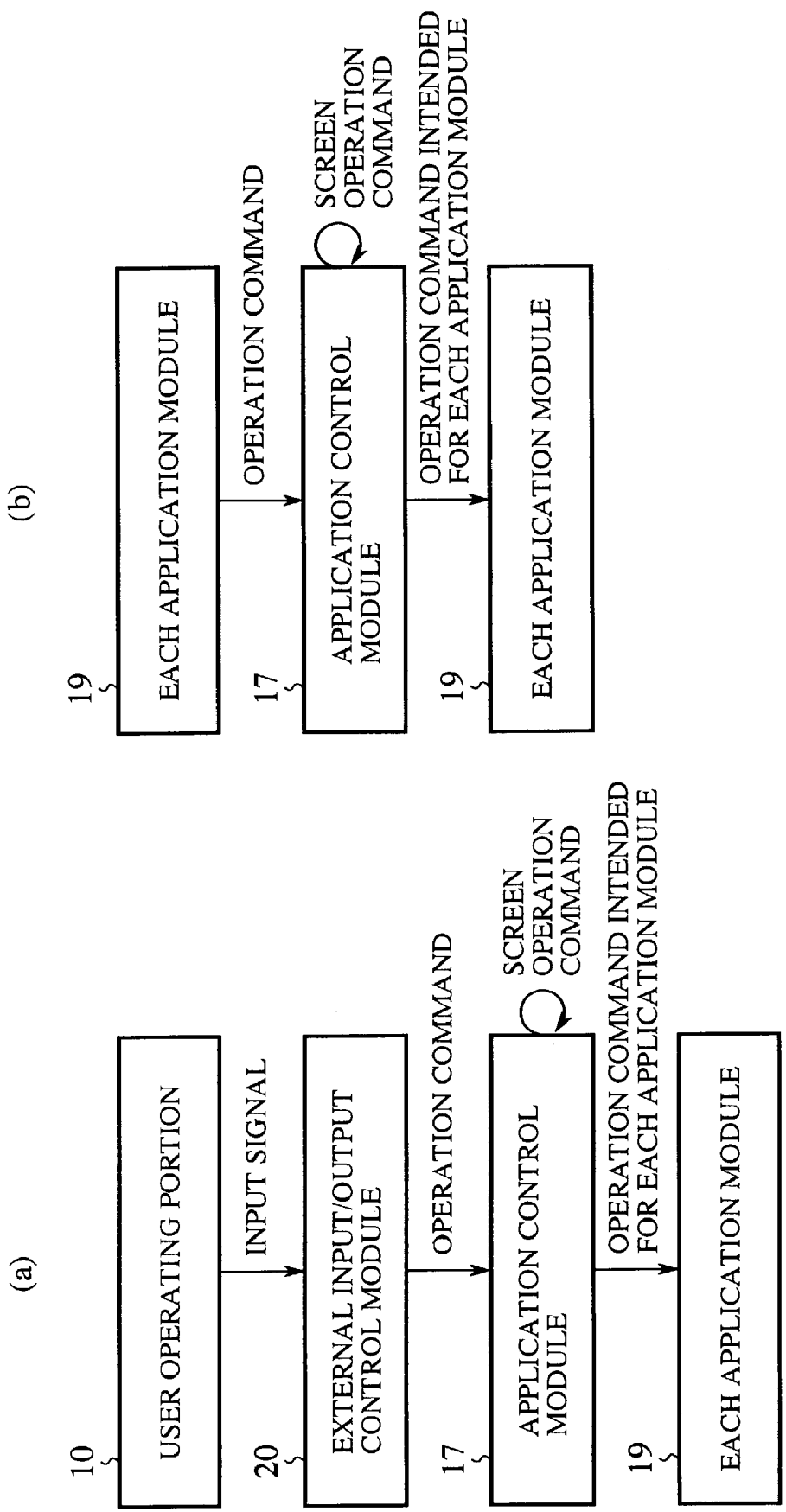
FIG. 6 is a diagram to illustrate an operation of the on-vehicle multimedia device according to the first embodiment of the present invention.

FIG. 6 is a diagram to illustrate the operation of the on-vehicle multimedia device according to the first embodiment of the present invention. With reference to FIGS. 2 through 6, the operation of the on-vehicle multimedia device will be described.

In FIG. 6A, to begin with, input data (input signal) including numeric data and command data, which have been input from the user operating portion 10, is received by the external input/output control module 20 through the operating portion interface 11. Then, the input data are converted into operation command data. The converted operation command data are transferred from the external input/output control module 20 to the application control module 17. The application control module 17 analyzes the received operation command data, and then performs processing according to the results of the analysis. It is to be noted that the input data may also be transmitted to the control module just as it is without being converted into operation command data by the external input/output control module 20.

For example, when receiving drawing command data of the display 9, the application control module 17 performs drawing on the display 9. In addition, in the case of operation command data intended for an individual application module 19 other than this, the application control module 17 delivers the operation command data to the individual application module 19 corresponding to the operation command data.

In response to a kind of the operation command data delivered by the application control module 17, the application module 19 executes various kinds of operation (FIG. 6B).

For example, when performing drawing, the application module 19 transmits screen operation command data to the application control module 17, and then the application control module 17 performs screen processing on the display 9. Moreover, when operating another application module 19, operation command data are delivered from the application module 19 to the application control module 17. After that, the application control module 17 judges the appropriate application module 19 corresponding to the operation command data, and then delivers the operation command data.

The external input/output control module 20 exchanges data with the external storage interface 6, the operating portion interface 11, and the peripheral equipment interface 13 to receive all data from the external storage drive 5, the user operating portion 10, and the peripheral equipment 12. The input data from these external input/output devices is converted into operation command data, and is then transmitted to the application control module 17.

In addition, when each application module 19 outputs data to the external storage drive 5, the user operating portion 10, the peripheral equipment 12, or the like, the application module 19 transmits operation command data to the external input/output control module 20 first of all. Then, the operation command data are transmitted from the external input/output control module 20 to the external storage drive 5, the user operating portion 10, the peripheral equipment 12, or the like.

Examples of the application modules 19 will be described below.

<Car Navigation Function>

Figure 7:
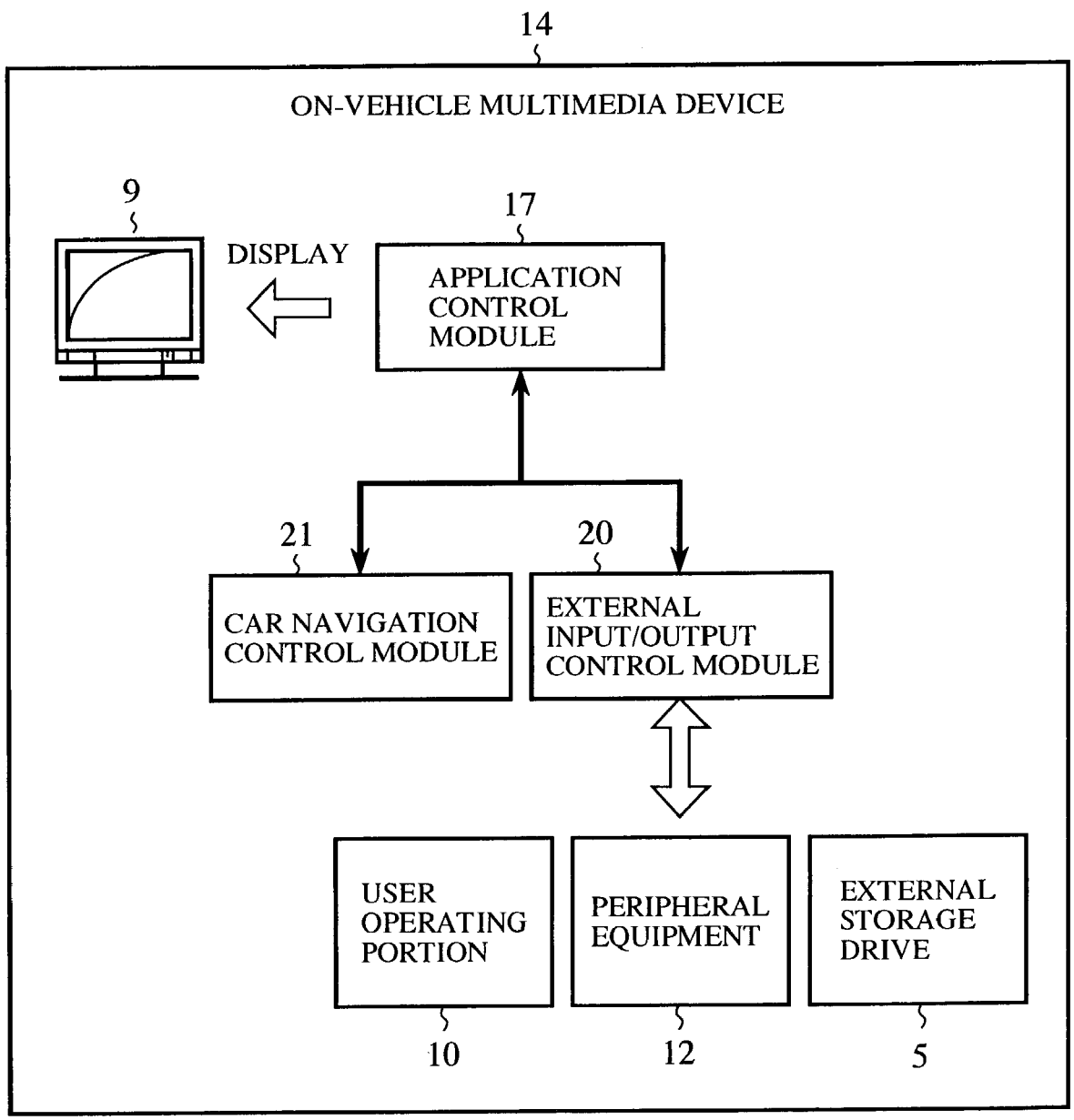
FIG. 7 is a diagram to illustrate a configuration example of an on-vehicle multimedia device.

FIG. 7 is a diagram to illustrate a configuration example of the on-vehicle multimedia device 14. In FIG. 7, a car navigation control module 21 implementing a car navigation function is added to the minimum configuration in FIG. 5. Configurations that are like or equivalent to those shown in FIG. 5 are designated by the same reference numerals. The car navigation control module 21 is an example of the application module 19.

The operation of the car navigation control module 21 will be described below.

External data of GPS, gyrocompass, vehicle speed and so on, which has been obtained from the peripheral equipment 12 by the external input/output control module 20, is temporarily transmitted to the application control module 17. The application control module 17 analyzes the external data, and then transmits it to a corresponding car navigation control module 21.

The car navigation control module 21 receives the external data, and then converts the external data into internal command data for operating a car navigation system. After that, on the basis of the internal command data, the car navigation control module 21 executes operation of the car navigation system such as search for route, induction, guidance, and the like.

<Startup Screen Control Function>

Figure 8:
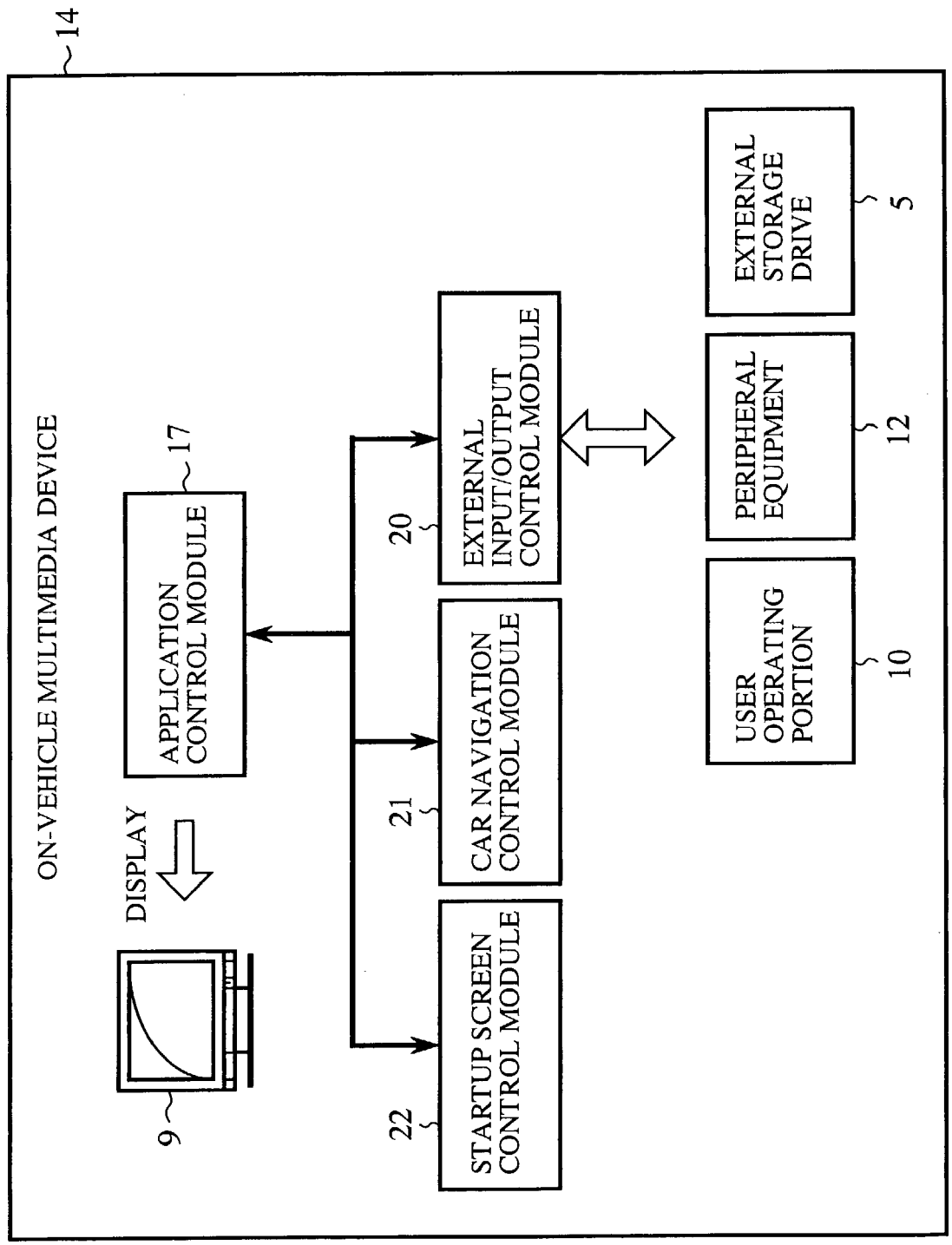
FIG. 8 is a diagram to illustrate a configuration example of an on-vehicle multimedia device.

FIG. 8 is a diagram to illustrate a configuration example of the on-vehicle multimedia device 14. In FIG. 8, a startup screen control module 22 implementing a startup screen control function is added to the minimum configuration in FIG. 5. Configurations that are like or equivalent to those shown in FIG. 7 are designated by the same reference numerals. The startup screen control module 22 is an example of the application module 19.

The operation of the startup screen control module 22 will be described below.

When the power of the on-vehicle multimedia device 14 is turned on, each of the application modules 19 such as the application control module 17 and the car navigation control module 21 requires time for initialization at the time of startup. Therefore, after the power on, it takes time until a startup screen of the display 9 is displayed. The startup screen control module 22 starts before initialization of the application control module 17 and each application module 19 is completed, and occupies the display 9 temporarily to display the startup screen.

When the initialization of the application control module 17 and each application module 19 has been completed, the application control module 17 manages assignment of screen operation right of the display 9. In a state in which another application module 19 is allowed to operate, control is transferred from the startup screen by the startup screen control module 22 to another application modules 19.

Until the initialization of the application control module 17 and each application module 19 is completed, the startup screen is controlled by the startup screen control module 22. Therefore, it is possible to eliminate screen display meaningless for a user of the on-vehicle multimedia device 14. In other words, a user can be provided with some screen display during initialization, which permits a startup screen to be utilized effectively.

<Hypertext Browsing Function>

Figure 9:
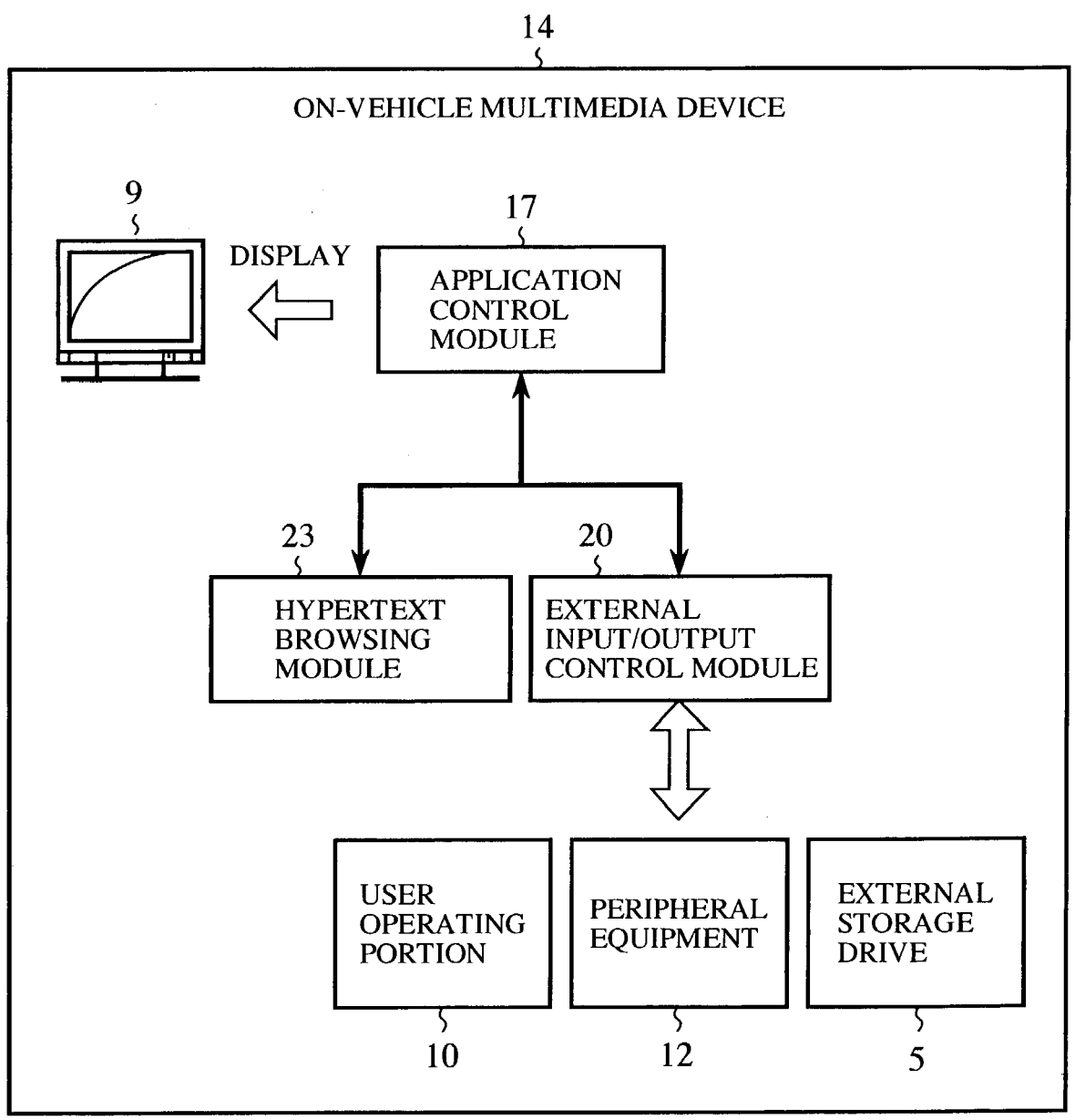
FIG. 9 is a diagram to illustrate a configuration example of an on-vehicle multimedia device.

FIG. 9 is a diagram to illustrate a configuration example of the on-vehicle multimedia device 14. In FIG. 9, a hypertext browsing module 23 implementing a hypertext browsing function is added to the minimum configuration in FIG. 5. Configurations which are like or equivalent to those shown in FIG. 5 are designated by the same reference numerals. The hypertext browsing module 23 is an example of the application module 19.

The operation of the hypertext browsing module 23 will be described below.

Data input from the user operating portion 10 is received by the external input/output control module 20, and is then passed to the application control module 17. If the received data does not relate to screen operation, and if an application module 19 which is currently in focus is the hypertext browsing module 23, the application control module 17 delivers data to the hypertext browsing module 23.

In addition, when command data for hypertext browsing is received from another application module 19, the application control module 17 sends a request for hypertext information to the external input/output control module 20, and then displays given hypertext on the display 9.

As a matter of course, the car navigation control module 21 in FIG. 7 or the startup screen control module 22 in FIG. 8 may also be added to the configuration shown in FIG. 9.

<Digital Audio Control Function>

Figure 10:
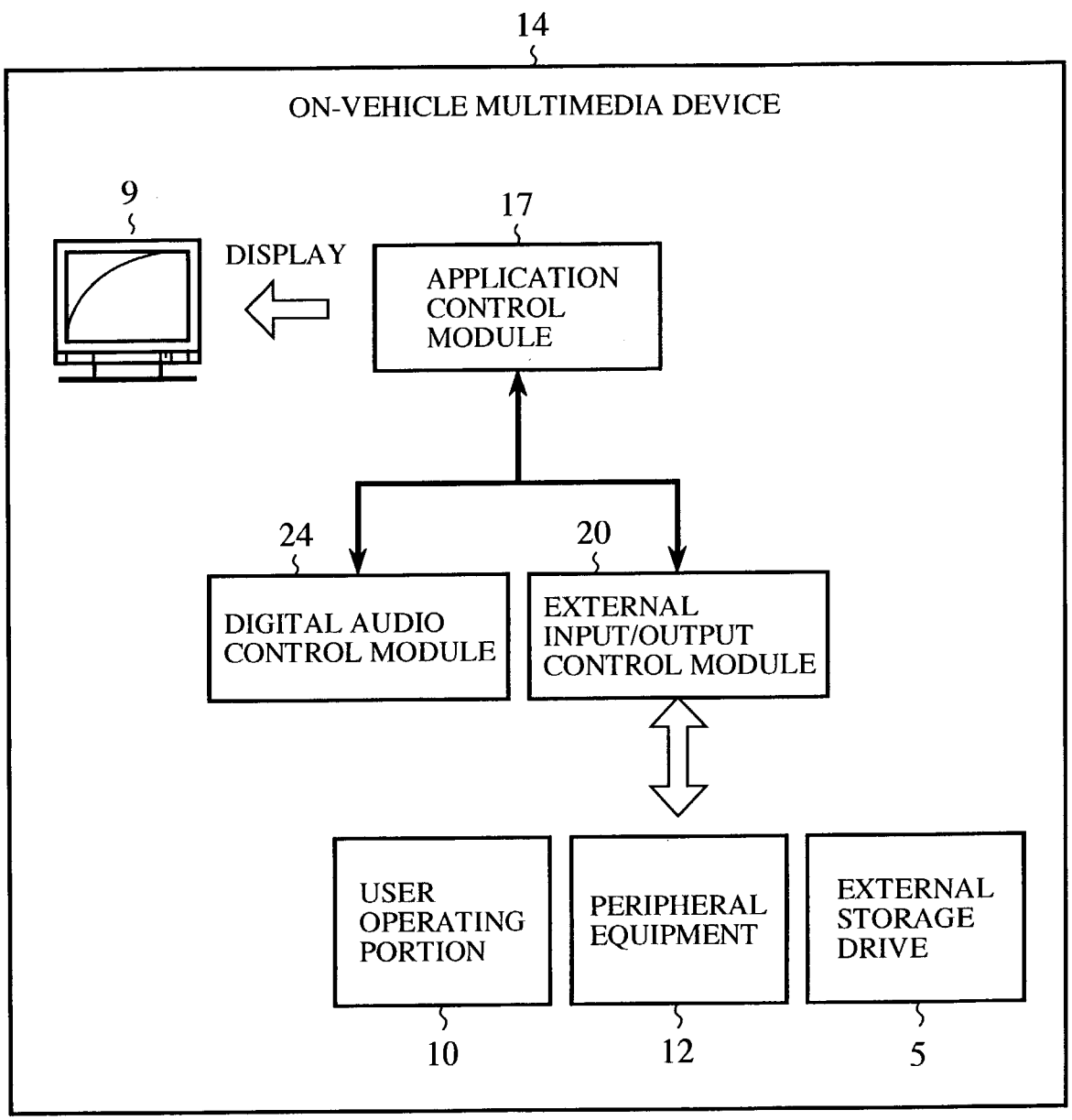
FIG. 10 is a diagram to illustrate a configuration example of an on-vehicle multimedia device.

FIG. 10 is a diagram to illustrate a configuration example of the on-vehicle multimedia device 14. In FIG. 10, a digital audio control module 24 implementing a digital audio control function is added to the minimum configuration in FIG. 5. Configurations which are like or equivalent to those shown in FIG. 5 are designated by the same reference numerals. The digital audio control module 24 is an example of the application module 19.

The operation of the digital audio control module 24 will be described below.

Command data such as playback, stop, forward, rewind, and music selection from another application module 19 or the user operating portion 10 is delivered from the application control module 17 to the digital audio control module 24. The digital audio control module 24 performs operations such as playback, stop, forward, rewind, music selection in response to the delivered command data. Music information which is played back by the digital audio control module 24 is output from, for example, a speaker, which is connected to the peripheral equipment interface 13 via the external input/output control module 20.

As a matter of course, the car navigation control module 21 in FIG. 7, the startup screen control module 22 in FIG. 8, or the hypertext browsing module 23 in FIG. 9 may also be added to the configuration shown in FIG. 10.

<Overall Function>

Figure 11:
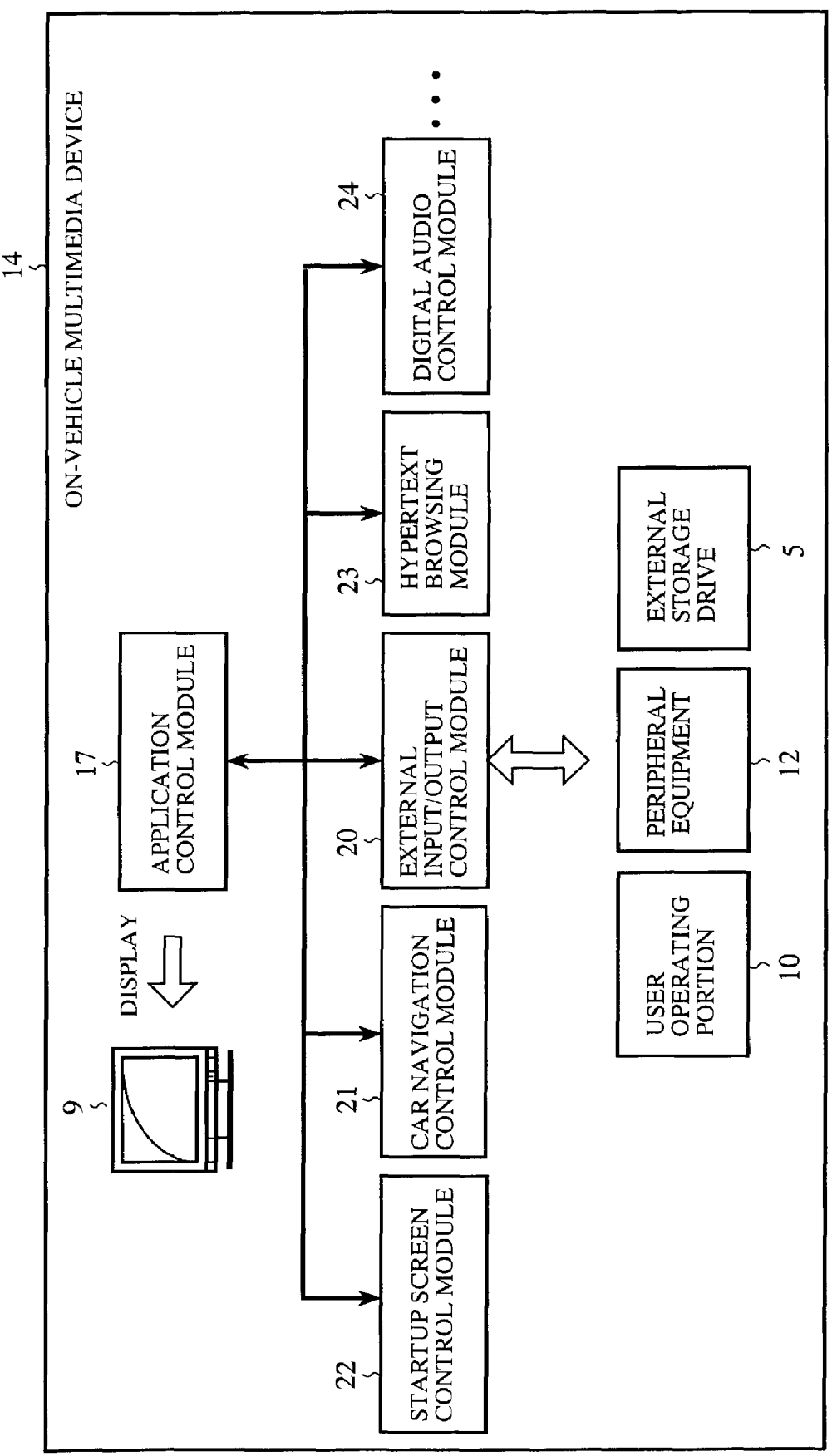
FIG. 11 is a diagram to illustrate a configuration example of an on-vehicle multimedia device.

FIG. 11 is a diagram to illustrate a configuration example of the on-vehicle multimedia device 14. To be more specific, all of the various functions shown in FIGS. 7 through 10 are realized here; and the car navigation control module 21, the startup screen control module 22, the hypertext browsing module 23, and the digital audio control module 24 are added to the minimum configuration shown in FIG. 5.

In this manner, even if two or more kinds of application modules 19 are added, data from the external hardware 15 is exchanged with each of the application modules 19 through the external input/output control module 20; and the data exchange is controlled by the application control module 17.

As described above with reference to FIGS. 7 through 11, the application modules 19 which realize various functions by their respective processes can be added to the minimum configuration shown in FIG. 5. Because the application control module 17 and each of the application modules 19 operate by means of multi processing, it is possible to develop and test the application control module 17 and each of the application modules 19 singly when adding a new function, which is different from the conventional methods.

As a matter of course, the functions of the application modules 19 are not limited to the examples of FIGS. 7 through 11. According to the use of the on-vehicle multimedia device 14, various functions can be realized.

As described above, according to the first embodiment, the on-vehicle multimedia device 14 is devised to operate by the software 16 comprising the following: the application module group 18 including the plurality of application modules 19, each of which realizes a different function; and the application control module 17 for controlling each of the application modules 19. In addition, the on-vehicle multimedia device 14 is configured to include the external hardware 15 for inputting and outputting data which is processed by the software 16. As a result, the application control module 17 and the application modules 19 can be developed and tested singly, which produces the following effects: working efficiency of compilation and debugging can be improved; and a new function of the on-vehicle multimedia device can be added easily.

In addition, according to the first embodiment, it is characterized by that a protected process space in which the application control module 17 operates is separated from a protected process space in which the application modules 19 operate. Therefore, data are not destroyed by other modules during operation, and names of variables, functions and so on in source codes can be overlapped with those used in other modules, which produced the following effects: each module can be developed and tested easily; and a new function of the on-vehicle multimedia device can be added easily.

In addition, according to the first embodiment, the application module group 18 is configured to include, as one of the application modules 19, the external input/output control module 20 for inputting data from and outputting data to the external hardware 15. Accordingly, it is possible to cope with changes in the specifications of the external hardware 15 by changing only the external input/output control module 20. This produces the following effect: the on-vehicle multimedia device 14 can be developed more efficiently.

In addition, according to the first embodiment, the application module group 18 is configured to include, as one of the application modules 19, the car navigation control module 21 which serves a car navigation function. Accordingly, the following effect is produced: a car navigation control function can be added to the on-vehicle multimedia device 14 easily.

In addition, according to the first embodiment, the application module group 18 is configured to include, as one of the application modules 19, the startup screen control module 22 which controls a startup screen until initialization of the application control module 17 and the application modules 19 is completed. Accordingly, the following effect is produced: some screen can be displayed during initialization, which enables a user to use a startup screen effectively.

In addition, according to the first embodiment, the application module group 18 is configured to include, as one of the application modules 19, the hypertext browsing module 23 which serves a hypertext browsing function. Accordingly, the following effect is produced: a hypertext browsing function can be added to the on-vehicle multimedia device 14 easily.

In addition, according to the first embodiment, the application module group 18 is configured to include, as one of the application modules 19, the digital audio control module 24 which serves a digital audio control function. Accordingly, the following effect is produced: a digital audio control function can be added to the on-vehicle multimedia device 14 easily.

Second Embodiment

Figure 12:
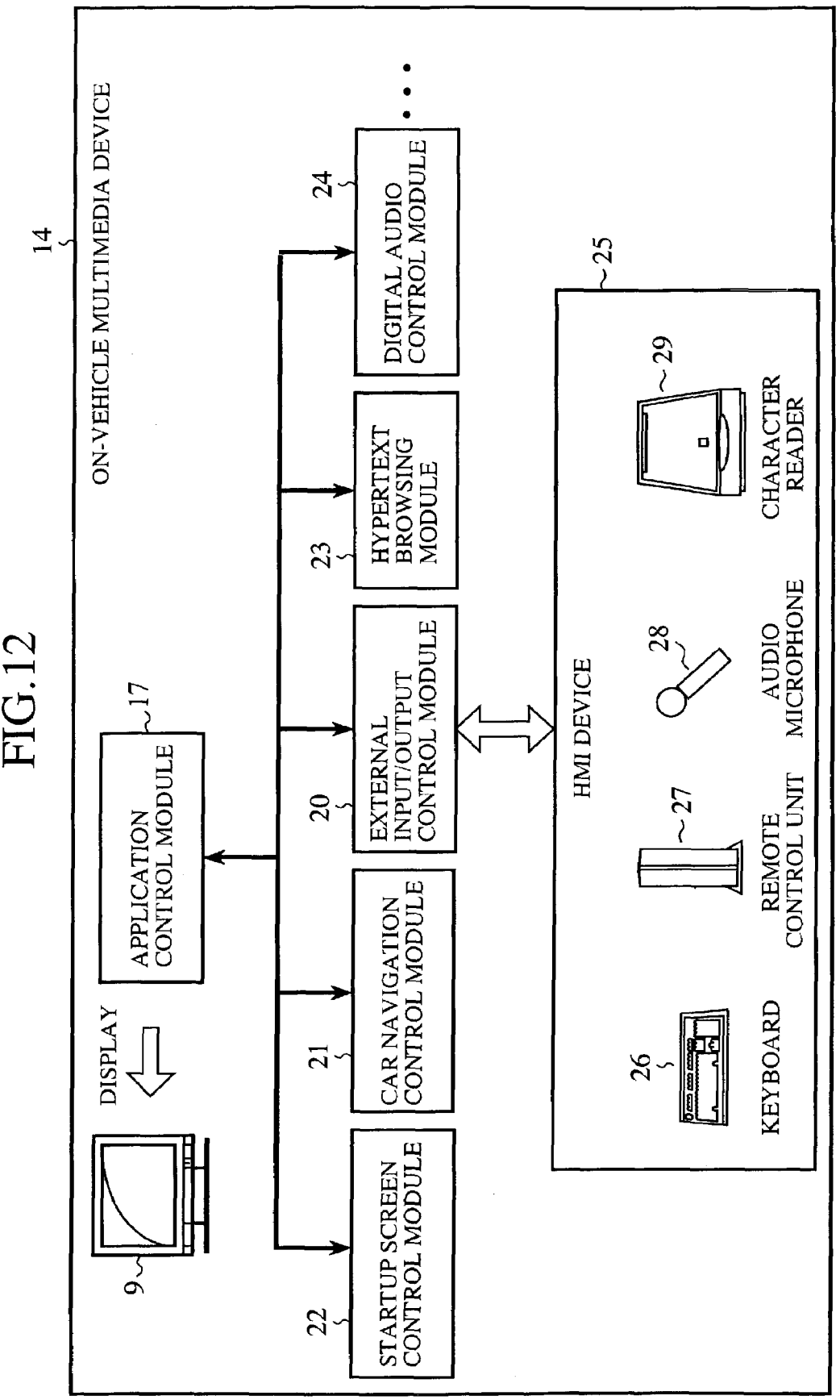
FIG. 12 is a diagram to illustrate a configuration of an on-vehicle multimedia device according to a second embodiment of the present invention.

FIG. 12 is a diagram to illustrate a configuration of an on-vehicle multimedia device according to a second embodiment of the present invention. Configurations which are like or equivalent to those shown in FIG. 11 are designated by the same reference numerals.

In FIG. 12, reference numeral 25 denotes an HMI device for human machine interface; for example, a keyboard 26, a remote control portion 27, an audio microphone 28, and a character reader 29 are illustrated. The HMI device 25 is equivalent to the user operating portion 10 of the external hardware 15.

For example, input data including a key code and a character code, which are input from the keyboard 26, is temporarily transmitted through the external input/output control module 20 to the application control module 17 where the input data are analyzed. Then, the analyzed data are processed in the application control module 17, or is delivered from the application control module 17 to the application module 19.

In addition, in a similar manner, various kinds of input data including a key code, an audio data, and a character code, which are input from the remote control portion 27, the audio microphone 28, and the character reader 29 respectively, is also temporarily transmitted through the external input/output control module 20 to the application control module 17 where the input data are analyzed. Then, the analyzed data are processed in the application control module 17, or is delivered from the application control module 17 to the application module 19.

In this manner, even if a difference in input format of data arises because the HMI device 25 is changed, input data from the HMI device 25 is temporarily transmitted to the application control module 17 through the external input/output control module 20. After that, the application control module 17 analyzes the input data, and then delivers the analyzed data to a corresponding application module 19 or the application control module 17 itself. Therefore, even if the HMI device 25 is changed, it is possible to cope with the change by changing only the application control module 17.

As described above, according to the second embodiment, it is characterized by that the application control module 17 analyzes input data from the HMI device 25 and then delivers the analyzed data to the application module 19 or the application control module 17 itself corresponding to result of the analysis. Accordingly, the following effects are produced: even if the HMI device 25 is changed, it is possible to cope with the change by changing only the application control module 17; and the application modules 19 can be developed without being conscious of specifications of the external hardware 15 such as the HMI device 25, which enables improvement in efficiency of compilation and debugging.

Third Embodiment

In a third embodiment, a case where the application control module 17 controls starting and ending of the application module 19 will be described.

To begin with, how the application control module 17 starts the application module 19 will be described. When receiving input data, which represents a command for starting the application module 19, from a user, the application control module 17 starts the application module 19.

When receiving input data, which represents a command for ending the application module 19, from a user, the application control module 17 ends a corresponding application module 19, and then records this state in which the application module 19 is not operating.

Because the application control module 17 controls starting and ending of the application module 19, it is possible to prevent an application module 19 from being executed unnecessarily, which avoids wasteful utilization of resources during operation of the on-vehicle multimedia device.

As described above, according to the third embodiment, it is characterized by that the application control module 17 controls starting and ending of each application module 19. Accordingly, the following effects are produced: the application module 19 is not executed unnecessarily, which avoids wasteful utilization of resources during operation of the on-vehicle multimedia device.

Fourth Embodiment

Figure 13:
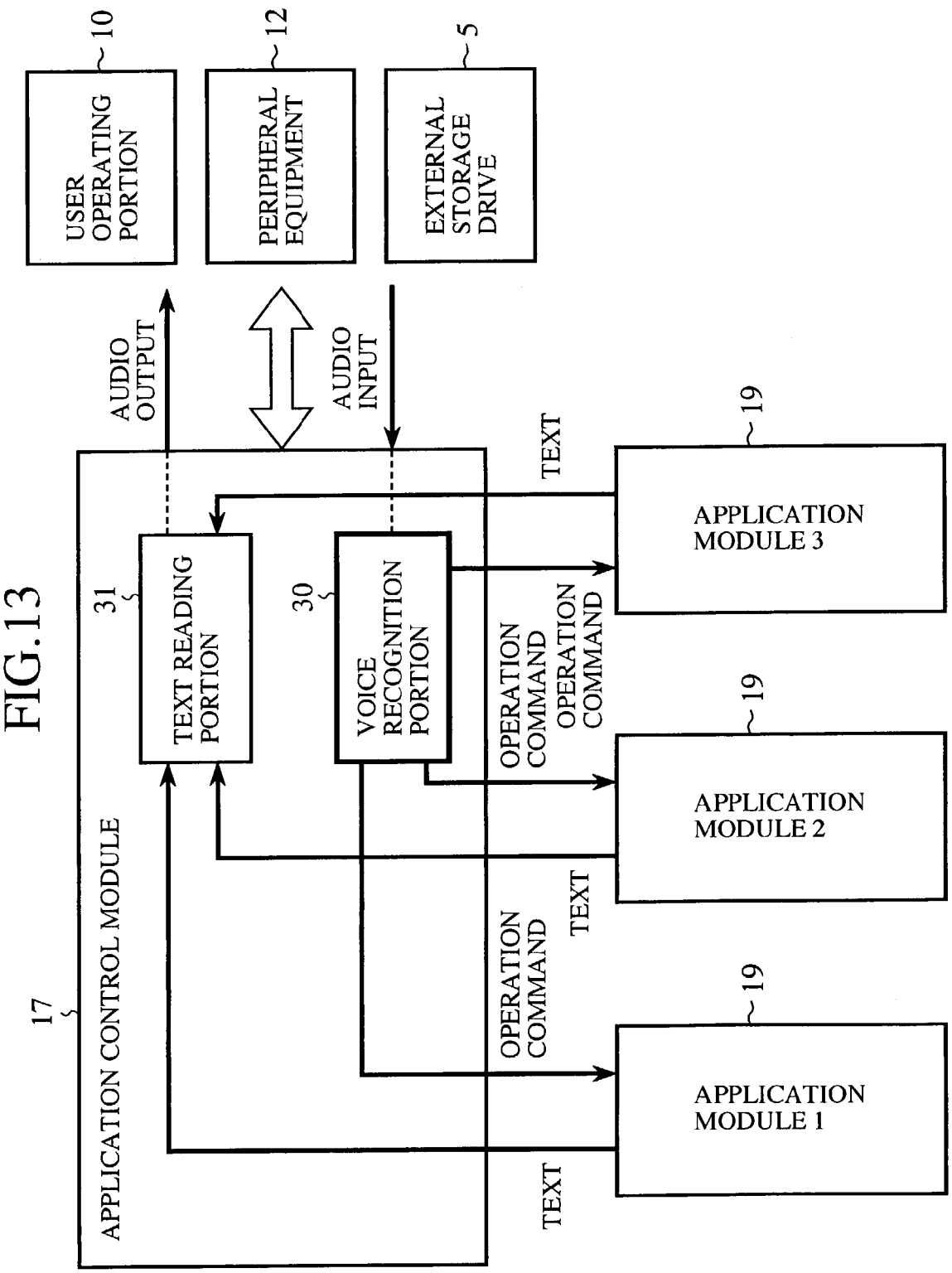
FIG. 13 is a diagram to illustrate a configuration of an on-vehicle multimedia device according to a fourth embodiment of the present invention.

FIG. 13 is a diagram to illustrate a configuration of an on-vehicle multimedia device according to a fourth embodiment of the present invention. Configurations which are like or equivalent to those shown in FIG. 3 are designated by the same reference numerals.

In FIG. 13, reference numeral 30 denotes a voice recognition portion that analyzes audio data (i.e., voice recognition) which has been input from the peripheral equipment 12 through an external input/output control module 20 (not illustrated) to utilize the analyzed data as operation command data for the application module 19, and that analyzes the audio data to convert the analyzed data into text. In addition, reference numeral 31 denotes a text reading portion that performs the following: analyzing text data transmitted from the application module 19 to convert the analyzed text data into audio data; and through the external input/output control module 20 not shown, reading the audio data aloud from a speaker or the like of the external hardware 15 to output the audio data. In FIG. 13, the voice recognition portion 30 and the text reading portion 31 are provided in the application control module 17.

Providing the voice recognition portion 30 and the text reading portion 31 enables audio data exchange between the on-vehicle multimedia device and a user; for example, the voice recognition portion 30 recognizes audio data which has been input from the external hardware 15 to the on-vehicle multimedia device, and then a voice speaking module 31 outputs a voice response from the on-vehicle multimedia device.

It is to be noted that locations of the voice recognition portion 30 and the text speaking portion 31 are not limited to the inside of the application control module 17. The voice recognition portion 30 and the text speaking portion 31 may be integrated into one application module 19; or each of the voice recognition portion 30 and the text speaking portion 31 may also be individually provided as a separate application module 19. In either case, similar effects can be obtained.

As described above, according to the fourth embodiment, the voice recognition portion 30 which analyzes audio data input by the external hardware 15 is provided. This enables audio data exchange between the on-vehicle multimedia device and a user, which is a produced effect.

Moreover, according to the fourth embodiment, the text speaking portion 31 which analyzes text data from the application module 19 to read the analyzed text data aloud by the external hardware 15 is provided. This enables audio data exchange between the on-vehicle multimedia device and a user, which is a produced effect.

Fifth Embodiment

Figure 14:
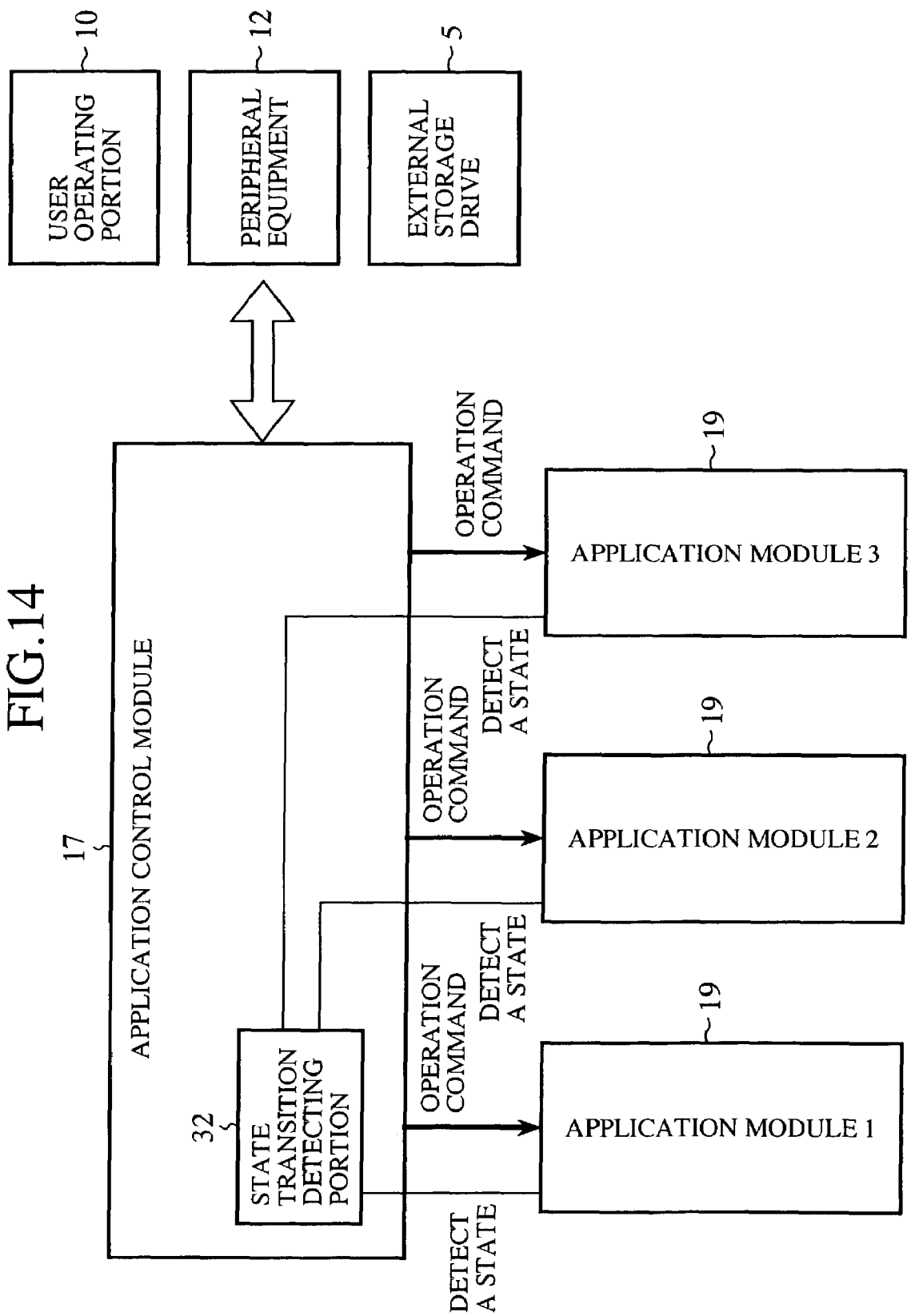
FIG. 14 is a diagram to illustrate a configuration of an on-vehicle multimedia device according to a fifth embodiment of the present invention.

FIG. 14 is a diagram to illustrate a configuration of an on-vehicle multimedia device according to a fifth embodiment of the present invention. Configurations which are like or equivalent to those shown in FIG. 3 are designated by the same reference numerals.

In FIG. 14, reference numeral 32 denotes a state transition detecting portion which is provided in the application control module 17. The state transition detecting portion 32 has a function of detecting state transition of each application module 19.

When receiving operation command data, which is used for the application module 19, from the external hardware 15, the application control module 17 analyzes the received data to identify an application module 19 for which the operation command data are used, and then detects a state of the identified application module 19 using the state transition detecting portion 32.

If the state transition detecting portion 32 detects that the identified application module 19 is in a command acceptable state, the application control module 17 transmits the operation command data to this application module 19.

On the other hand, if the state transition detecting portion 32 detects that the application module 19 is in a command unacceptable state, the application control module 17 waits until command execution becomes possible, or cancels the operation command data.

Thus, using the state transition detecting portion 32, the application control module 17 detects that operation command data can be, or cannot be, delivered to the application module 19. Therefore, the application module 19 can receive only necessary operation command data while unnecessary operation command data are eliminated. Accordingly, an application module 19 can be developed in consideration of only necessary operation command data, which enables to develop the application module 19 with a smaller amount of labor.

As described above, according to the fifth embodiment, the application control module 17 is configured to include the state transition detecting portion 32 for detecting state transition of the application module 19. In addition, it is characterized by that when the application control module 17 receives operation command data used for the application module 19, the application control module 17 detects a command acceptable state of the application module 19 using the state transition detecting portion 32 before delivering the command data. Therefore, the following effects are produced: it is possible to develop the application module 19 with a smaller amount of labor; and efficiency of compilation and debugging can be improved.

Sixth Embodiment

Figure 15:
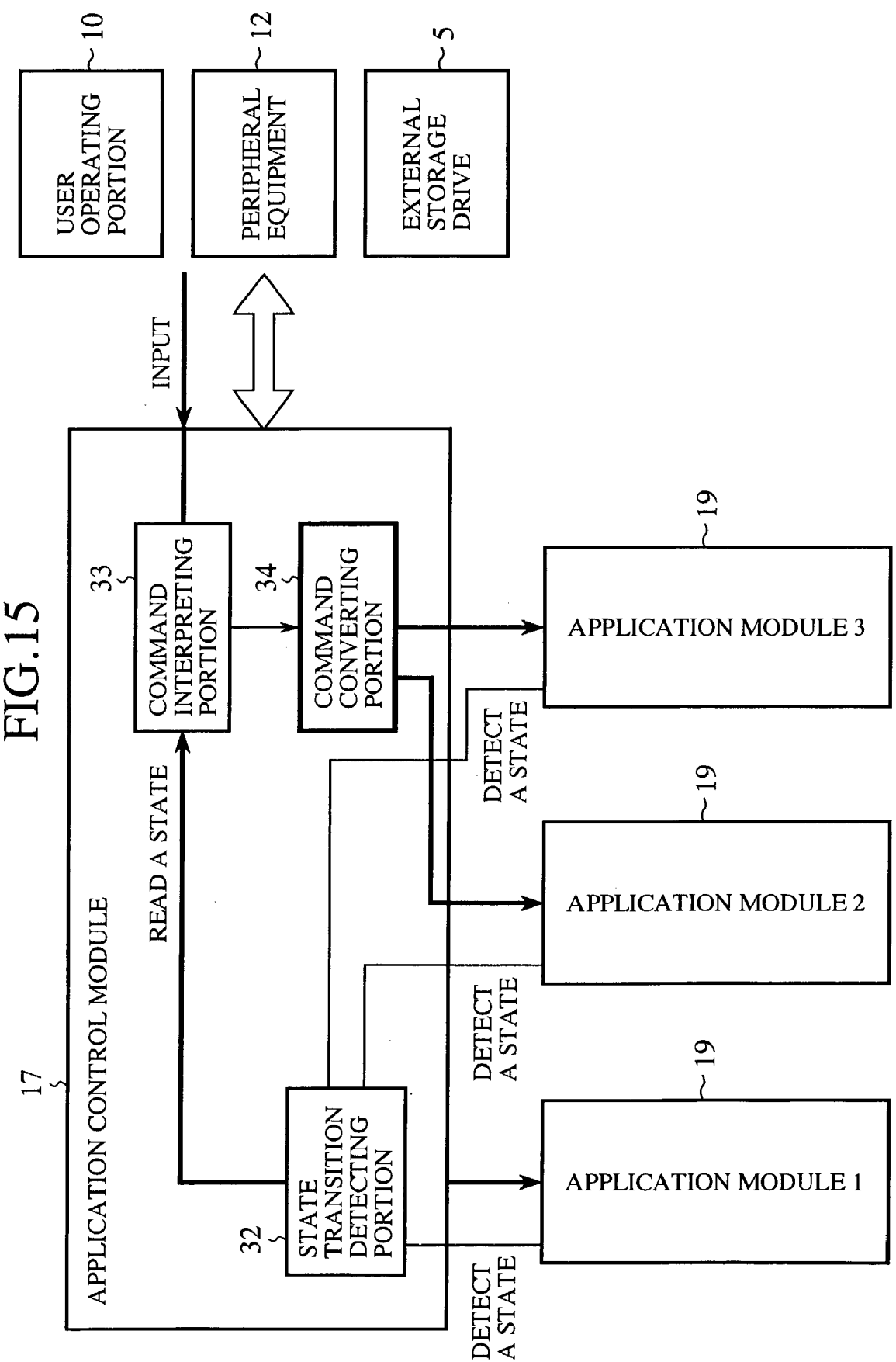
FIG. 15 is a diagram to illustrate a configuration of an on-vehicle multimedia device according to a sixth embodiment of the present invention.

FIG. 15 is a diagram to illustrate a configuration of an on-vehicle multimedia device according to a sixth embodiment of the present invention. Configurations which are like or equivalent to those shown in FIG. 14 are designated by the same reference numerals.

The application control module 17 shown in FIG. 15 includes the following: the state transition detecting portion 32 that detects transition of a starting state of the application module 19 and transition between a command acceptable state and a command unacceptable state of the application module 19; a command interpreting portion 33 for interpreting operation command data to identify an application module 19 for which the operation command data are used, and to determine a kind of the operation command data; and a command converting portion 34 for converting input data from the external hardware 15 into operation command data used for the corresponding application module 19. It is to be noted that the functions of the command interpreting portion 33 and the command converting portion 34 may also be integrated into one as the state transition detecting portion 32.

Referring next to FIG. 15, the operation of the command conversion will be described.

In the first place, input data input from the external hardware 15 or the like is passed to the application control module 17 through the external input/output control module 20, which is not illustrated. In the application control module 17, to begin with, the command interpreting portion 33 interprets the input data to identify an application module 19 to which the input data are addressed.

Next, a state of the identified application module 19 is detected using the state transition detecting portion 32. If the identified application module 19 has already started and in a command acceptable state, the application control module 17 converts the input data into operation command data used for the identified application module 19 using the command converting portion 34, and then transmits the operation command data to this identified application module 19.

Thus, using the command interpreting portion 33, the application control module 17 interprets input data from another application module 19 or the external hardware 15 to identify an application module 19 for which the input data are used. After that, the application control module 17 detects a starting state and a command acceptable state of the identified application module 19 using the state transition detecting portion 32, and then convert the input data into operation command data using the command converting portion 34 before delivering the operation command data to the identified application module 19. Accordingly, it is possible to develop the application module 19 without being conscious of correspondence of input data with operation of the application module 19.

In addition, even if specifications of the external hardware 15 have been changed, it is possible to cope with the change by changing only specifications of the application control module 17, and thereby a plurality of application modules 19 can be used just as they are without changing the application modules 19.

It is to be noted that a plurality of operation commands can also be delivered to the plurality of application modules 19. In this case, the operation command data are copied in the command interpreting portion 33 or the command converting portion 34; and then, the converted operation command data are transmitted to each of the corresponding application modules 19.

As described above, according to the sixth embodiment, the application control module 17 is configured to include the following: the state transition detecting portion 32 for detecting state transition of the application module 19; the command interpreting portion 33 for interpreting input data; and the command converting portion 34 that converts the input data, which has been interpreted by the command interpreting portion 33, into operation command data used for the corresponding application module 19 before transmitting the converted operation command data. As a result, the following effects are produced: the application module 19 can be developed without being conscious of correspondence of input data with operation of the application module 19, which enables to compile and debug the application module 19 more efficiently; and even if specifications of the external hardware 15 have been changed, it is possible to cope with the change by changing only the application control module 17.

Seventh Embodiment

Figure 16:
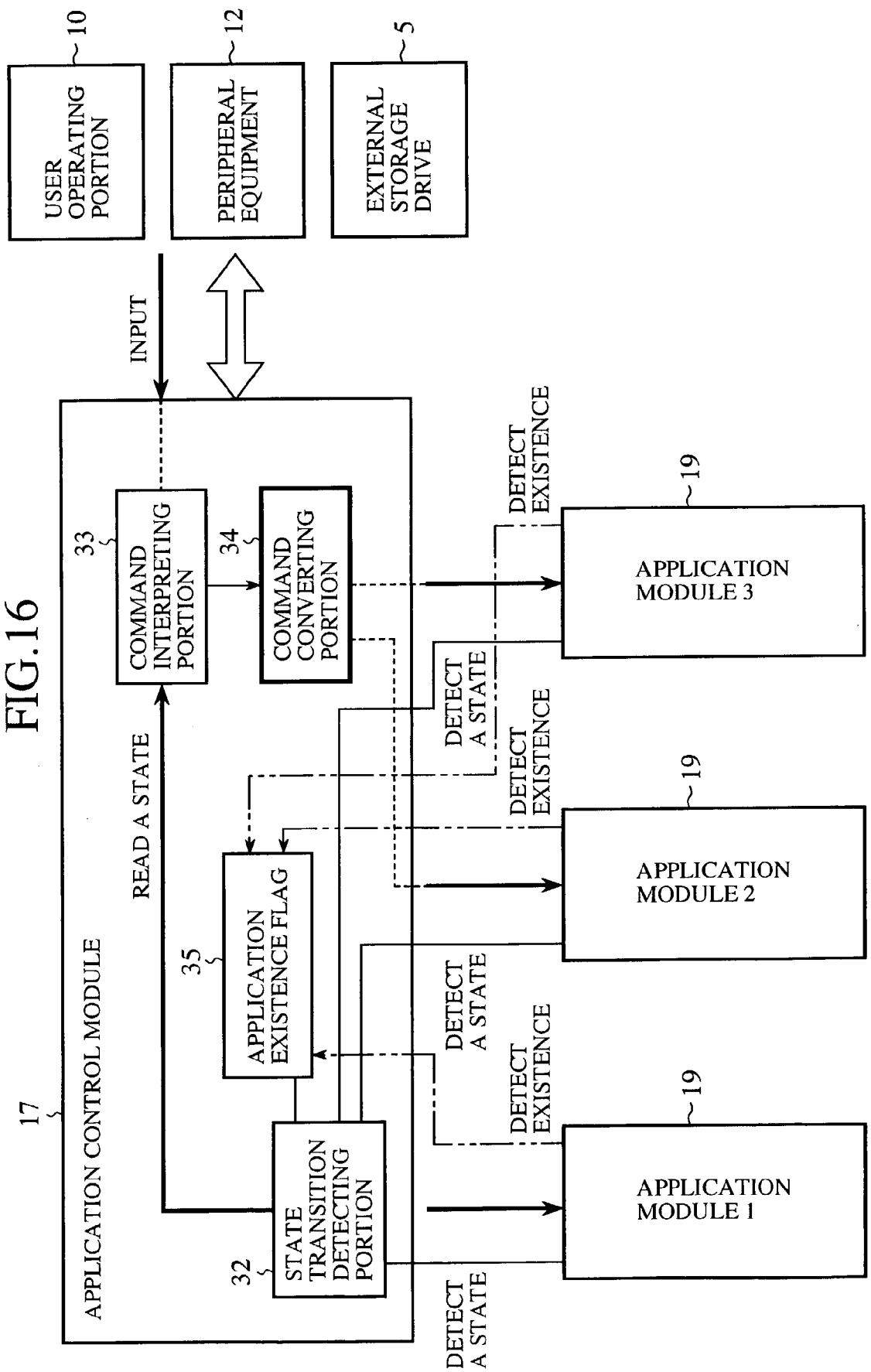
FIG. 16 is a diagram to illustrate a configuration of an on-vehicle multimedia device according to a seventh embodiment of the present invention.

FIG. 16 is a diagram to illustrate a configuration of an on-vehicle multimedia device according to a seventh embodiment of the present invention. Configurations which are like or equivalent to those shown in FIG. 15 are designated by the same reference numerals.

In FIG. 16, reference numeral 35 denotes an application existence flag, which expresses existence of the application module 19. Existence of the application module 19 may also be stored in the state transition detecting portion 32 described in the fifth and sixth embodiments.

In the fifth embodiment, for example, with an operation flag prepared, when the command interpreting portion 33 interprets input data, if the corresponding application module 19 has not been started yet judging from this operation flag, the application control module 17 starts the corresponding application module 19 according to the third embodiment, and then transmits command data.

In addition, in the sixth embodiment, when the command interpreting portion 33 interprets input data, if there is not an appropriate application module 19 judging from the application existence flag 35, the application control module 17 starts the corresponding application module 19 also according to the third embodiment, and then converts input data into operation command data used for the corresponding application module 19, using the command converting portion 34, before transmitting the operation command data.

As described above, according to the seventh embodiment, using the operation flag or the state transition detecting portion 32, the application control module 17 judges whether or not the application module 19 has been started. Next, after the application module 19 is started, the application control module 17 delivers screen control command data, operation command data and so on. Accordingly, the application module 19 can be developed without being conscious of the necessity of operation command data, which is a produced effect. Moreover, existence of the application module 19 is judged before command data are transmitted, which produces an effect of eliminating the need for transmitting unnecessary command data when operating the on-vehicle multimedia device.

Eighth Embodiment

Figure 17:
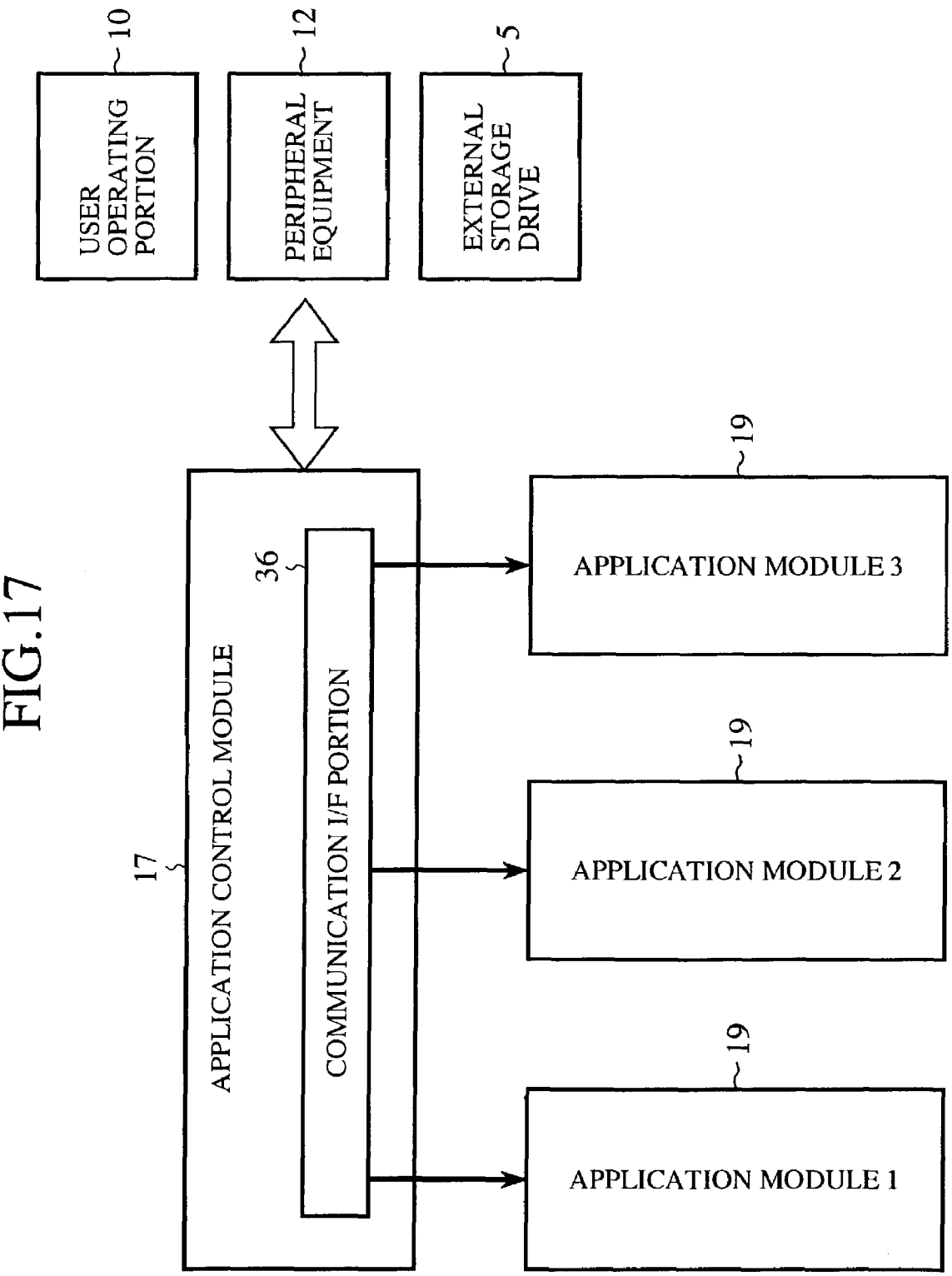
FIG. 17 is a diagram to illustrate a configuration of an on-vehicle multimedia device according to an eighth embodiment of the present invention.

FIG. 17 is a diagram to illustrate a configuration of an on-vehicle multimedia device according to an eighth embodiment of the present invention. Configurations which are like or equivalent to those shown in FIG. 3 are designated by the same reference numerals.

Figure 18:
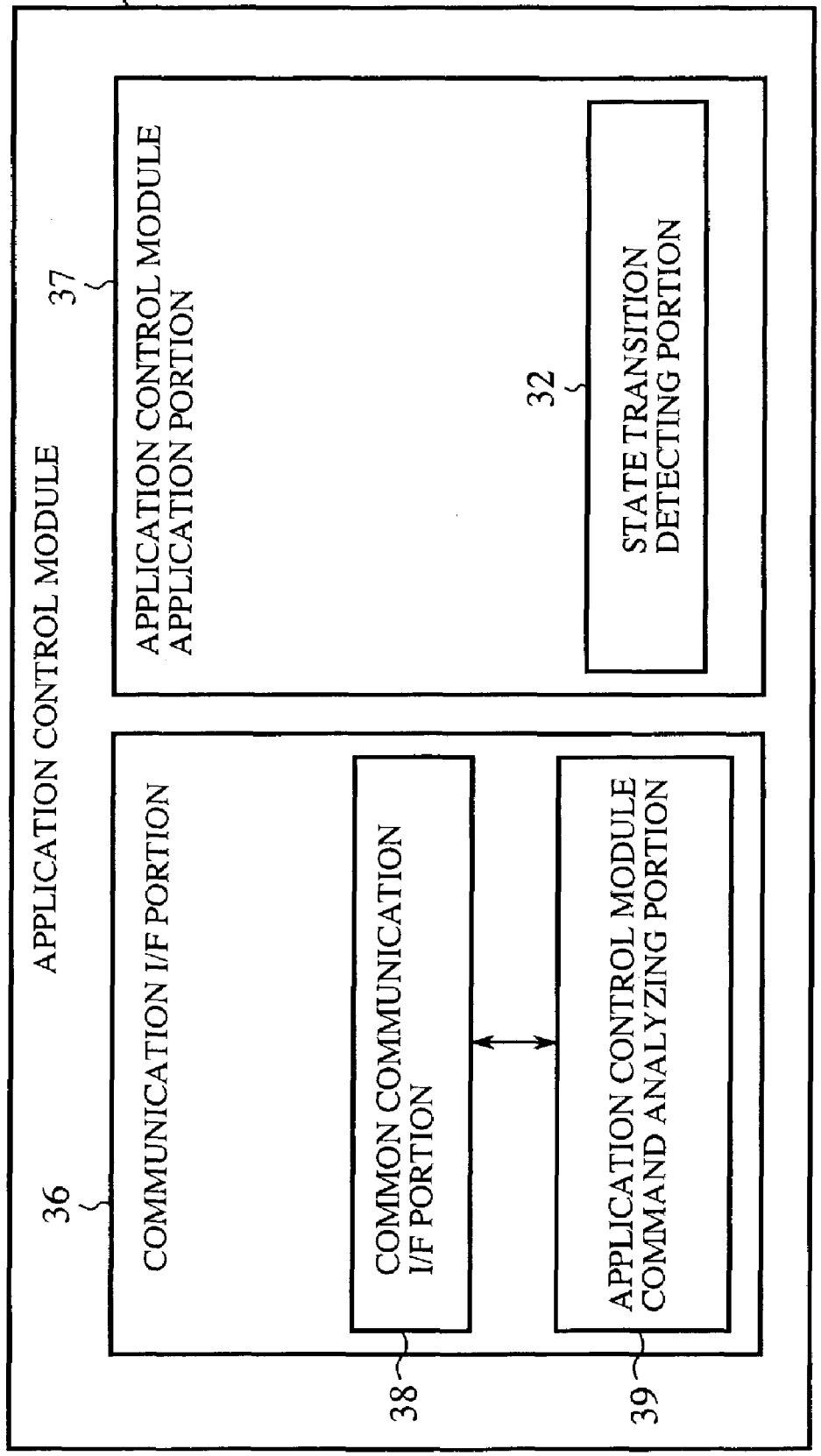
FIG. 18 is a diagram to illustrate a configuration of an application control module according to the eighth embodiment.

In FIG. 17, reference numeral 36 denotes a communication interface portion (communication I/F portion) provided in the application control module 17. The application control module 17 performs data communication with another application module 19 using the communication interface portion 36. FIG. 18 is a diagram to illustrate a configuration of the application control module 17 according to the eighth embodiment.

In FIG. 18, the application control module 17 includes the communication interface portion 36, and an application control module application portion 37.

The communication interface portion 36 includes the following: a common communication interface portion (common communication I/F portion) 38 which is provided in each of the application modules 19 in common; and an application control module command analyzing portion 39 for analyzing operation command data delivered by way of communication.

The application control module application portion 37 is designed to grasp a state of the whole on-vehicle multimedia device, and a state of each application module 19, and thereby to realize functions of the application control module 17 such as control of data delivering, control of screen size and displaying, and control of starting and ending of the application module 19. Reference numeral 32 is a state transition detecting portion that holds a state of the whole on-vehicle multimedia device, and existence of each application module 19 and its state.

To begin with, command data which has been input from the user operating portion 12 of the external hardware 15 or the like is received by the communication interface portion 36 of the application control module 17. The application control module 17 performs processing required for the input command data using the application control module application portion 37, and then delivers the operation command data, which has been processed by the communication interface portion 36, to the application module 19. In a similar manner, operation command data from each application module 19 is also received by the communication I/F portion 36, and is then processed in the application control module application portion 37. After that, the operation command data are transmitted from the communication interface portion 36. Providing the communication interface portion 36 and the application control module application portion 37 produces the following effect: if it is necessary to change a function of the application control module 17, changing only the application control module application portion 37 can cope with the necessity without changing the communication interface portion 36.

By the way, the common communication interface portion 38 will be described in a tenth embodiment.

As described above, according to the eighth embodiment, the application control module 17 is configured to include the communication interface portion 36 for communicating with each application module 19, and the application control module application portion 37 in which a function of the application control module 17 is realized. Accordingly, if the function of the application control module 17 is changed, it is possible to cope with the change by changing only the application control module application portion 39, which enables to develop the on-vehicle multimedia device more efficiently.

Ninth Embodiment

Figure 19:
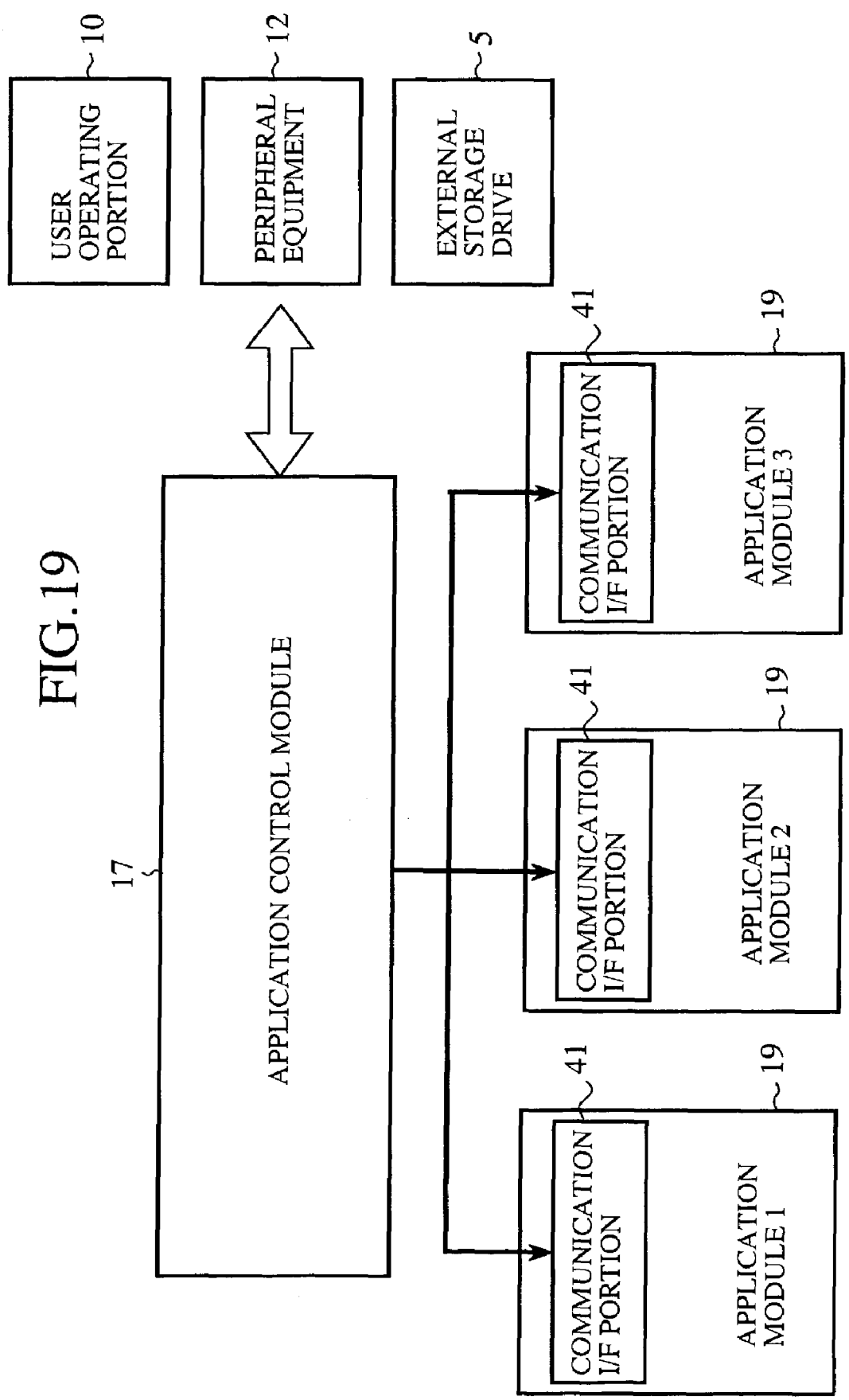
FIG. 19 is a diagram to illustrate a configuration of the on-vehicle multimedia device according to the eighth embodiment of the present invention.

FIG. 19 is a diagram to illustrate a configuration of the on-vehicle multimedia device according to the eighth embodiment of the present invention. Configurations which are like or equivalent to those shown in FIG. 17 are designated by the same reference numerals.

In FIG. 19, reference numeral 41 denotes a communication interface portion (communication I/F portion). The application module 19 receives operation command data, which is transmitted from the application control module 17 or another application module 19, using the communication interface portion 41.

Figure 20:
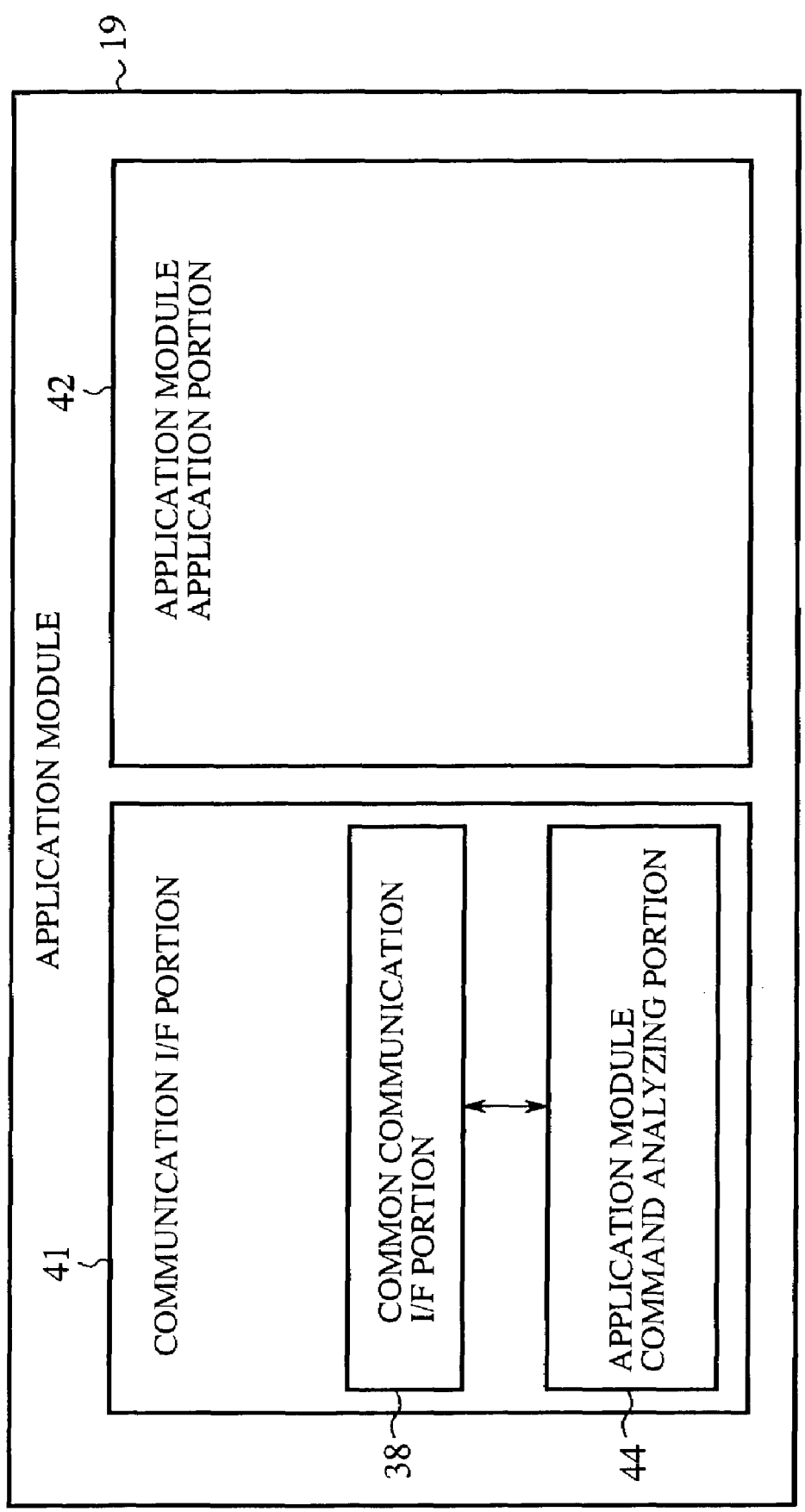
FIG. 20 is a diagram to illustrate a configuration of an application module according to a ninth embodiment.

FIG. 20 is a diagram to illustrate a configuration of the application module 19 according to the ninth embodiment.

In FIG. 20, the application module 19 includes the communication interface portion 41 and an application module application portion 42. The application modules 19 can communicate with each other through the communication interface portion 41. The communication interface portion 41 includes the common communication interface portion (common communication I/F portion) 38 which is common to all of the application modules 19, and a command analyzing portion 44 used for communication. The application module application portion 42 executes an individual function provided in each application module 19.

To begin with, the application control module 17 receives input command data input from the external hardware 15. The application control module 17 performs processing required for the input command data, and then delivers operation command data to the application module 19. The application module 19 performs appropriate processing in response to the delivered operation command data, and if necessary, transmits required operation command data through the communication interface portion 41 in the application control module 17 or in another application module 19.

Next, general operation of the application module 19 will be described below. The application module 19 can issue operation command data to another application module 19. The operation command data are received by the common communication interface portion 38 inside the communication interface portion 41 of the object application module 19. After that, the command analyzing portion 44 in the communication interface portion 41 analyzes the operation command data peculiar to the object application module 19. The analyzed operation command data are executed in the application module application portion 42.

To begin with, input data which has been input from the user operating portion 10 is received by the external input/output control module 20 through the operating portion interface 11. Then, the input data are converted into operation command data. As a matter of course, the input data may also be transmitted to the application control module 17 just as it is without converting the input data into the operation command data in the external input/output control module 20. The converted operation command data are delivered to each application control module 17 from the common communication interface 38 provided in the communication interface portion 41 of the external input/output control module 20. In addition, the operation command data are transmitted from the communication interface portion 36 of the application control module 17 to the common communication interface portion 38 of the communication interface portion 41 of each application module 19. Next, the operation command data are analyzed by the application module command analyzing portion 44 before the analyzed operation command data are transmitted to the application module application portion 42. The application module application portion 42 executes various kinds of operation in response to a kind of operation command data.

Specific examples of the application modules 19 will be described below.

Figure 21:
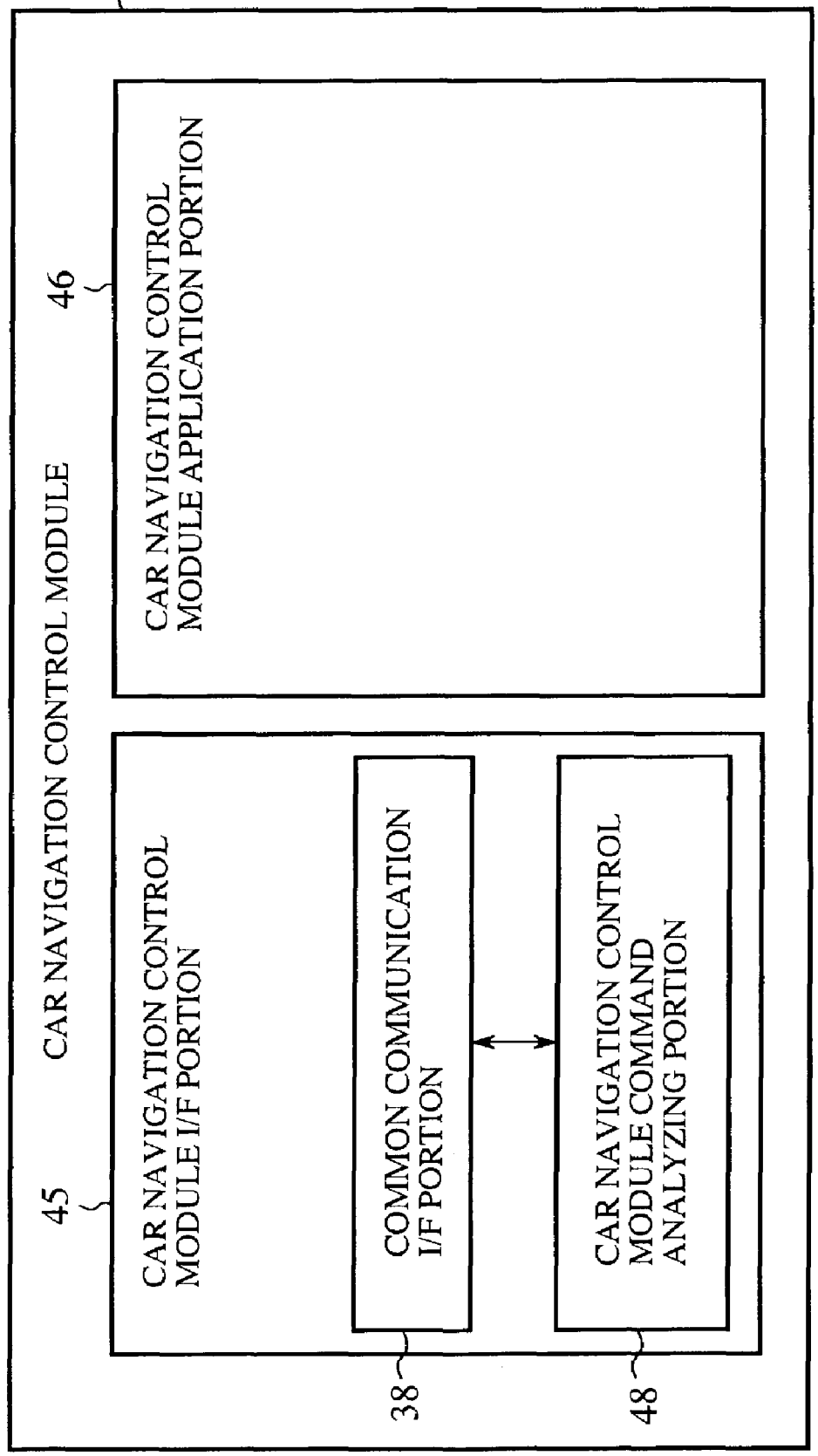
FIG. 21 is a diagram to illustrate a configuration of a car navigation control module shown in the first embodiment.

FIG. 21 is a diagram to illustrate a configuration of the car navigation control module 21 shown in the first embodiment.

In FIG. 21, reference numeral 45 denotes a car navigation control module interface portion (communication interface unit) by which the car navigation control module 21 communicates with the application control module 17 and another application module 19. The car navigation control module interface portion includes the following: the application control module 17; the common communication interface portion 38 which is common to all of the application modules 19; and the car navigation control module command analyzing portion 48. Reference numeral 46 denotes a car navigation control module application portion in which a car navigation control function is realized.

Figure 22:
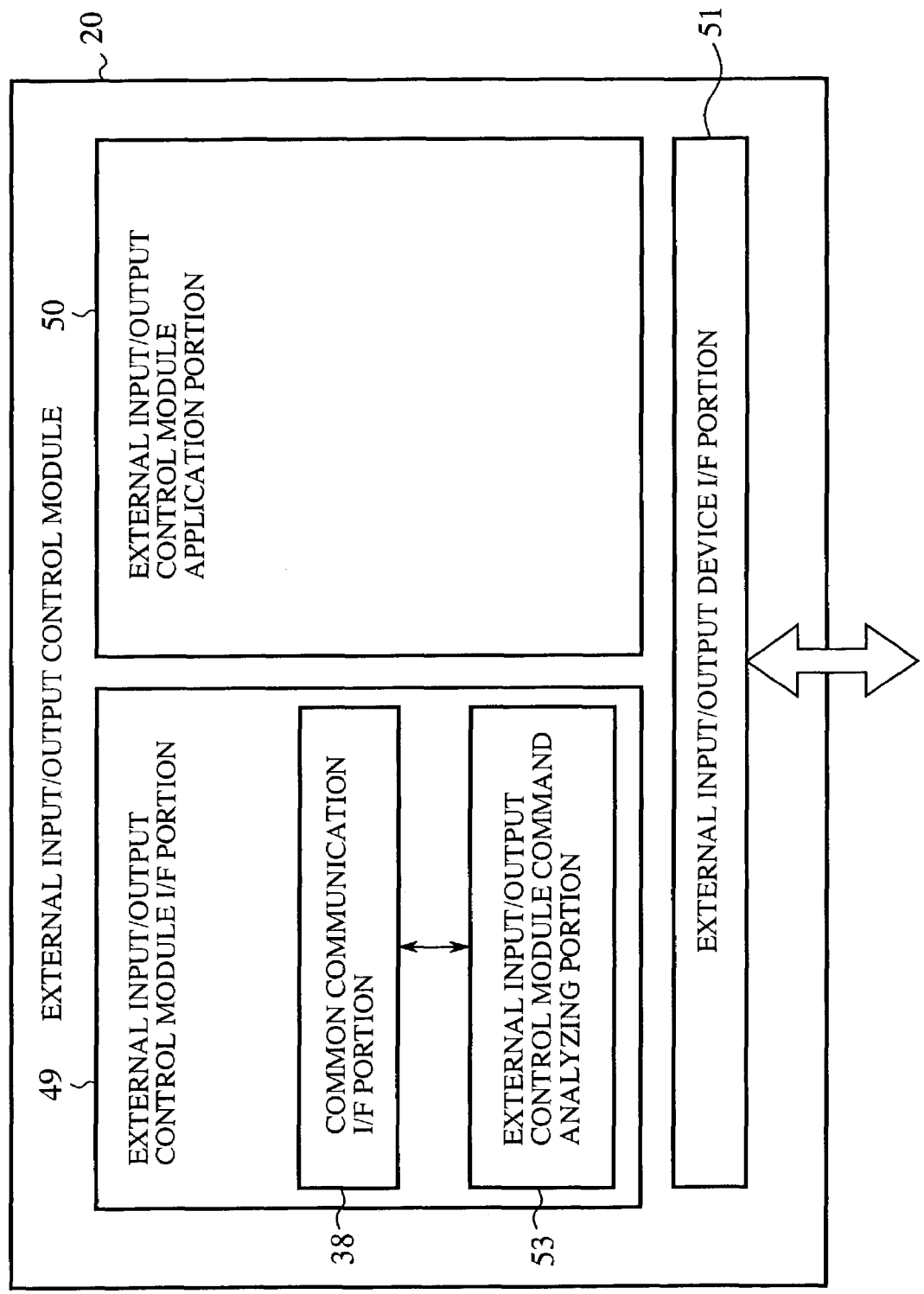
FIG. 22 is a diagram to illustrate a configuration of an external input/output control module shown in the first embodiment.

FIG. 22 is a diagram to illustrate a configuration of the external input/output control module 20 shown in the first embodiment.

In FIG. 22, reference numeral 49 denotes an external input/output control module interface portion (communication interface unit) by which the external input/output control module 20 communicates with the application control module 17 and another application module 19. The external input/output control module interface portion includes the following: the application control module 17; the common communication interface portion 38 which is common to all of the application modules 19; and the external input/output control module command analyzing portion 53 used for communication. Reference numeral 50 is an external input/output control module application portion in which an external input/output control function is realized. In addition, reference numeral 51 is an external input/output device interface portion used for communication with the external hardware 15.

Next, the operation of the car navigation control module 21 will be described below.

Data such as GPS, gyrocompass, vehicle speed, which have been obtained from the peripheral equipment 12 by the external input/output control module 20, is passed to the car navigation control module 21 as external data through the external input/output control module 20, and the application control module 17. In the car navigation control module 21, the external data are received by the common communication interface portion 38 inside the car navigation control module interface portion 45. After that, the car navigation control module command analyzing portion 48 converts the data into internal operation command data which is used for operating a car navigation system, and then passes the converted operation command data to the car navigation control module application portion 46. The car navigation control module application portion 46 executes operation of the car navigation system, such as a search for a route, induction, and guidance, according to the internal operation command data.

Figure 23:
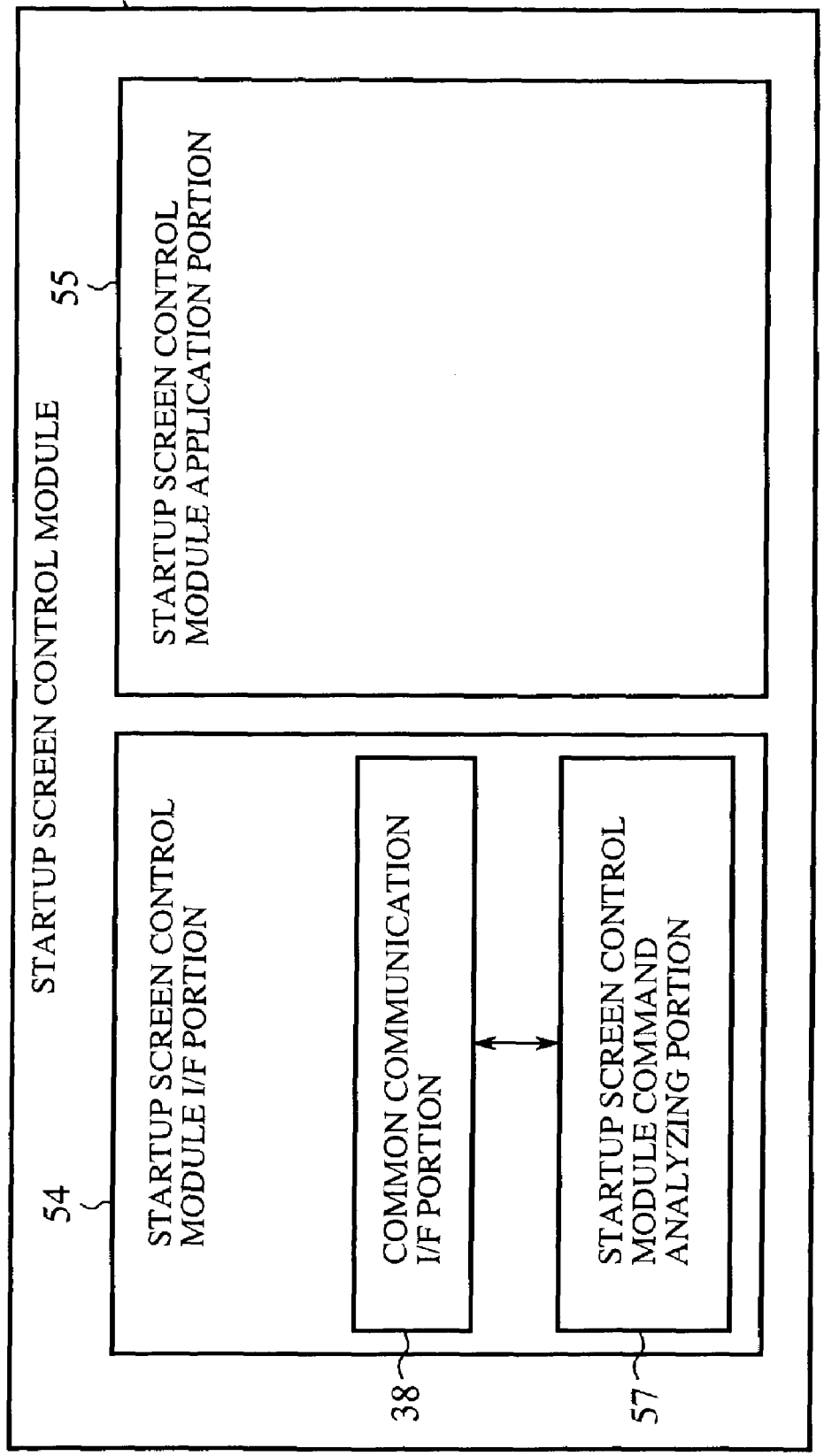
FIG. 23 is a diagram to illustrate a configuration of a startup screen control module shown in the first embodiment.

FIG. 23 is a diagram to illustrate a configuration of the startup screen control module 22 shown in the first embodiment.

In FIG. 23, reference numeral 54 denotes a startup screen control module interface portion (communication interface unit) by which the startup screen control module 22 communicates with the application control module 17 and another application module 19. The startup screen control module interface portion includes the common communication interface 38 and the startup screen control module command analyzing portion 57. Reference numeral 55 is a startup screen control module application portion in which a startup screen control function is realized.

Next, the operation of the startup screen control module 22 will be described below.

After the application control module 17 and each application module 19 are powered on, they require time to complete initialization at the time of starting. Therefore, it takes time to display a startup screen after the power on. The startup screen control module 22 starts before initialization of the application control module 17 and another application module 19 is completed, and occupies the display 9 temporarily to display the startup screen. In a state in which the application control module 17 and the application modules 19 are allowed to operate, control is transferred from the startup screen by the startup screen control module 22 to the other application modules 19.

Figure 24:
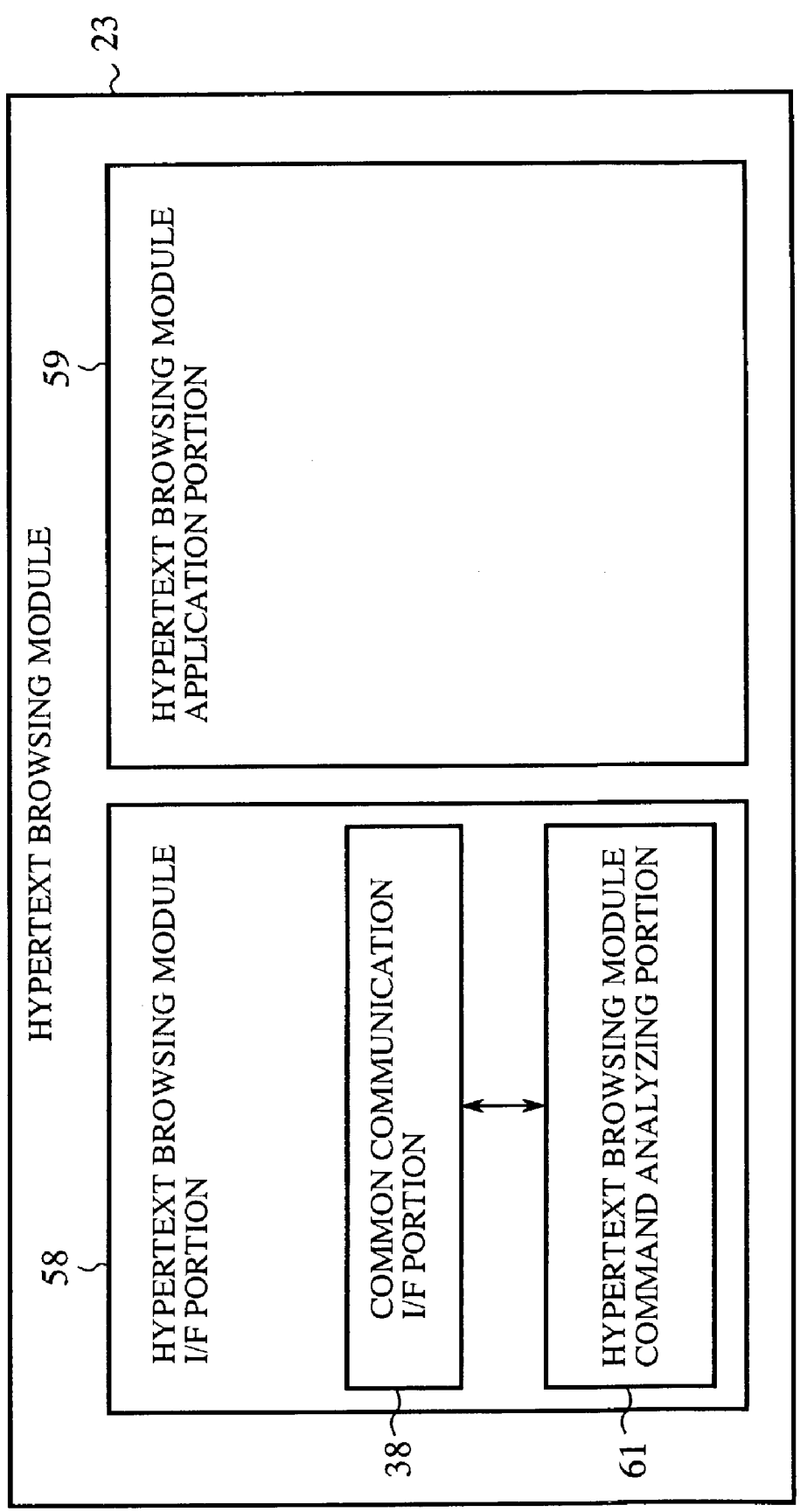
FIG. 24 is a diagram to illustrate a configuration of a hypertext browsing module shown in the first embodiment.

FIG. 24 is a diagram to illustrate a configuration of the hypertext browsing module 23 shown in the first embodiment.

In FIG. 24, reference numeral 58 denotes a hypertext browsing module interface portion (communication interface unit) by which the hypertext browsing module 23 communicates with the application control module 17 and another application module 19. The hypertext browsing module interface portion includes the common communication interface portion 38 and the hypertext browsing module command analyzing portion 61. Reference numeral 59 is a hypertext browsing module application portion in which a hypertext browsing function is realized.

Next, the operation of the hypertext browsing module 23 will be described below.

The application control module 17 receives input data of a user, which has been input from the user operating portion 10, through the external input/output control module 20, and then delivers operation command data to the hypertext browsing module 23. The startup screen control module command analyzing portion 61 analyzes the operation command data through the common communication interface portion 38. Then, the hypertext browsing module application portion 59 displays hypertext on the display 9 in response to the results of the analysis.

Figure 25:
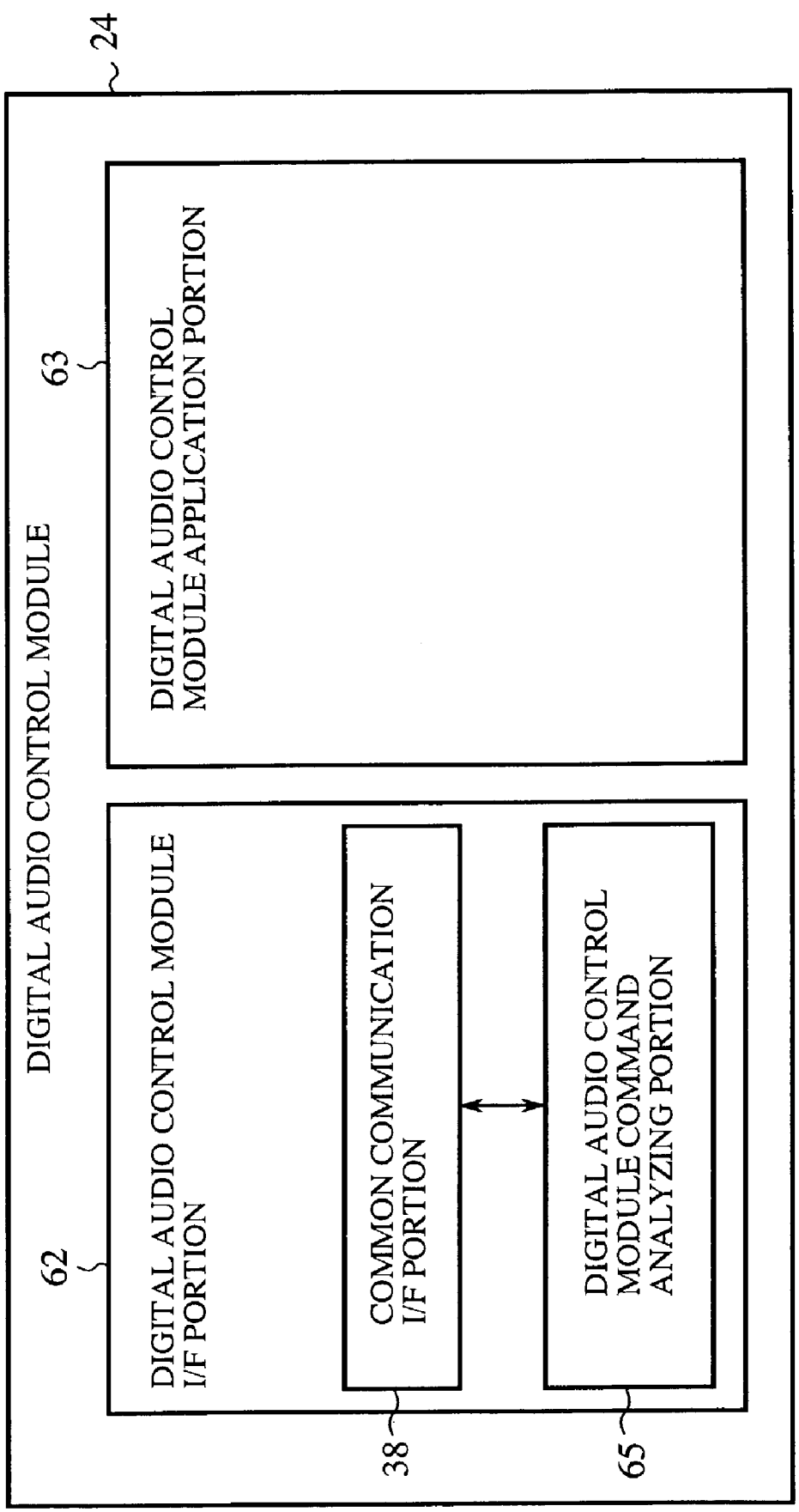
FIG. 25 is a diagram to illustrate a configuration of a digital audio control module shown in the first embodiment.

FIG. 25 is a diagram to illustrate a configuration of the digital audio control module 24 shown in the first embodiment.

In FIG. 25, reference numeral 62 denotes a digital audio control module interface portion (communication interface unit) by which the digital audio control module 24 communicates with the application control module 17 and another application module 19. The digital audio control module interface portion includes the common communication interface 38 and the digital audio control module command analyzing portion 65. Reference numeral 63 is a digital audio control module application portion in which a digital audio control function is realized.

Next, the operation of the digital audio control module 24 will be described below.

The common communication interface portion 38 of the digital audio control module interface portion 62 receives the following: operation command data such as playback, stop, forward, rewind, and music selection which is converted from the input data from the user operating portion 10 by the external input/output control module 20 and the application control module 17; and operation command data such as playback, stop, forward, rewind, and music selection, coming from another application module 19. A digital audio control module command analyzing portion 65 converts the operation command data into each command data before the converted command data are transmitted to a digital audio control module application portion 63. The digital audio control module application portion 63 performs operation such as playback, stop, forward, rewind, and music selection in response to each operation command data. Music information which is played back in the digital audio control module application portion 63 is output from a speaker connected to the peripheral equipment interface 13 through the external input/output control module 20.

As described above, according to the nineteenth embodiment, the application module 19 is configured to include the following: the communication interface portion 41 for communicating with the application control module 17 and another application module 19; and the application module application portion 42 that executes an individual function in the application module 19. Accordingly, even if a function is added to the application module 19, it is possible to cope with the addition by changing only the application module application portion. This enables to develop the on-vehicle multimedia device more efficiently, which is a produced effect.

Tenth Embodiment

Figure 26:
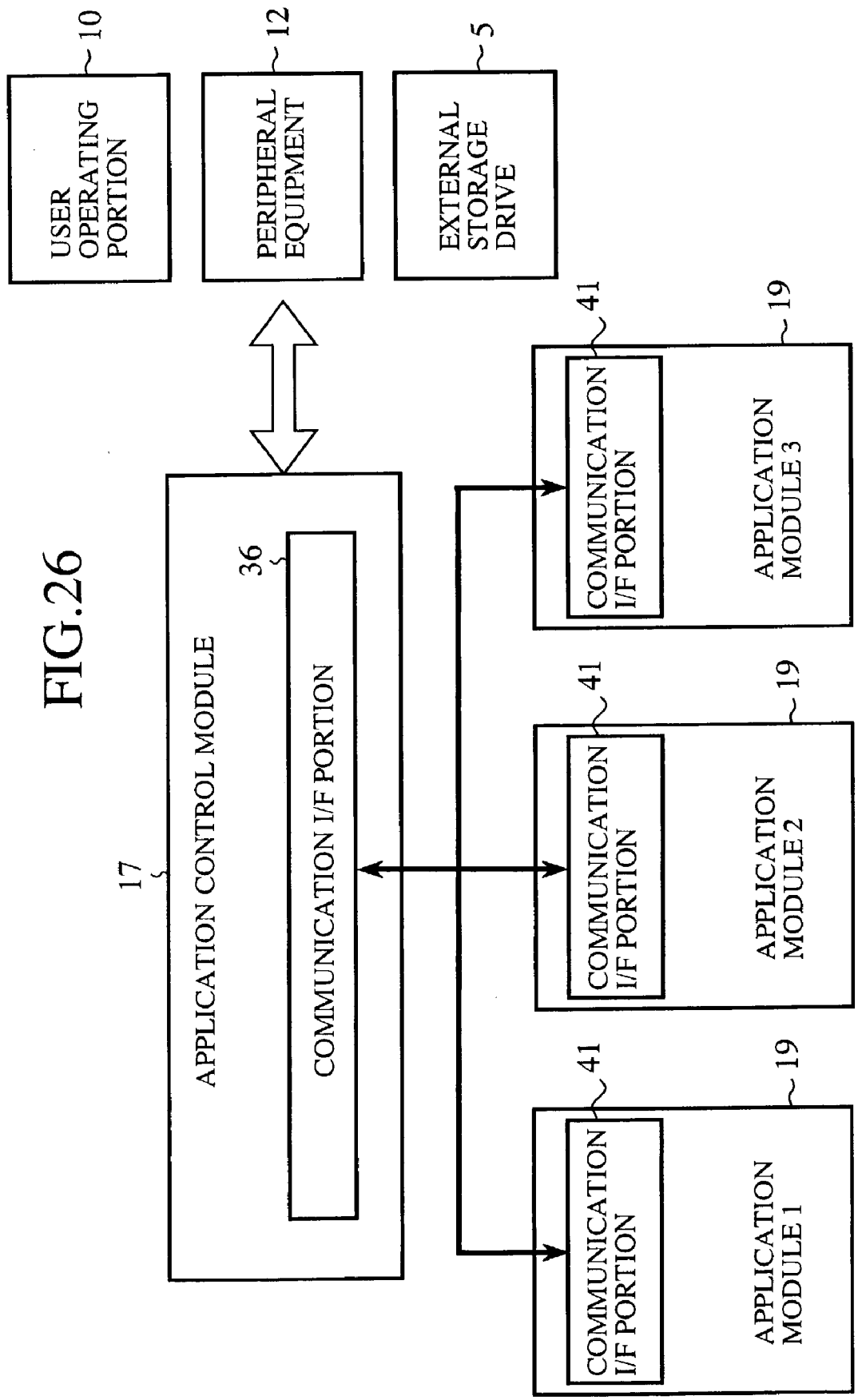
FIG. 26 is a diagram to illustrate a configuration of an on-vehicle multimedia device according to a tenth embodiment of the present invention.
Figure 27:
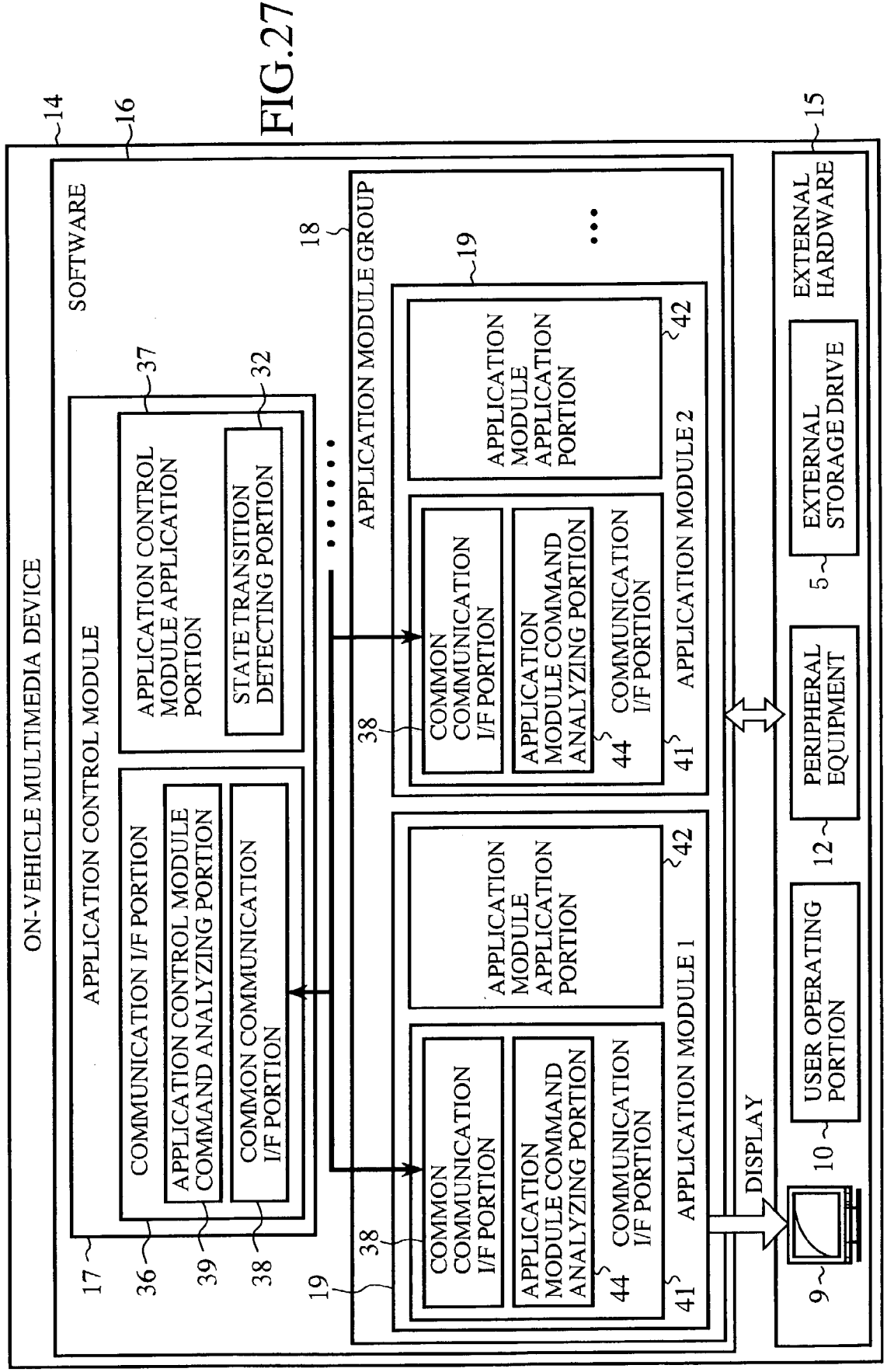
FIG. 27 is a diagram to illustrate a configuration of the on-vehicle multimedia device according to the tenth embodiment of the present invention.

FIGS. 26 and 27 are diagrams to illustrate a configuration of an on-vehicle multimedia device according to a tenth embodiment of the present invention. Configurations which are like or equivalent to those shown in FIGS. 3, 18, and 20 are designated by the same reference numerals.

In FIGS. 26 and 27, the application control module 17 includes the communication interface portion 36 and the application portion 37; and the application module 19 includes the communication interface units 44 and the application portions 42. The communication interface portion 36 of the application control module 17 and the communication interface portion 41 of each application module 19 communicate with each other by way of each common communication interface portion 38. Thus, it is possible to communicate with each other through the common communication interface portion 38.

The on-vehicle multimedia device according to the tenth embodiment of the present invention requires one or more application modules 19 including the external input/output control module 20. In the case of an application module 19, the communication interface portion 41 of which has the common communication interface portion 38, any number of such application modules 19 can be added to the application module group 18.

As described above, according to the tenth embodiment, the communication interface portion 36 of the application control module 17 and the communication interface portion 41 of the application module 19 are configured to include, in common, the common communication interface portion 38 for communicating with each other. This enables to add a new application module to the on-vehicle multimedia device easily, which is a produced effect.

Eleventh Embodiment

The application control module 17 may also be configured to read the application module 19 which is a target of a read command received from the external hardware 15 or another application module 19; or the application control module 17 may also be configured to delete the application module 19 which is a target of delete command data received from outside.

When the application control module 17 receives read command data for reading the application module 19, the application control module 17 reads an appropriate application module 19 from, for example, the ROM 1 or the external storage medium 4 of the external storage drive 5 into a main memory such the RAM 3. When the operation of the application module 19 becomes possible, the application module 19 notifies the application control module 17 of its own operable state.

In addition, when the application control module 17 receives delete command data for deleting the application module 19, the application control module 17 deletes the application module 19 in the main memory such as the RAM 3. At the time of the deletion, if it is necessary to save the internal state and data of the application module 19, the application control module 17 issues command data for saving the state and the data to the application module 19, and then suspends the deletion of the application module 19 until the application module 19 completes the saving of the internal state and the data. Saving the internal state and data at the time of deletion produces the following effects: the application module 19 can be initialized earlier at the time of the next starting; and the application module 19 can be started from the last ending state.

The following method may also be used: an internal state and data are saved by the application module 19 in advance; and after completion of the saving, delete command data for deleting the application module 19 is issued.

Figure 28:
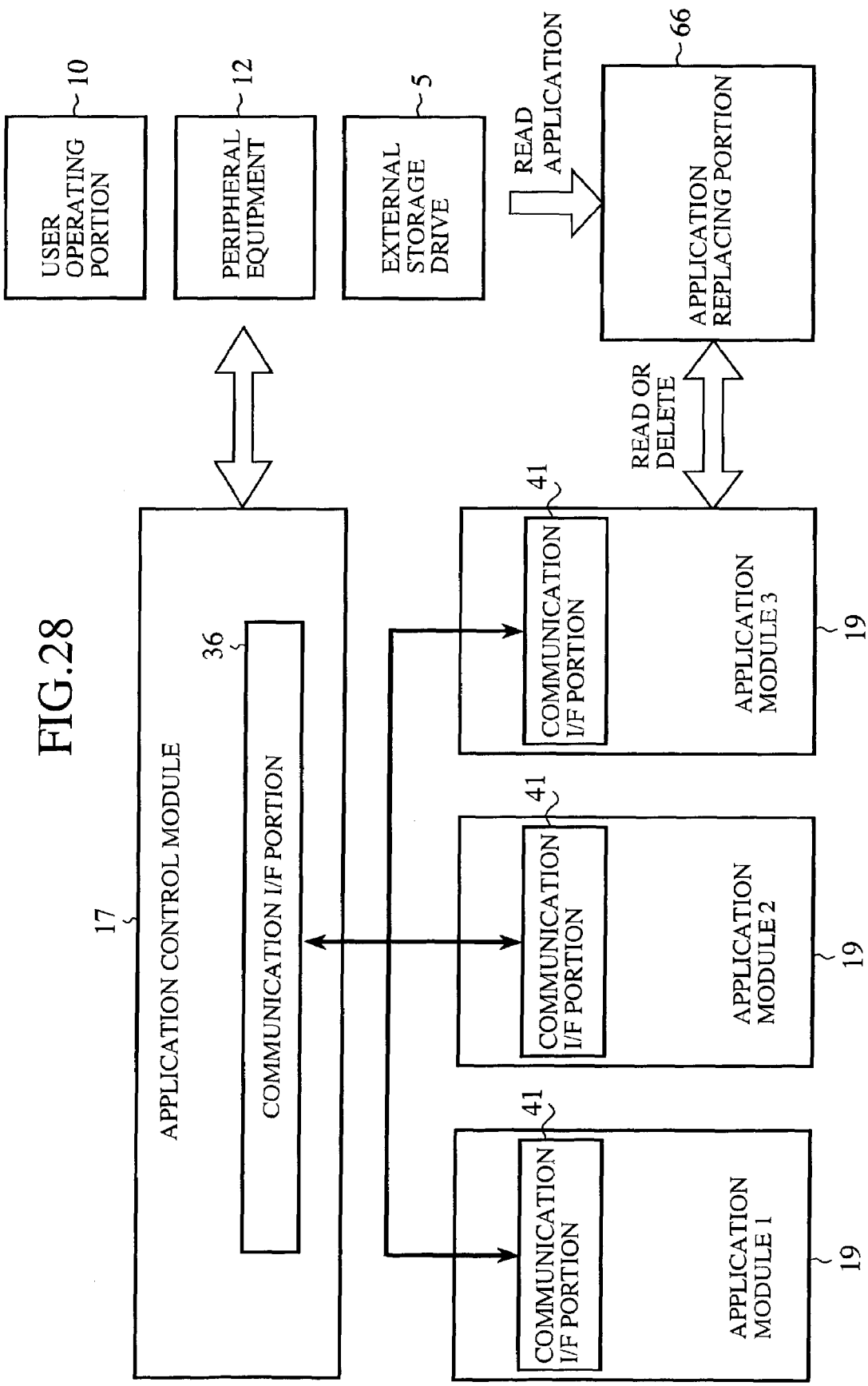
FIG. 28 is a diagram to illustrate a configuration of an on-vehicle multimedia device according to an eleventh embodiment of the present invention.

A dedicated module other than the application control module 17 may also be provided in order to control replacement. Providing the dedicated module enables to add or delete a function of the on-vehicle multimedia device easily, and also to reduce a load of the application control module 17. FIG. 28 is a diagram to illustrate a configuration of the on-vehicle multimedia device according to the eleventh embodiment of the present invention. Configurations which are like or equivalent to those shown in FIG. 26 are designated by the same reference numerals.

In the configuration shown in FIG. 28, an application replacing portion 66 is added to the on-vehicle multimedia device in FIG. 19. The application replacing portion 66 performs replacement of reading or deletion of the application module 19.

The following method may also be used: performing compilation covering the whole on-vehicle multimedia device which includes a required application module 19, and then writing the result of the compilation into the external storage medium 4 of a CD-ROM, a DVD-ROM, or the like in advance; and allowing execution of the required application module 19 when the on-vehicle multimedia device starts.

As described above, according to the eleventh embodiment, the application control module 17 is configured to read an application module 19, which is a target of received read command data, into the main memory. As a result, a new function of the on-vehicle multimedia device can be added easily, which is a produced effect.

Additionally, according to the eleventh embodiment, the application control module 17 is configured to delete an application module 19, which is a target of received delete command data, from the main memory. As a result, a new function of the on-vehicle multimedia device can be deleted easily, which is a produced effect.

Moreover, according to the eleventh embodiment, it is characterized by that the application module 19 saves the internal state and data of the application module 19 before the application module 19 is deleted. Therefore, the following effects are produced: the application module 19 can be initialized earlier at the time of the next starting; and the application module can be started from the last ending state.

Furthermore, according to the eleventh embodiment, the application replacing portion 66 for reading or deleting the application module 19, which is the target of the received read command data or the received delete command data, into or from the main memory is provided. Therefore, the following effects are produced: a function of the on-vehicle multimedia device can be added or deleted easily; a load of the application control module 17 can be reduced; and a memory resource and an I/O resource can be saved.

Twelfth Embodiment

In an on-vehicle multimedia device in a twelfth embodiment of the present invention, the multiprocessing in the first embodiment is replaced with multithreading.

Because threads share the same process space, a name space at the time of compilation is shared by all threads in the same process. In addition, the amount of data to be saved when switching a context switch is small.

The thread can be replaced with a task in a real time OS having the same function as that of the thread.

If functions and operation equivalent to those in the first embodiment are executed successively, the application control module 17 and the application module 19 become subroutines which are called by a main program for controlling successive execution. After a subroutine is called, required processing is performed before the subroutine returns to the main program. The application control module 17 communicates with an application program using a memory in the main program.

As described above, according to the twelfth embodiment, it is characterized by that the application control module 17 and the application module 19 operate in parallel. Therefore, the following effects are produced: each module can be developed easily, which enables to develop the on-vehicle multimedia device more efficiently.

Thirteenth Embodiment

Figure 29:
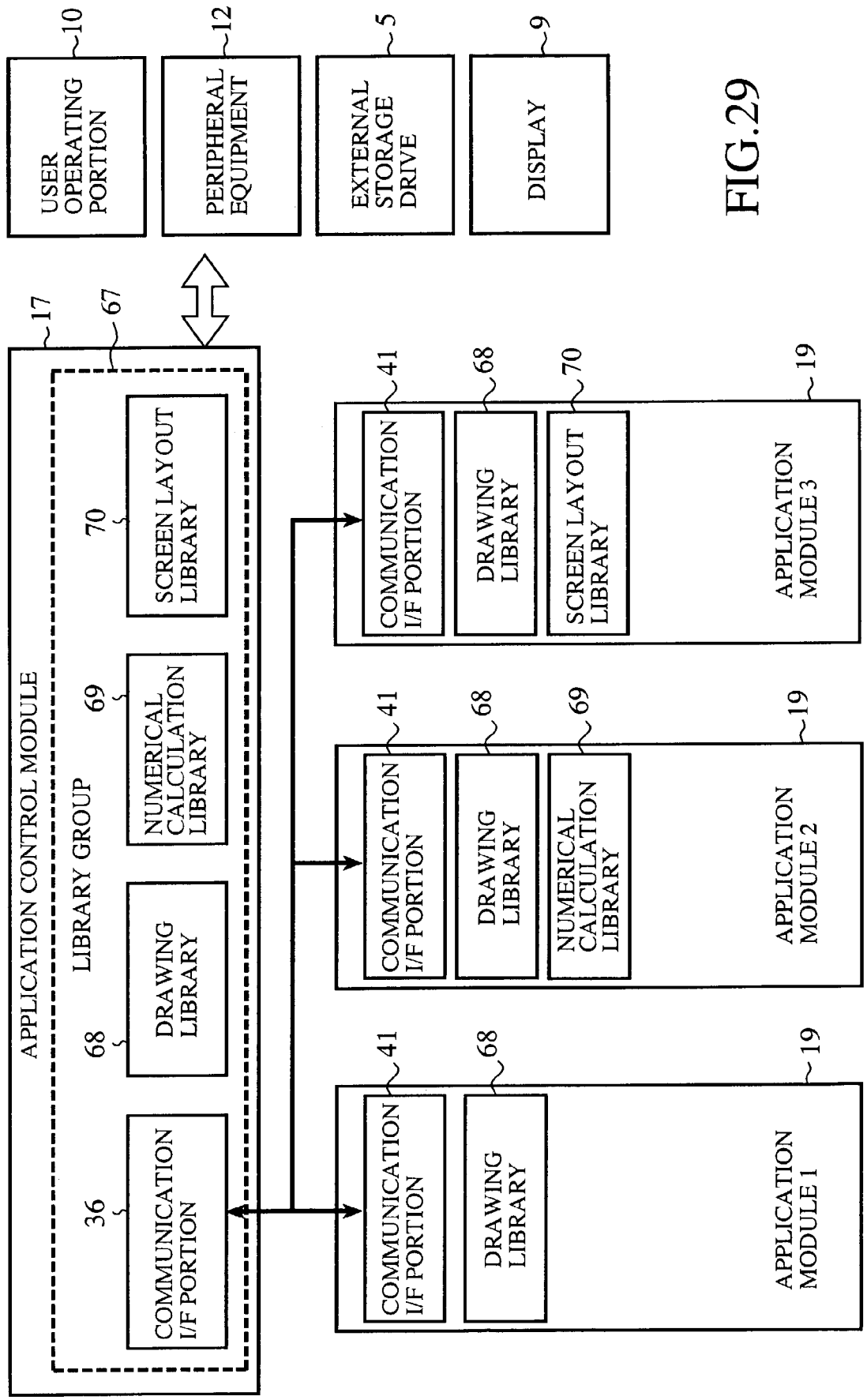
FIG. 29 is a diagram to illustrate a configuration of an on-vehicle multimedia device according to a thirteenth embodiment of the present invention.

FIG. 29 is a diagram to illustrate a configuration of an on-vehicle multimedia device according to a thirteenth embodiment of the present invention. Configurations which are like or equivalent to those shown in FIGS. 3 and 28 are designated by the same reference numerals.

Reference numeral 67 in FIG. 29 denotes a library group in the application control module 17. In the library group 67, there are libraries, each of which is produced by extracting and grouping functions relating to communication, drawing, screen layout, numerical calculation, or the like, which are required by the application control module 17 and the application module 19; for example, the library group 67 includes the communication interface units 36, 41, each of which has been grouped into a library, a drawing library 68, a numerical calculation library 69, and a screen layout library 70.

Thus, providing the application control module 17 with the library group 67 permits an unnecessary library to be omitted, and thereby enables compilation including only required libraries when compiling the application module 19. Because each of the libraries has a specific common interface, the library can be called from any application module 19 using the same steps. In addition, grouping common functions into a library enables improvement in working efficiency of development and debugging of the common functions.

It is to be noted that the libraries such as communication, drawing, screen layout, and numerical calculation may also be integrated into one.

Figure 30:
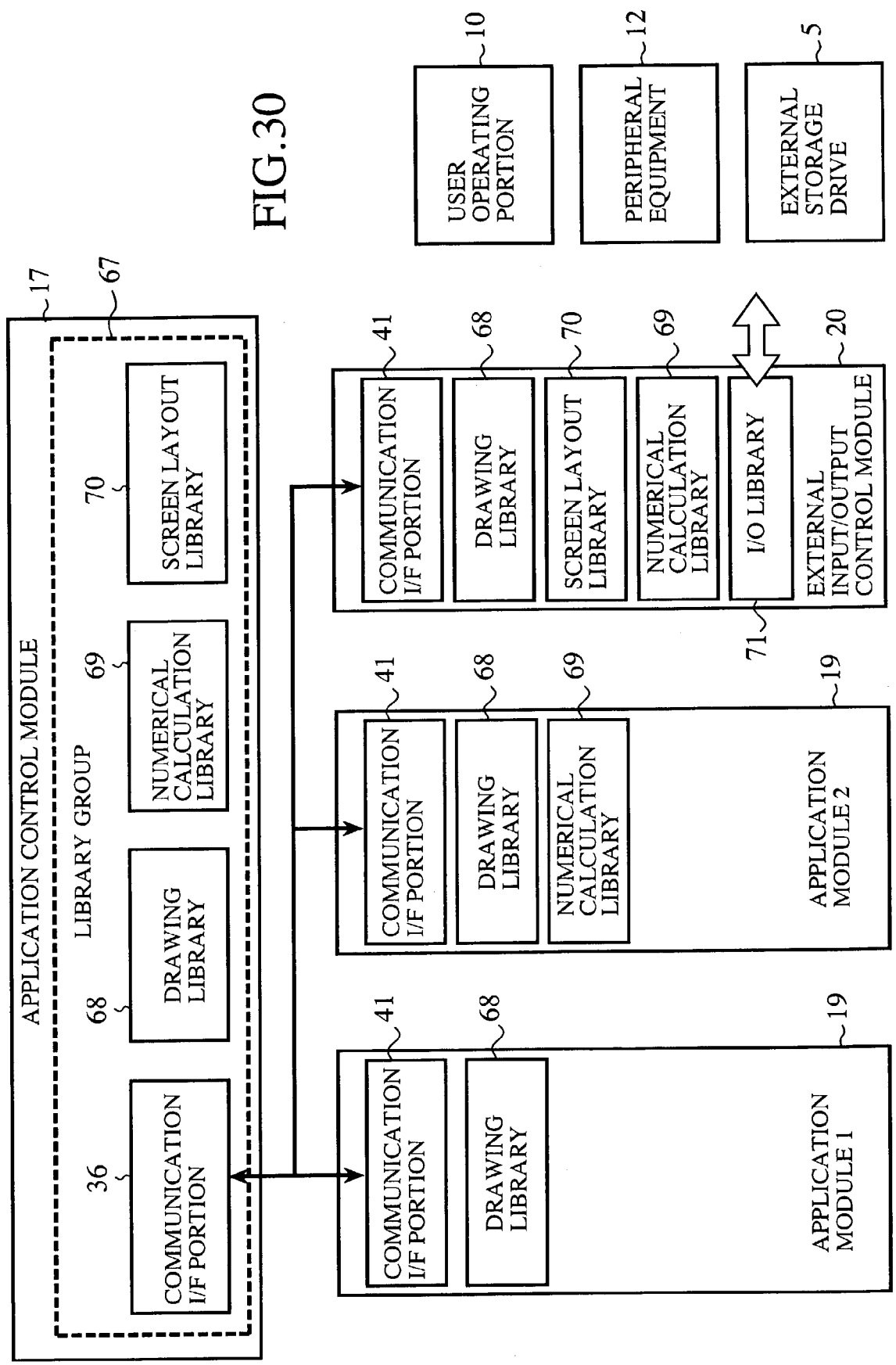
FIG. 30 is a diagram to illustrate a configuration of the on-vehicle multimedia device according to the thirteenth embodiment of the present invention.

Moreover, as shown in FIG. 30, the external input/output control module 20 may also be provided with an external input/output library (I/O library) 71 so that input from outside and output to outside are controlled by an application module 19 other than the application control module 17.

Figure 31:
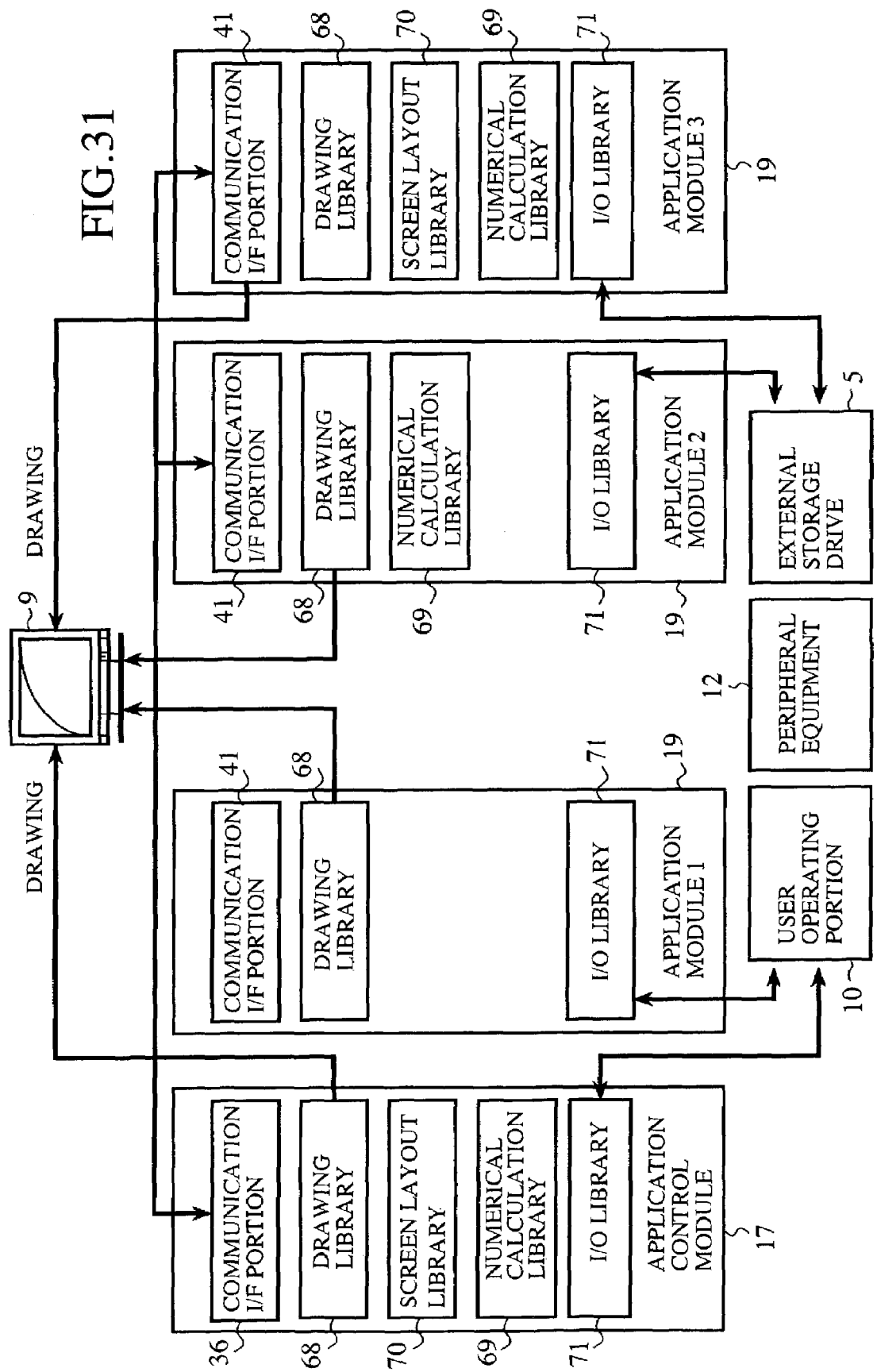
FIG. 31 is a diagram to illustrate a configuration of the on-vehicle multimedia device according to the thirteenth embodiment of the present invention.

Additionally, as shown in FIG. 31, each of the application modules 19 may communicate with the external hardware 15 directly using the drawing library 68 and the external input/output library 71.

As described above, according to the thirteenth embodiment, the library group 67 constituted of a plurality of libraries, each of which realizes a plurality of functions common to the application control module 17 and all of the application modules 19, is provided; and the application control module 17 and each application module 19 are configured to read a required library from the library group 67. Accordingly, the following effects are produced: the quantity of developed codes of the application control module 17 and the application module can be reduced, which enables to develop the on-vehicle multimedia device more efficiently; and working efficiency of development and debugging of the common functions can be improved.

Further, according to the thirteenth embodiment, because an interface which is common to all libraries in the library group 67 is provided, the application control module 17 and each application module 19 can read a library using the same steps, which is a produced effect.

In addition, according to the thirteenth embodiment, the external input/output control module 20 is provided with the external input/output library (I/O library) 71 so that input from outside and output to outside are controlled by the input/output library 71. This produces an effect of reducing a load of the application control module 17.

Furthermore, according to the thirteenth embodiment, each application module 19 includes the drawing library 68 and the external input/output library 71. Drawing on the display 9 of the external hardware 15 is performed using the drawing library 68; and data communication with the external hardware 15 is performed using the external input/output library 71. This produces an effect of reducing a load of the application control module 17.

Fourteenth Embodiment

The library group 67 described in the thirteenth embodiment may be used as an application module 19; or as is the case with DLL of Windows (registered trademark) CE and a shared library of UNIX (registered trademark), the library group 67 may be configured to be linked with a library, which can be shared among the application modules, at the time of execution.

Figure 32:
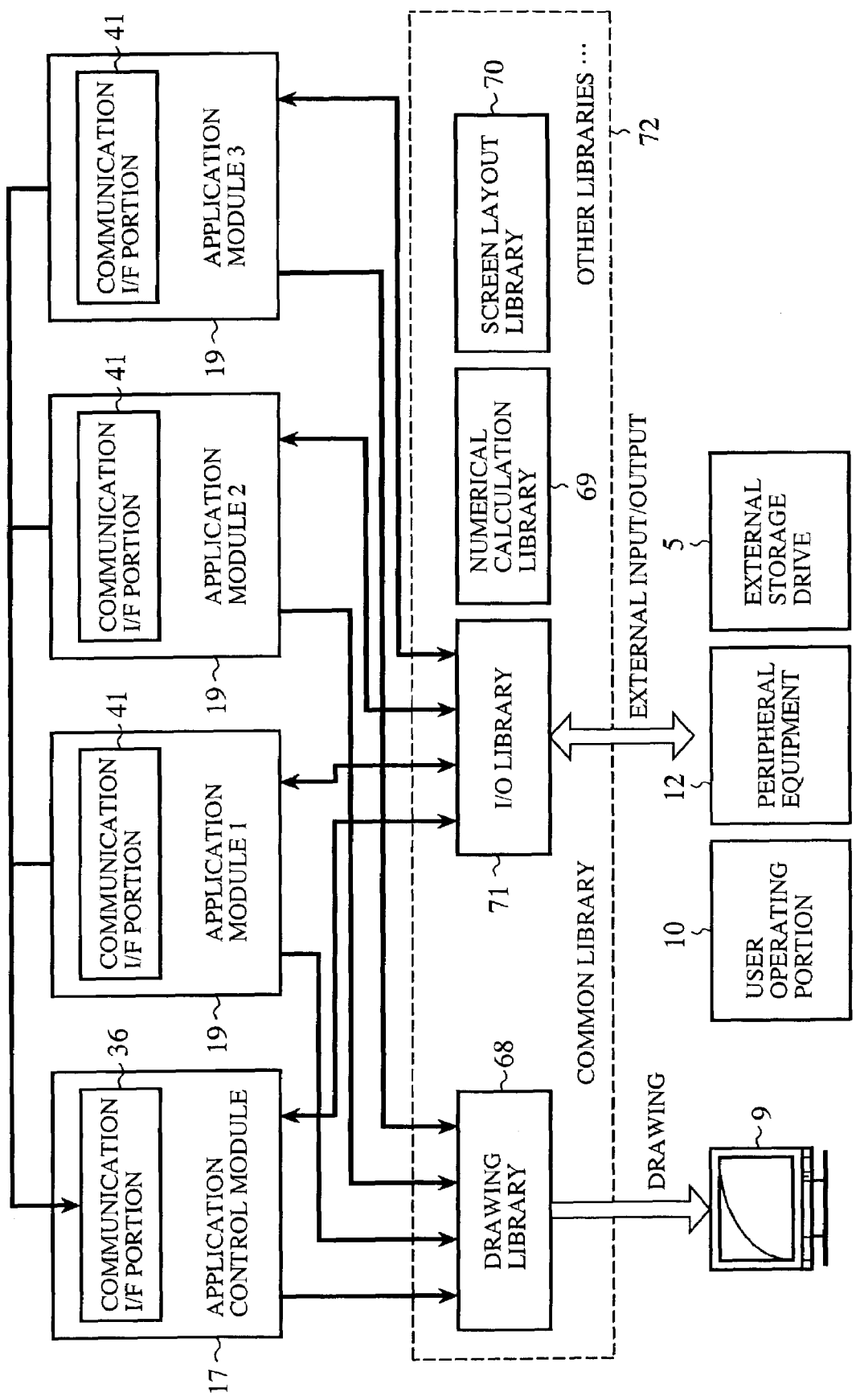
FIG. 32 is a diagram to illustrate a configuration of an on-vehicle multimedia device according to a fourteenth embodiment of the present invention.

FIG. 32 is a diagram to illustrate a configuration of an on-vehicle multimedia device according to a fourteenth embodiment of the present invention.

Reference numeral 72 shown in FIG. 32 represents a common library (library group) as the application module 19. The common library 72 is a library produced by extracting the drawing library 68, the screen layout library 70, the numerical calculation library 69, the external input/output library 71, and the like from the application control module 17 and the application module 19 to integrate the extracted libraries into one for each. As a matter of course, the communication interface portion libraries 36, 41 may also be added to the library group 72.

Since the common library 72 has a specific interface, the common library 72 can be called from any application module 19 using the same steps.

Figure 33:
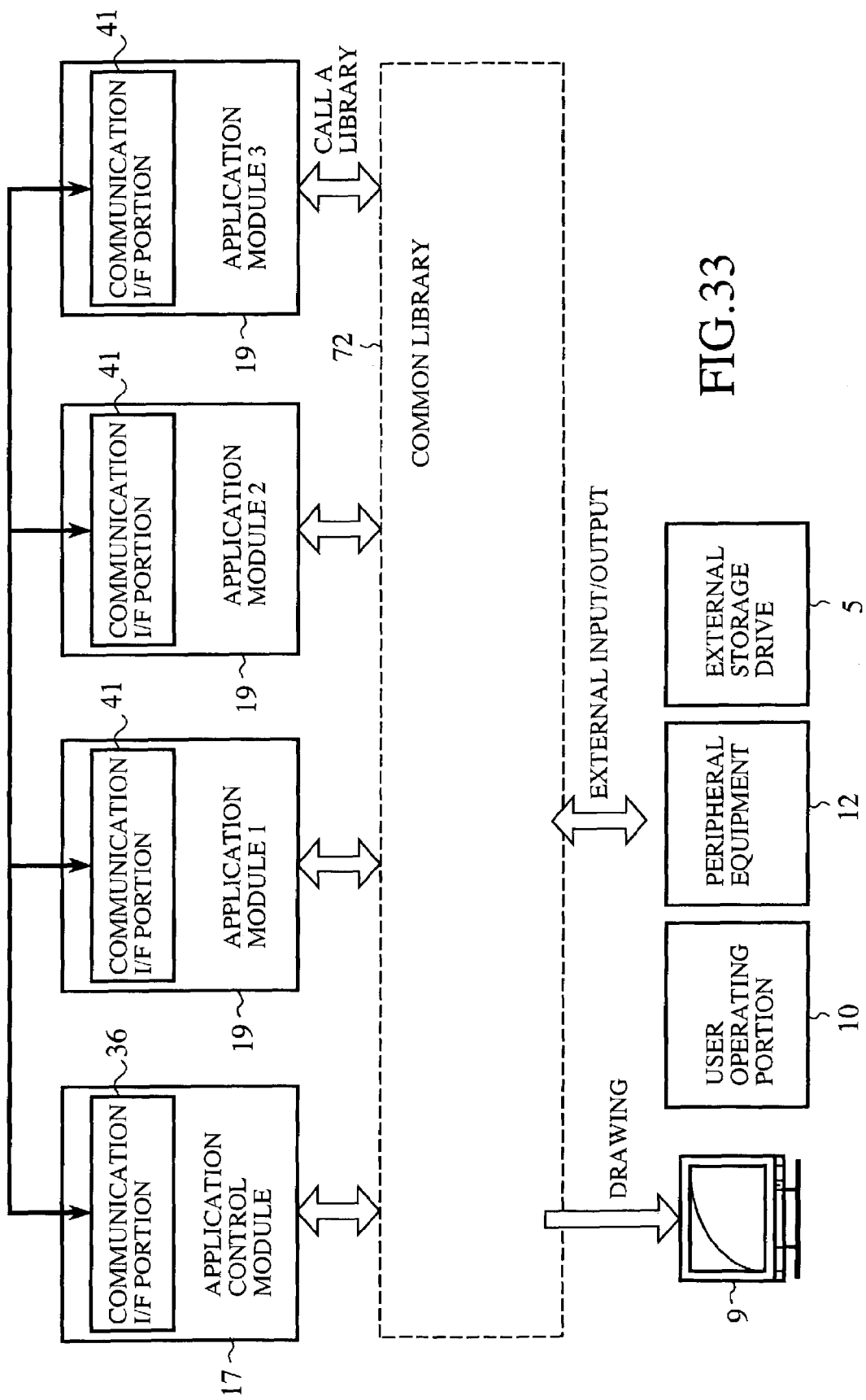
FIG. 33 is a diagram to illustrate a configuration of an on-vehicle multimedia device according to the fourteenth embodiment of the present invention.

Moreover, as shown in FIG. 33, the communication interface portion library, the drawing library, the screen layout library, the numerical calculation library, and the like may also be integrated into the common library group 72.

As described above, according to the fourteenth embodiment, the library group 67 constituted of a plurality of libraries, in which a plurality of functions common to the application control module 17 and all of the application modules 19 are realized, is provided as one of the application modules 19. Accordingly, the following effects are produced: sizes of the application control module and the application module 19 at the time of execution can be reduced, which enables a decrease in the link time; and working efficiency of development and debugging of the common functions can be improved.

Furthermore, according to the fourteenth embodiment, it is so devises that the same library of the library group 67 is accessed from the plurality of application modules 19 using the same steps simultaneously. This produces an effect of reducing a memory size and time required for linkage.

Fifteenth Embodiment

Figure 34:
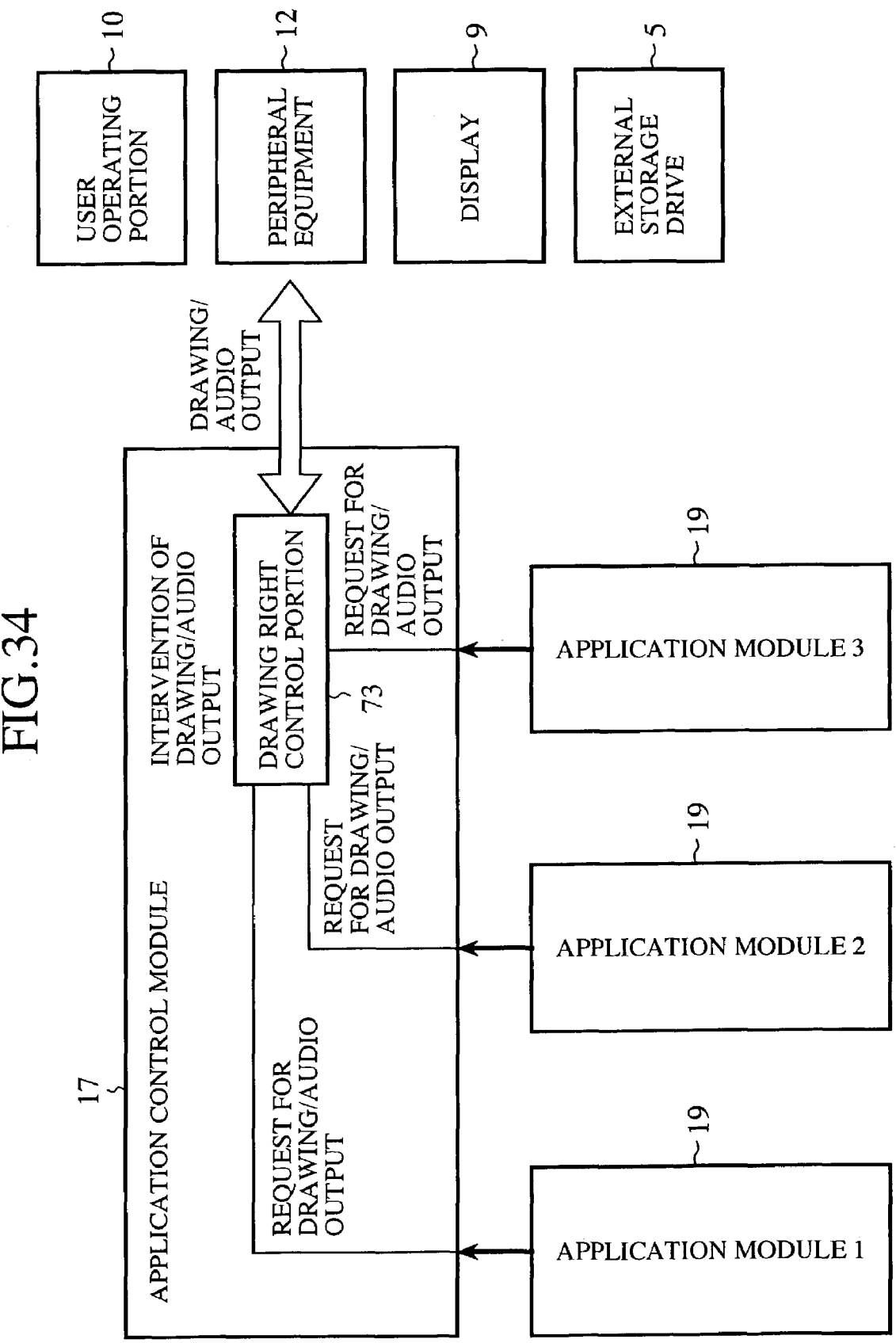
FIG. 34 is a diagram to illustrate a configuration of an on-vehicle multimedia device according to a fifteenth embodiment of the present invention.

FIG. 34 is a diagram to illustrate a configuration of an on-vehicle multimedia device according to a fifteenth embodiment of the present invention. Configurations which are like or equivalent to those shown in FIG. 3 are designated by the same reference numerals.

Reference numeral 73 in FIG. 34 denotes a drawing right control portion for controlling a drawing command from the application module 19 and a drawing command of the application control module 17 itself.

When drawing is required, the application module 19 issues drawing command data to the application control module 17. When the application control module 17 receives the drawing command data, the application control module 17 judges by the drawing right control portion 73 whether or not the application module 19 can perform drawing. If it is judged that drawing is possible, the drawing is performed.

When a drawing request is issued inside the application control module 17, a judgment is made in like manner as to whether or not drawing is possible. If it is judged that drawing is possible, the drawing is performed.

Although illustration is omitted, even if audio output command data are issued instead of drawing command data, a similar method can be adopted by providing an audio output right control portion.

To be more specific, when audio output is required, the application module 19 issues an audio output request to the application control module 17. When the application module 19 receives the audio output request, the application module 19 judges by the audio output right control portion whether or not the application module 19 can perform audio output. If it is judged that audio output is possible, the audio is output.

When an audio output request is issued inside the application control module 17, a judgment is made in like manner as to whether or not audio output is possible. If it is judged that audio output is possible, the audio is output.

It is to be noted that the drawing right control portion 73 and the audio output right control portion may also be integrated into one unit.

In addition, it is also possible to superimpose contents drawn by the application control module 17 on a screen drawn by an application.

Moreover, it is also possible to adjust the order of drawing performed by the application control module 17 and the application module 19 before superimposition of the drawing.

Additionally, a size of an image to be drawn can be adjusted arbitrarily.

Moreover, when drawing a plurality of images, a screen on the display 9 may also be divided; in this case, the number of divided screens and a division size can be adjusted arbitrarily, in other words, they are not limited in particular.

An audio output right control module can also adjust the order of audio output requests from the application control module 17 and the application module 19 before audio output.

As described above, according to the fifteenth embodiment, it is characterized by that the application control module 17 includes the drawing right control portion 73 having the following functions: when receiving drawing command data from the application control module 17 or the application module 19, judging whether or not drawing is possible; and according to the result of the judgment, if it is judged that drawing is possible, performing the drawing on the display 9. Accordingly, as a produced effect, development of the application module 19 becomes possible without being conscious of whether or not drawing is possible, which enables to develop the on-vehicle multimedia device more efficiently.

In addition, according to the fifteenth embodiment, it is characterized by that the application control module 17 includes the audio output right control portion having the following functions: when receiving an audio output request from the application control module 17 or the application module 19, judging whether or not audio output is possible; and according to the result of the judgment, if it is judged that audio output is possible, outputting audio from the external hardware 15. Accordingly, as a produced effect, development of the application module 19 becomes possible without being conscious of whether or not audio output is possible, which enables to develop the on-vehicle multimedia device more efficiently.

Sixteenth Embodiment

Figure 35:
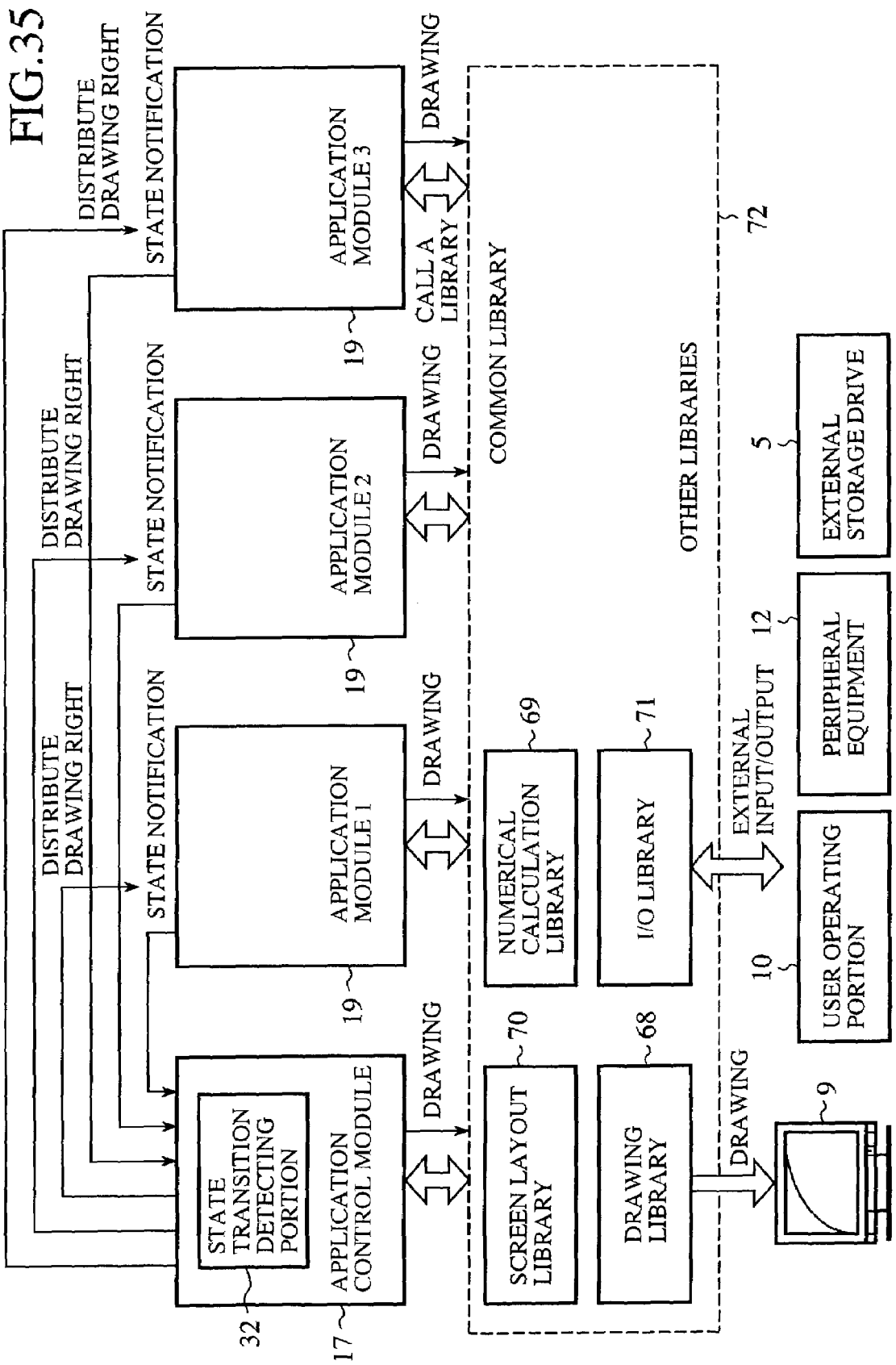
FIG. 35 is a diagram to illustrate a configuration of an on-vehicle multimedia device according to a sixteenth embodiment of the present invention.

FIG. 35 is a diagram to illustrate a configuration of an on-vehicle multimedia device according to a sixteenth embodiment of the present invention. Configurations which are like or equivalent to those shown in FIGS. 14, 30, 31, and 32 are designated by the same reference numerals.

The state transition detecting portion 32 shown in FIG. 35 controls a drawing command from the application module 19 and a drawing command of the application control module 17 itself.

When drawing is required, the application module 19 issues drawing right request data to the application control module 17. When the application control module 17 receives the drawing right request data, the application control module 17 detects by the state transition detecting portion 32 whether or not the application module 19 can perform drawing. If it is detected that drawing is possible, the application control module 17 issues, to the application module 19, data notifying that drawing is possible. When the application module 19 receives the drawing possible notification data, the application module 19 transmits drawing command data to the drawing library 68 in order to instruct drawing. The drawing library 68 which has received the drawing command data performs drawing on the display 9 of the external hardware 15.

Even when drawing is requested inside the application control module 17, the state transition detecting portion 32 detects in a like manner whether or not drawing is possible. If it is detected that drawing is possible, drawing command data are issued to the drawing library 68, and then the drawing library 68 performs drawing on the display 9.

Drawing may be replaced with audio output as below.

When audio output is required, the application module 19 requests the application control module 17 to give the application module 19 an audio output right. When the application control module 17 receives the audio output right request data, the application control module 17 detects by the state transition detecting portion 32 whether or not the application module 19 can output audio. If it is detected that audio output is possible, the application control module 17 issues, to the application module 19, data notifying that audio output is possible. When the application module 19 receives the audio output possible notification data, the application module 19 transmits audio output command data to an audio output library, which is not illustrated, in order to instruct audio output. The audio output library which has received the audio output command data outputs audio from the peripheral equipment 12 of the external hardware 15.

When audio output is requested inside the application control module 17, a judgment as to whether or not audio output is possible is made by the state transition detecting portion 32 in a like manner. If it is judged that audio output is possible, audio output command data are issued to the audio output library.

It is to be noted that the application control module 17 can also superimpose contents drawn by the application control module 17 on a drawing screen of the application module 19 and vice versa, as a matter of course.

Moreover, the application control module 17 can also adjust order of drawing performed by the application control module 17 and the application module 19 before superimposition of the drawing.

Additionally, a size of an image to be drawn can be adjusted arbitrarily.

Moreover, when drawing a plurality of images, a screen on the display 9 may also be divided; in this case, the number of divided screens and a division size can be adjusted arbitrarily, in other words, they are not limited in particular.

The application control module 17 can also adjust the order of a plurality of audio output right requests from the application control module 17 and the application module 19 before outputting audio.

Moreover, as is the case with the library described in the thirteenth embodiment, the drawing library 68 and the audio output library may also be included in the application control module 17 or the application module 19.

As described above, according to the sixteenth embodiment, the application control module 17 is configured to include the state transition detecting portion 32 having the following functions: when receiving drawing right request data from the application control module 17 or the application module 19, judging whether or not the application control module 17 or the application module 19 can perform drawing; and if it is judged that drawing is possible, drawing possible notification data are issued to the application control module 17 or the application module 19. In addition to it, the drawing library having the following function is provided: performing drawing on the external hardware 15 according to drawing command data from the application control module 17 or the application module 19 which has received the drawing possible notification data. Accordingly, as a produced effect, development of the application module becomes possible without being conscious of whether or not drawing is possible, which enables to develop the on-vehicle multimedia device more efficiently.

Moreover, according to the sixteenth embodiment, the application control module 17 is configured to include the state transition detecting portion 32 having the following functions: when receiving audio output right request data from the application control module 17 or the application module 19, judging whether or not the application control module 17 or the application module 19 can output audio; and if it is judged that audio output is possible, audio output possible notification data are issued to the application control module 17 or the application module 19. In addition to it, the audio output library having the following function is provided: outputting audio from the external hardware 15 according to audio output command data from the application control module 17 or the application module 19 which has received the audio output possible notification data. Accordingly, as a produced effect, development of the application module becomes possible without being conscious of whether or not audio output is possible, which enables to develop the on-vehicle multimedia device more efficiently.

Seventeenth Embodiment

Figure 36:
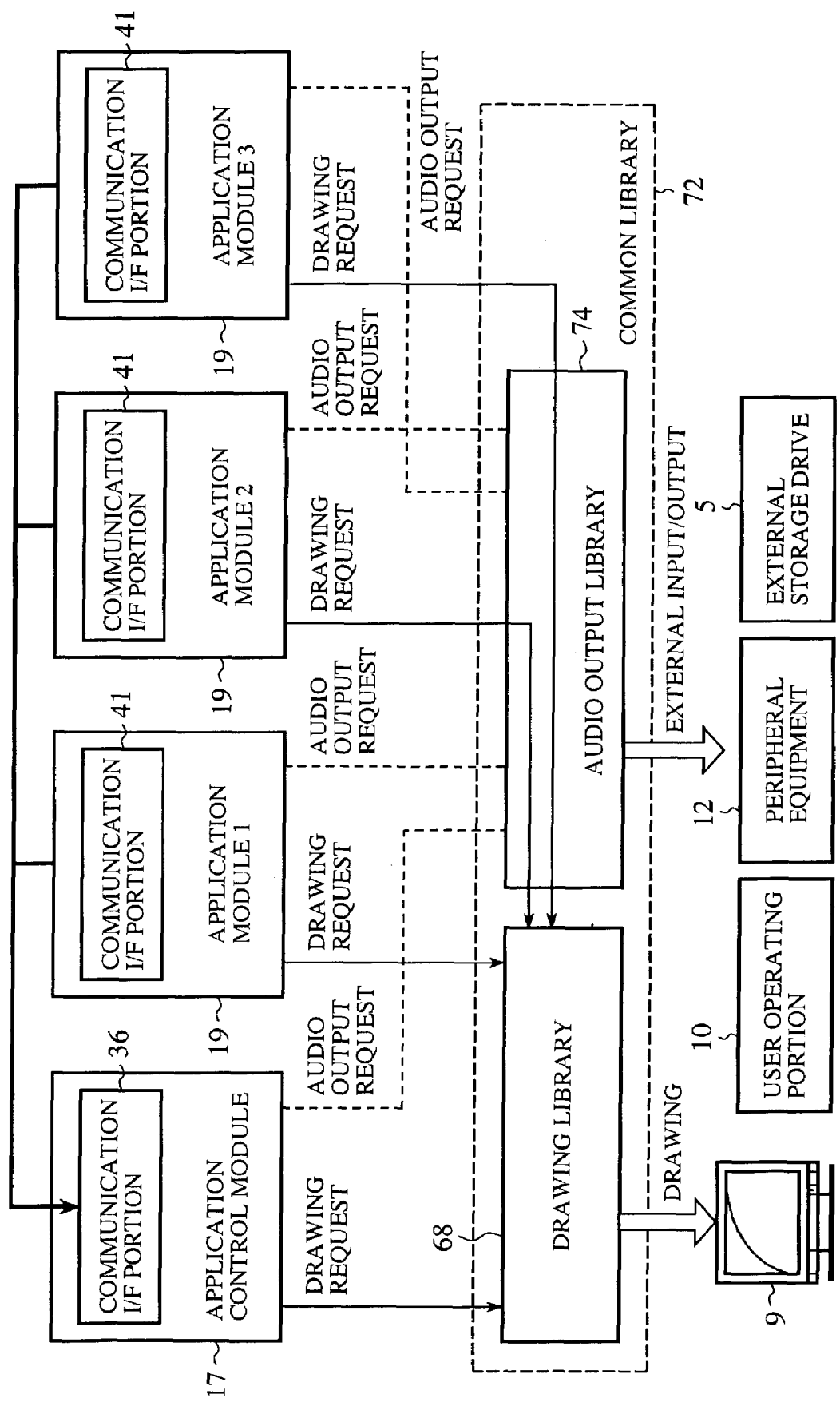
FIG. 36 is a diagram to illustrate a configuration of an on-vehicle multimedia device according to a seventeenth embodiment of the present invention.

FIG. 36 is a diagram to illustrate a configuration of an on-vehicle multimedia device according to an seventeenth embodiment of the present invention. Configurations which are like or equivalent to those shown in the above mentioned figures are designated by the same reference numerals.

Reference numeral 68 shown in FIG. 36 denotes a drawing library for controlling a drawing command from the application control module 17 or each application module 19.

When drawing is required, the application module 19 issues drawing command data to the drawing library 68. When the drawing library 68 receives the drawing command data, the drawing library 68 judges by a drawing control portion whether or not the application module 19 can perform drawing. If it is judged that drawing is possible, the drawing is performed. If drawing is not possible, the drawing library 68 notifies the application module 19 that the drawing is not possible, and then instructs the application module 19 to suspend the drawing.

In this connection, if the drawing is not possible, the drawing may also be suspended in the drawing library 68 without notifying the application module 19 that the drawing is not possible, or a drawing request may also be canceled without notifying that the drawing is not possible.

As a matter of course, the drawing may be replaced with audio output as below. Reference numeral 74 shown in FIG. 36 denotes an audio output library for controlling an audio output command from the application control module 17 or each application module 19.

When audio output is required, the application module 19 issues audio output command data to the audio output library 74. When the audio output library 74 receives the audio output command data, the audio output library 74 judges whether or not the application module 19 can output audio. If it is judged that audio output is possible, the audio is output. If audio output is not possible, the audio output library 74 notifies the application module 19 that the audio output is not possible, and then instructs the application module 19 to suspend the audio output.

It is to be noted that if audio output is not possible, audio output may also be suspended in the audio output library 74 without notifying the application module 19 that the audio output is not possible.

In addition, if audio output is not possible, audio output command data may also be canceled without notifying the application module 19 that audio output is not possible.

The drawing library 68 can also superimpose contents drawn by the application control module 17 on a screen drawn by the application.

Moreover, the drawing library 68 can also adjust the order of drawing performed by the application control module 17 and the application module 19 before superimposition of the drawing.

Additionally, a size of an image to be drawn can be adjusted arbitrarily.

Moreover, when drawing a plurality of images, a screen on the display 9 may also be divided; in this case, the number of divided screens and a division size can be adjusted arbitrarily, in other words, they are not limited in particular.

The audio output library 74 can also adjust the order of audio output requests from the application control module 17 and the application module 19 before audio output.

As described above, according to the seventeenth embodiment, the drawing library having the following functions is provided: in response to drawing command data received from the application control module or the application module, judging whether or not drawing is possible; and if it is judged that drawing is possible, performing the drawing on the display 9. Accordingly, as a produced effect, development of each module becomes possible without being conscious of whether or not drawing is possible, which enables to develop the on-vehicle multimedia device more efficiently.

Moreover, according to the seventeenth embodiment, the audio output library 74 having the following functions is provided: in response to audio output command data received from the application control module or the application module, judging whether or not audio output is possible; and if it is judged that audio output is possible, outputting the audio from the external display 15. Accordingly, as a produced effect, development of each module becomes possible without being conscious of whether or not audio output is possible, which enables to develop the on-vehicle multimedia device more efficiently.

Eighteenth Embodiment

Figure 37:
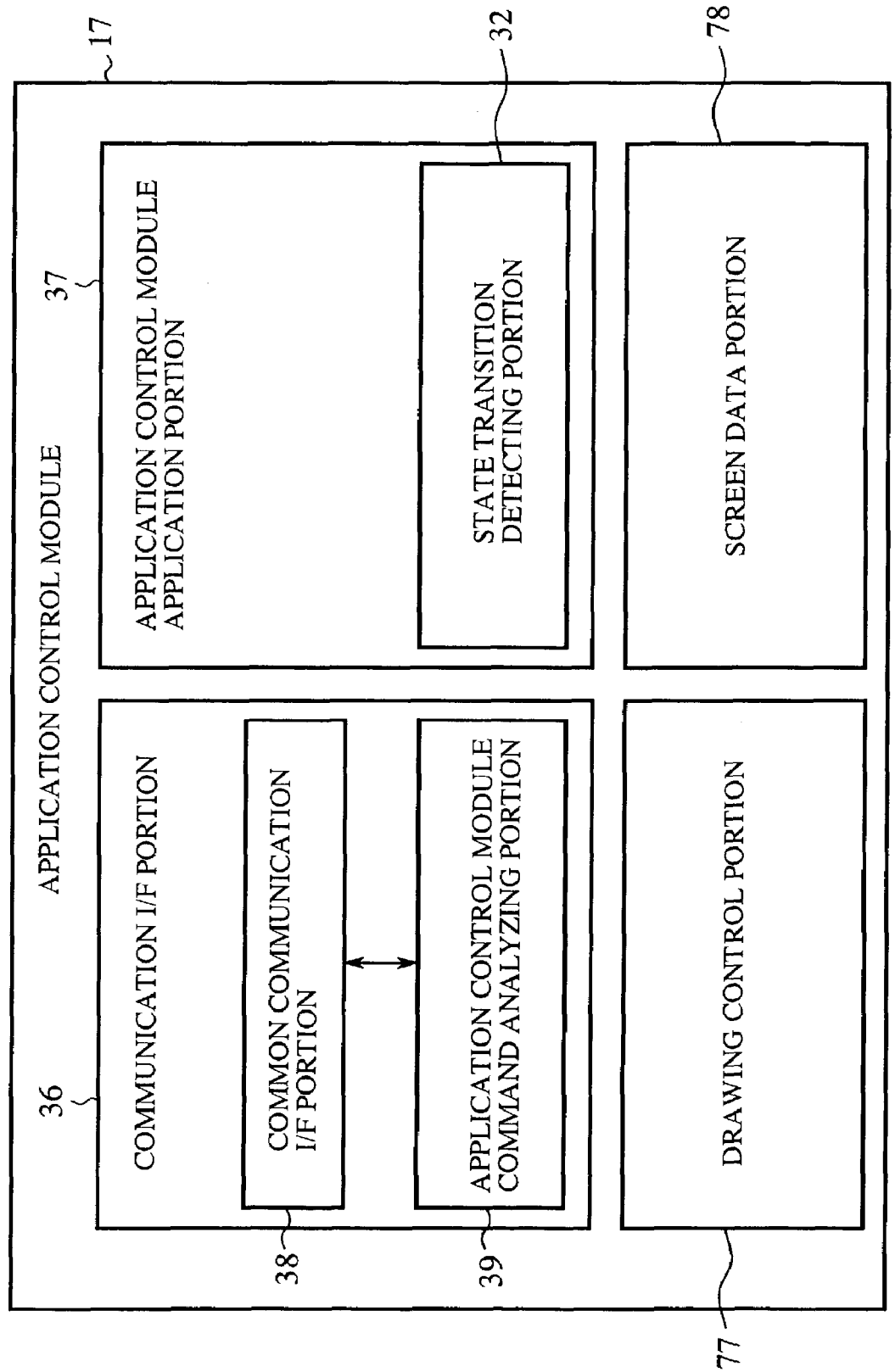
FIG. 37 is a diagram to illustrate a configuration of an application control module 17 according to an eighteenth embodiment.
Figure 38:
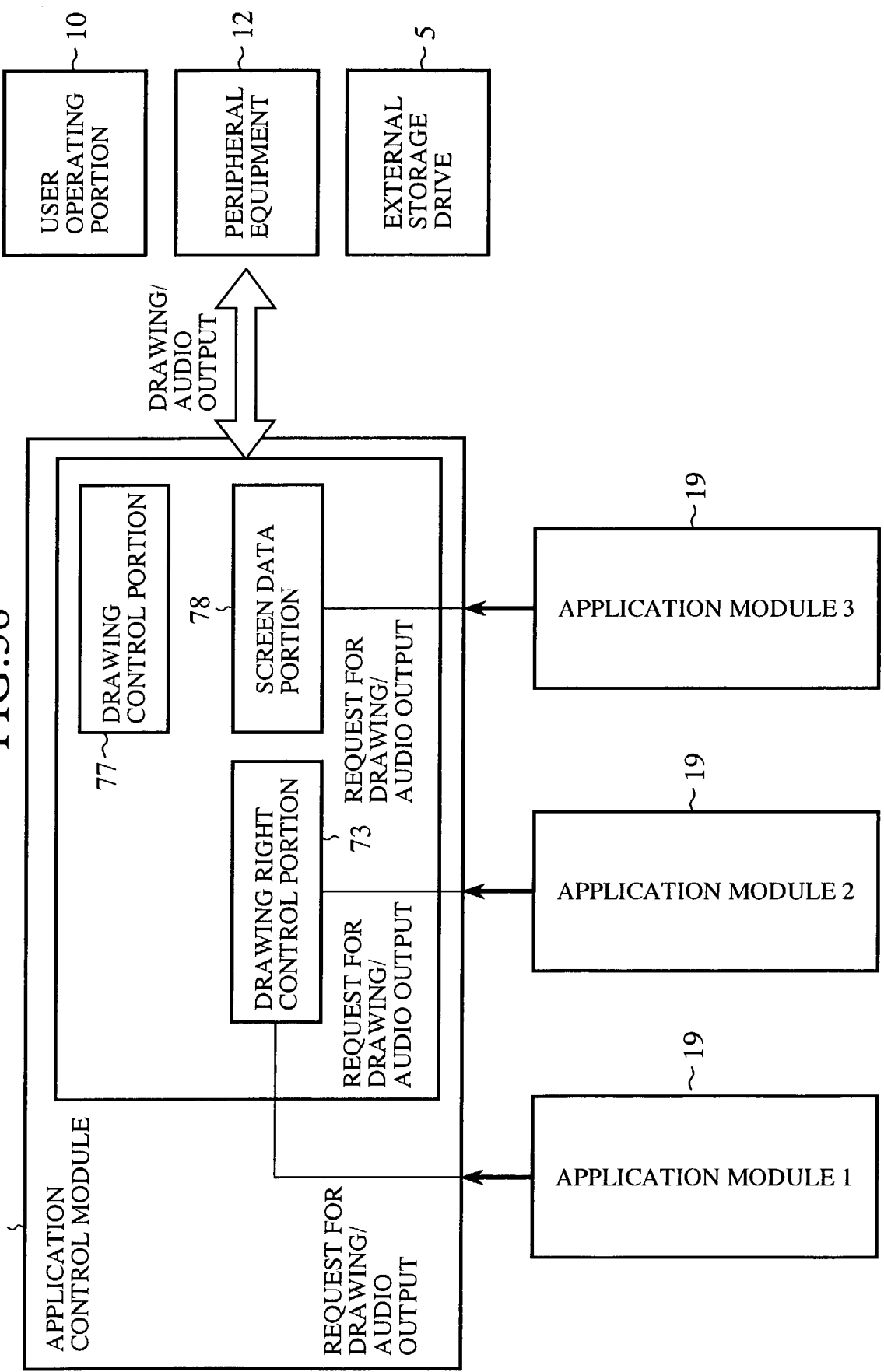
FIG. 38 is a diagram to illustrate a configuration of an on-vehicle multimedia device according to the eighteenth embodiment of the present invention.

FIG. 37 is a diagram to illustrate a configuration of the application control module 17 according to an eighteenth embodiment. FIG. 38 is a diagram to illustrate a configuration of an on-vehicle multimedia device according to an eighteenth embodiment of the present invention.

In FIGS. 37 and 38, reference numeral 77 denotes a drawing control portion for displaying a screen on the basis of screen data 78; and reference numeral 78 is a screen data portion which is required for displaying of the application control module 17.

The screen data portion 78 includes the following: screen parts such as a button and a menu, which are required for displaying the application control module 17; and screen data such as drawing positions of the button and the menu, and an animation.

When the application control module 17 starts, the drawing control portion 77 draws the screen parts at the drawing positions stored in the screen data portion 78. When transition of an internal state of the application control module 17 causes a screen part to be drawn, the drawing control portion 77 draws the screen part at a position shown in the screen data portion 78. In addition, when deletion of a screen part is required, the drawing control portion 77 deletes an appropriate screen part.

When a change in internal state of the application control module 17 causes an animation of screen parts, the drawing control portion 77 repeats the drawing and deletion of the screen parts stored in the screen data portion 78 one by one to execute the animation, on the basis of animation data included in the screen data portion 78.

The drawing control portion 77 and the screen data portion 78 can also be automatically generated using an operation screen builder.

As described above, according to the eighteenth embodiment, the application control module 17 is configured to include the following: the drawing control portion for performing drawing on the display 9 of the external hardware 15; and the screen data portion which stores screen data required when performing drawing of the application control module 17. Accordingly, the following effects are produced: a graphic user interface of the application control module 17 can be created independently from other functions in the application control module 17, which enables to develop the on-vehicle multimedia device more efficiently.

Nineteenth Embodiment

Figure 39:
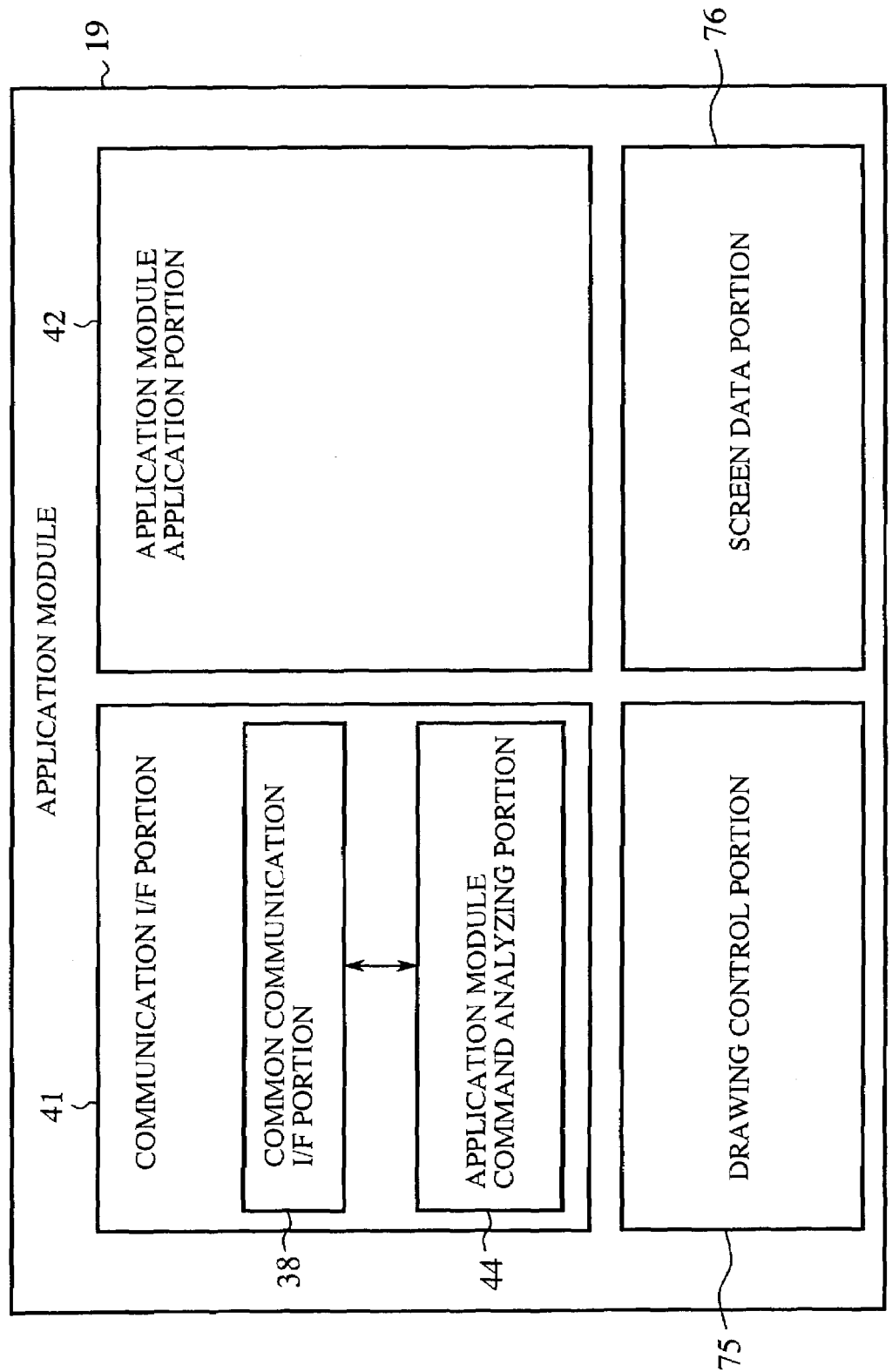
FIG. 39 is a diagram to illustrate a configuration of an application module according to a nineteenth embodiment.
Figure 40:
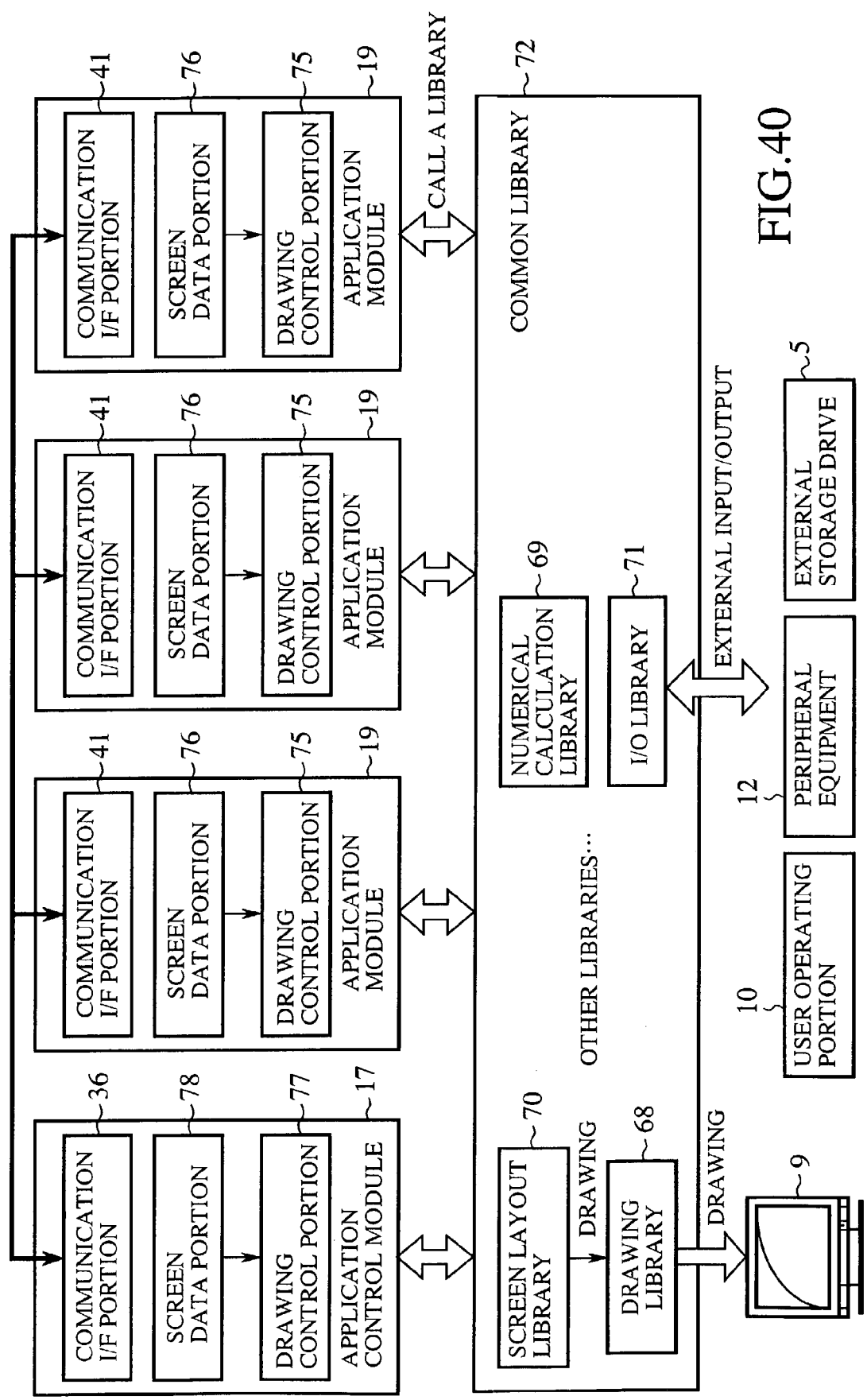
FIG. 40 is a diagram to illustrate a configuration of an on-vehicle multimedia device according to the nineteenth embodiment of the present invention.

FIG. 39 is a diagram to illustrate a configuration of the application module 19 according to a nineteenth embodiment. FIG. 40 is a diagram to illustrate a configuration of an on-vehicle multimedia device according to a nineteenth embodiment of the present invention. In FIG. 40, not only the application control module 17 but also each application module 19 is provided with a drawing control portion and a screen data portion.

In FIGS. 39 and 40, reference numeral 75 denotes a drawing control portion for displaying a screen on the basis of screen data 76; and reference numeral 76 denotes a screen data portion which is required for displaying of the application control module 19. The screen data portion 76 includes the following: screen parts such as a button and a menu, which are required for displaying the application module 19; and screen data such as drawing positions of the button and the menu, and an animation.

When the application module 19 starts, the drawing control portion 75 draws the screen parts at the drawing positions stored in the screen data portion 76. When transition of an internal state of the application module 19 causes a screen part to be drawn, the drawing control portion 75 draws the screen part at a position shown in the screen data portion 76. In addition, when deletion of a screen part is required, the drawing control portion 75 deletes an appropriate screen part.

When a change in internal state of the application module 19 causes an animation of screen parts, the drawing control portion 75 repeats the drawing and deletion of the screen parts stored in the screen data portion 76 one by one to execute the animation, on the basis of animation data included in the screen data portion 76.

The drawing control portion 75 and the screen data portion 76 can also be automatically generated using an operation screen builder.

As a configuration of the drawing library, both the method described in the thirteenth embodiment and that described in the fourteenth embodiment may be used.

As described above, according to the nineteenth embodiment, the application module 19 is configured to include the following: the drawing control portion for performing drawing on the display 9 of the external hardware 15; and the screen data portion which stores screen data required when performing drawing of the application module 19. Accordingly, the following effects are produced: a graphic user interface of the application module 19 can be created independently from other functions in the application module 19, which enables to develop the on-vehicle multimedia device more efficiently.

INDUSTRIAL APPLICABILITY

As described above, the on-vehicle multimedia device according to the present invention is suitable for a total information terminal system which is mounted on a movable body such as a car, and to which functions such as hypertext browsing and digital audio control, as well as navigation service, can be added.

What is claimed is:

1. An on-vehicle multimedia device to be operated by software, comprising:
   an application module group having a plurality of application modules that realizes their respective different functions,
   an application control module for controlling each of the application modules, and
   external hardware which inputs and outputs data to be processed by the software; and
   a library group constituted of a plurality of libraries, each of which realizes a plurality of functions common to the application control module and all of the application modules, wherein the application control module and each of the application modules read from the library group, wherein said library group has an interface which is common to all libraries,
   wherein an external input/output control module includes an external input/output library for controlling data input from and output to the external hardware,
   wherein each of the application modules includes:
   a drawing library for performing drawing on the external hardware; and
   an external input/output library for controlling data input from and output to the external hardware,
   wherein each of the application control module and the application module operate in parallel and also in a protected separate process space.

2. The on-vehicle multimedia device according to claim 1, wherein said application module group includes, as one of the application modules, an external input/output control module for inputting data from and outputting data to the external hardware.

3. The on-vehicle multimedia device according to claim 1, wherein said application control module analyzes data from the external hardware, and then delivers the data to an application module or an application control module corresponding to the result of the analysis.

4. The on-vehicle multimedia device according to claim 1, wherein said application control module controls starting and ending of each application module.

5. The on-vehicle multimedia device according to claim 1, further comprising a voice recognition portion for analyzing audio data input into the external hardware.

6. The on-vehicle multimedia device according to claim 1, further comprising a text speaking portion which analyzes text data from the application module to read the analyzed text data aloud by the external hardware.

7. The on-vehicle multimedia device according to claim 1, wherein said application control module includes a state transition detecting portion for detecting state transition of the application module, and when receiving data used for the application module, the application control module detects a command acceptable state of the application module using the state transition detecting portion and then delivers the data.

8. The on-vehicle multimedia device according to claim 1, wherein said application control module includes:
   a state transition detecting portion for detecting state transition of the application module;
   a command interpreting portion for interpreting input data; and
   a command converting portion that converts the data which has been interpreted by the command interpreting portion into data used for the corresponding application module before transmitting the converted data.

9. The on-vehicle multimedia device according to claim 1, wherein said application control module judges whether or not the application module is started, and starts the application module before delivering data.

10. The on-vehicle multimedia device according to claim 1, wherein said application control module includes:
a communication interface portion for communicating with the application control module or each application module;
an application control module application portion in which a function of the application control module is realized; and
an application module application portion that makes the application modules execute respective individual functions,
wherein said application control module and the application module include, in common, a common communication interface portion for mutual communication.

11. The on-vehicle multimedia device according to claim 1, wherein said application control module reads an application module, which is a target of read command data, into a main memory.

12. The on-vehicle multimedia device according to claim 1, wherein said application control module deletes an application module, which is a target of delete command data, from the main memory.

13. The on-vehicle multimedia device according to claim 12, wherein said application module saves an internal state and data of the application module before they are deleted by the application control module.

14. The on-vehicle multimedia device according to claim 1, further comprising an application replacing portion for reading an application module as a target of read command data into the main memory, or for deleting an application module as a target of delete command data from the main memory.

15. The on-vehicle multimedia device according to claim 1, wherein said application module group includes, as one of the application modules, a library group constituted of a plurality of libraries, each of which realizes a plurality of functions common to the application control module and all of the application modules.

16. The on-vehicle multimedia device according to claim 15, wherein, in the library group, the same library is simultaneously accessed by a plurality of application modules using the same steps.

17. The on-vehicle multimedia device according to claim 1, wherein said application control module includes a drawing right control portion having functions of, when receiving drawing command data from the application control module or the application module, judging whether or not drawing is possible, and if it is judged that drawing is possible, then performing the drawing on the external hardware.

18. The on-vehicle multimedia device according to claim 1, wherein said application control module includes an audio output right control portion having functions of, when receiving audio output command data from the application control module or the application module, judging whether or not audio output is possible, and if it is judged that audio output is possible, then outputting audio from the external hardware.

19. The on-vehicle multimedia device according to claim 1, wherein said application control module includes:
a state transition detecting portion having functions of, when receiving drawing right request data from the application control module or the application module, judging whether or not the application control module or the application module can perform drawing, and if it is judged that drawing is possible, issuing drawing possible notification data to the application control module or the application module; and
a drawing library for performing drawing on the external hardware according to the drawing command data from the application control module or the application module which has received the drawing possible notification data.

20. The on-vehicle multimedia device according to claim 1, wherein said application control module includes:
a state transition detecting portion having functions of, when receiving audio output right request data from the application control module or the application module, judging whether or not the application control module or the application module can output audio, and if it is judged that audio output is possible, issuing audio output possible notification data to the application control module or the application module; and
an audio output library for outputting audio from the external hardware according to audio output command data from the application control module or the application module which has received the audio output possible notification data.

21. The on-vehicle multimedia device according to claim 1, further comprising a drawing library having functions of, when receiving drawing command data from the application control module or the application module, judging whether or not drawing is possible, and if it is judged that drawing is possible, performing drawing on the external hardware.

22. The on-vehicle multimedia device according to claim 1, further comprising an audio output library having functions of, when receiving audio output command data from the application control module or the application module, judging whether or not audio output is possible, and if it is judged that audio output is possible, outputting audio from the external hardware.

23. The on-vehicle multimedia device according to claim 1, wherein said application control module includes:
a drawing control portion for performing drawing on the external hardware; and
a screen data portion for storing screen data required for the drawing.

24. The on-vehicle multimedia device according to claim 1, wherein said application module includes:
a drawing control portion for performing drawing on the external hardware; and
a screen data portion for storing screen data required for the drawing.

* * * * *

UNITED STATES PATENT AND TRADEMARK OFFICE
CERTIFICATE OF CORRECTION

| | | |
|---|---|---|
| PATENT NO. | : 7,231,642 B2 | Page 1 of 1 |
| APPLICATION NO. | : 10/275622 | |
| DATED | : June 12, 2007 | |
| INVENTOR(S) | : Shinichiro Araki et al. | |

It is certified that error appears in the above-identified patent and that said Letters Patent is hereby corrected as shown below:

On the title page item (54), and Col. 1, line 1, "VEHICLE MOUNTED MULTIMEDIA DEVICE"

Should read:

--(54) ON-VEHICLE MULTIMEDIA DEVICE--

On the title page item "(73) Assignee: Mitsubishi Denki Kasbushiki Kaisha, Tokyo (JP)"

Should read:

--(73) Assignee: Mitsubishi Denki Kabushiki Kaisha, Tokyo (JP)--

Signed and Sealed this

Eleventh Day of December, 2007

JON W. DUDAS
*Director of the United States Patent and Trademark Office*